United States Patent
Komori

(10) Patent No.: US 8,688,153 B2
(45) Date of Patent: Apr. 1, 2014

(54) SIGNAL TRANSMISSION APPARATUS, ELECTRONIC DEVICE, AND SIGNAL TRANSMISSION METHOD

(75) Inventor: Kenji Komori, Kanagawa (JP)

(73) Assignee: Sony Corporation, Tokyo (JP)

( * ) Notice: Subject to any disclaimer, the term of this patent is extended or adjusted under 35 U.S.C. 154(b) by 301 days.

(21) Appl. No.: 13/137,732

(22) Filed: Sep. 8, 2011

(65) Prior Publication Data

US 2012/0094614 A1    Apr. 19, 2012

(30) Foreign Application Priority Data

Oct. 18, 2010    (JP) ................................ 2010-233695

(51) Int. Cl.
*H04B 15/00*    (2006.01)

(52) U.S. Cl.
USPC ........................... 455/501; 455/63.1; 370/482

(58) Field of Classification Search
USPC ........... 455/103, 501, 509, 62, 63.1; 370/480, 370/482
See application file for complete search history.

(56) References Cited

U.S. PATENT DOCUMENTS

| | | | | |
|---|---|---|---|---|
| 5,621,913 A | * | 4/1997 | Tuttle et al. ................... | 455/41.2 |
| 5,754,948 A | * | 5/1998 | Metze ........................... | 455/41.2 |
| 6,542,720 B1 | * | 4/2003 | Tandy .......................... | 455/90.3 |
| 6,771,935 B1 | * | 8/2004 | Leggett ........................ | 455/66.1 |
| 6,856,788 B2 | * | 2/2005 | Chang et al. ................. | 455/41.1 |
| 6,953,994 B2 | * | 10/2005 | Kaewell, Jr. ................. | 257/724 |
| 7,050,763 B2 | * | 5/2006 | Stengel et al. ............... | 455/90.3 |
| 7,257,093 B1 | * | 8/2007 | Witzke et al. ............. | 370/310.1 |
| 7,330,702 B2 | * | 2/2008 | Chen et al. ...................... | 455/73 |
| 7,535,958 B2 | * | 5/2009 | Best .............................. | 375/239 |
| 7,809,329 B2 | * | 10/2010 | Rofougaran ..................... | 455/39 |
| 7,890,064 B1 | * | 2/2011 | Rofougaran ..................... | 455/84 |
| 7,933,573 B2 | * | 4/2011 | Kondo et al. ............... | 455/161.2 |
| 7,975,079 B2 | * | 7/2011 | Bennett et al. .................. | 710/21 |
| 8,023,893 B2 | * | 9/2011 | Richman ...................... | 455/41.2 |
| 8,121,541 B2 | * | 2/2012 | Rofougaran ................. | 455/41.1 |
| 8,125,950 B2 | * | 2/2012 | Rofougaran et al. ......... | 370/329 |
| 8,140,113 B2 | * | 3/2012 | Rofougaran ............... | 455/553.1 |
| 8,170,497 B2 | * | 5/2012 | Rofougaran .................... | 455/73 |
| 8,204,075 B2 | * | 6/2012 | Rofougaran et al. ......... | 370/463 |
| 8,223,736 B2 | * | 7/2012 | Rofougaran .................. | 370/343 |
| 8,238,275 B2 | * | 8/2012 | Rofougaran et al. ......... | 370/310 |
| 8,422,414 B2 | * | 4/2013 | Pettus et al. .................. | 370/310 |
| 2007/0254633 A1 | * | 11/2007 | Mathew et al. ............ | 455/412.1 |
| 2008/0253400 A1 | * | 10/2008 | Carroll ......................... | 370/480 |

FOREIGN PATENT DOCUMENTS

| | | |
|---|---|---|
| JP | 55-038777 | 3/1980 |
| WO | WO-2004/070985 A2 | 8/2004 |
| WO | WO-2009/076562 A1 | 6/2009 |

OTHER PUBLICATIONS

Extended European Search Report issued Jan. 31, 2012 for corresponding European Application No. 11 18 4626.

* cited by examiner

*Primary Examiner* — Gennadiy Tsvey

(74) *Attorney, Agent, or Firm* — Rader, Fishman & Grauer PLLC

(57) ABSTRACT

A signal transmission apparatus including: a plurality of modulating sections configured to modulate a transmission object signal; and a plurality of demodulating sections configured to demodulate the modulated signals modulated by the modulating sections, wherein each of carrier frequencies as frequencies different from each other used by respective sets of the modulating sections and the demodulating sections is set such that frequency of a third-order intermodulation distortion component generated on a basis of two carrier frequencies adjacent to each other is not present within any of reception bands of modulated signals based on each of the other carrier frequencies.

22 Claims, 25 Drawing Sheets

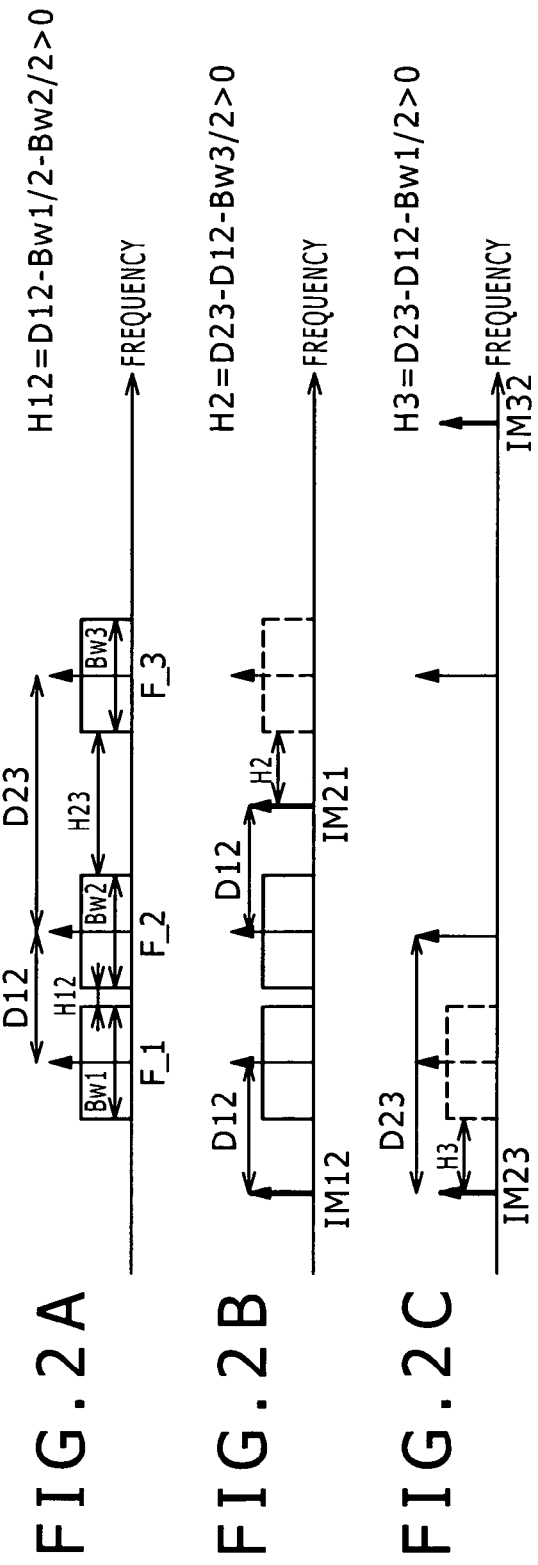

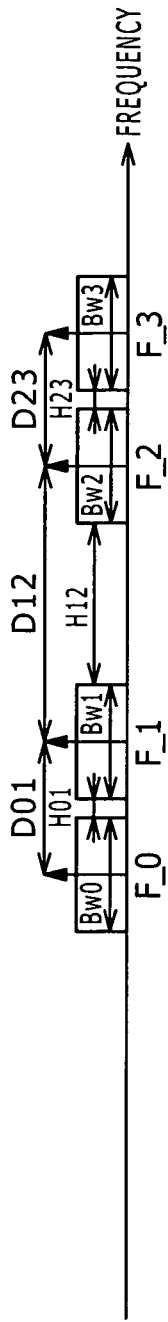
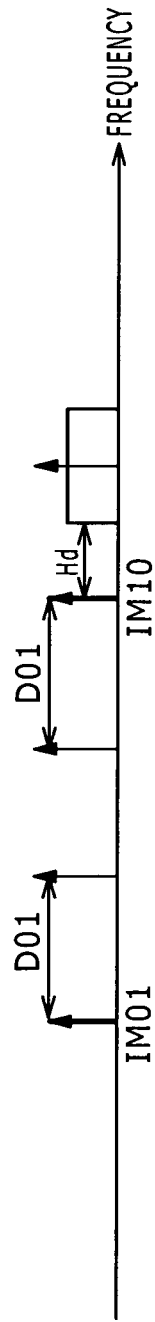
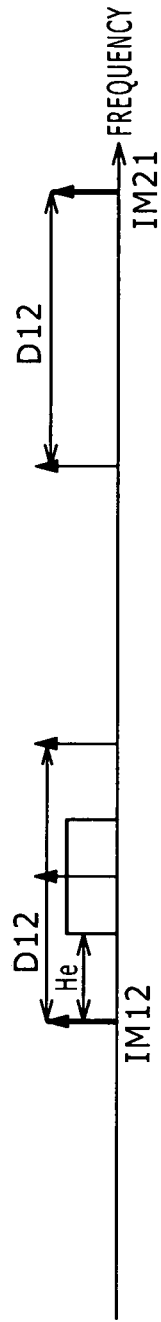
FIG. 5A
FIG. 5B
FIG. 5C
$Bw@\_L = Bw@\_H = Bw@/2: @=0,1,2,3$
LETTING $D12 > D01$, AND $D12 > D23$,
$Bw0/2 + Bw1/2 < D01 < D12 - (Bw0$ OR $Bw2$ WHICHEVER IS GREATER$)/2$
$Bw2/2 + Bw3/2 < D23 < D12 - (Bw1$ OR $Bw3$ WHICHEVER IS GREATER$)/2$
LETTING $Bw0 = Bw1 = Bw2 = Bw3 = Bw$, $D01 = D23$,
$Bw < D23 < D12 - Bw/2$ Bw@_L=Bw@_H=Bw@/2:@=1,2,3,4,5
LETTING D12<D23, D34<D23 AND, D34<D45, Bw1/2+Bw2/2<D12<D23-(Bw1 OR Bw3 WHICHEVER IS GREATER)/2

Bw3/2+Bw4/2<D34<D23-(Bw2 OR Bw4 WHICHEVER IS GREATER)/2 OR
D45-(Bw3 OR Bw5 WHICHEVER IS GREATER)/2 WHICHEVER IS SMALLER

LETTING Bw1=Bw2=Bw3=Bw4=Bw5=Bw, AND LETTING D12=34,D23=45,
Bw<D12<D23-Bw/2

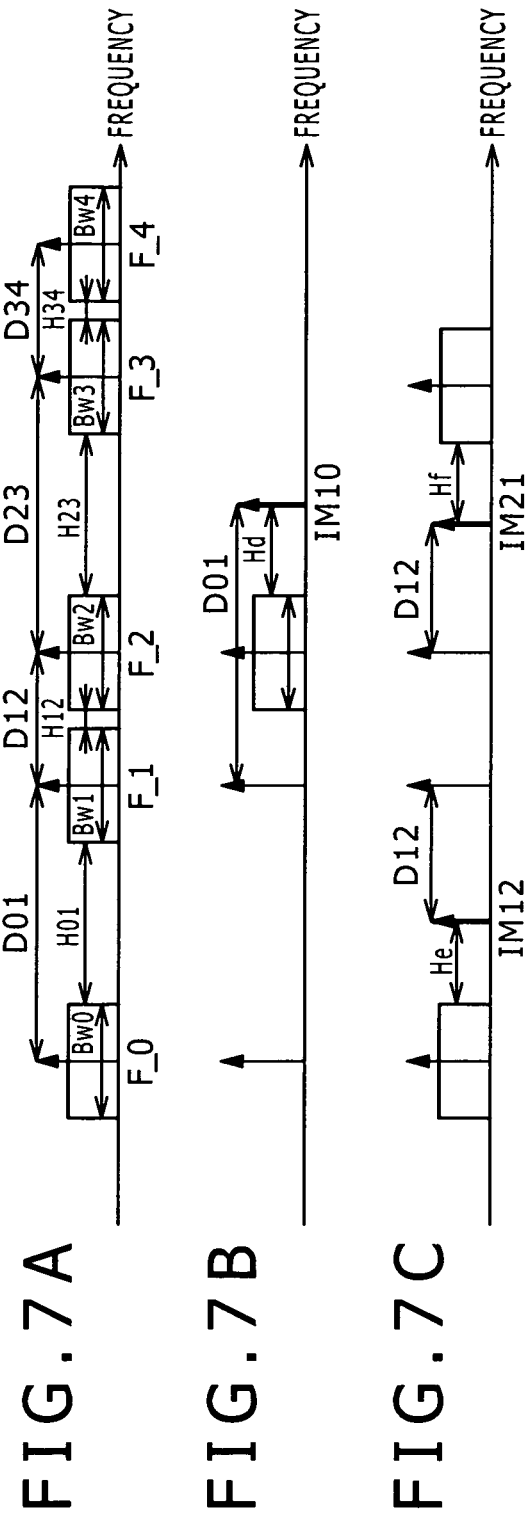

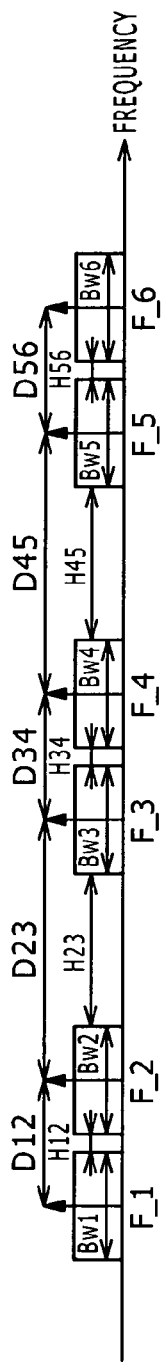
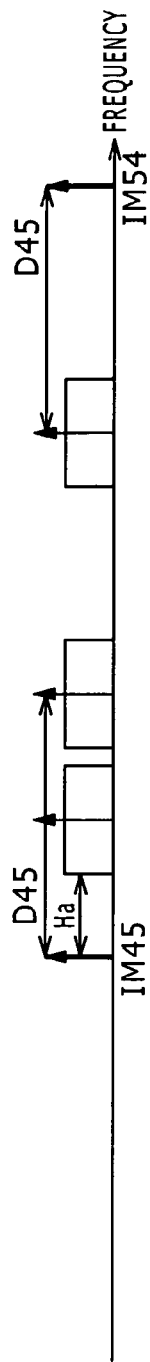
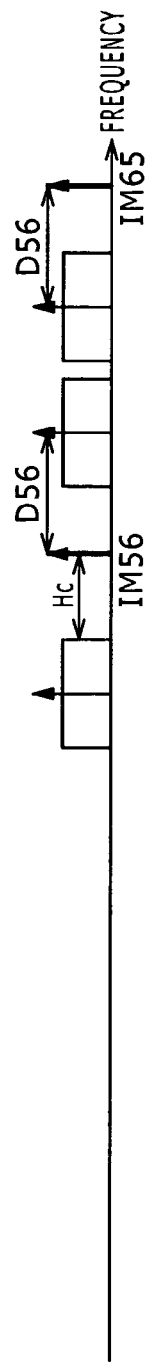

FIG. 8C $Bw@\_L=Bw@\_H=Bw@/2:@=1,2,3,4,5,6$
LETTING $D12<D23$, $D34<D23$, $D34<D45$, $D56<D45$, AND $D56<D67$, $Bw1/2+Bw2/2<D12<D23-(Bw1$ OR $Bw3$ WHICHEVER IS GREATER$)/2$ $Bw3/2+Bw4/2<D34<D23-(Bw2$ OR $Bw3$ WHICHEVER IS GREATER$)/2$ OR
$D45-(Bw3$ OR $Bw5$ WHICHEVER IS GREATER$)/2$ WHICHEVER IS SMALLER $Bw5/2+Bw6/2<D56<D45-(Bw4$ OR $Bw6$ WHICHEVER IS GREATER$)/2$ OR
$D67-(Bw5$ OR $Bw7$ WHICHEVER IS GREATER$)/2$ WHICHEVER IS SMALLER

LETTING $Bw1=Bw2=Bw3=Bw4=Bw5=Bw6=Bw7=Bw$, AND LETTING $D12=D34=D56$, $D23=D45=D67$,
$Bw<D12<D23-Bw/2$

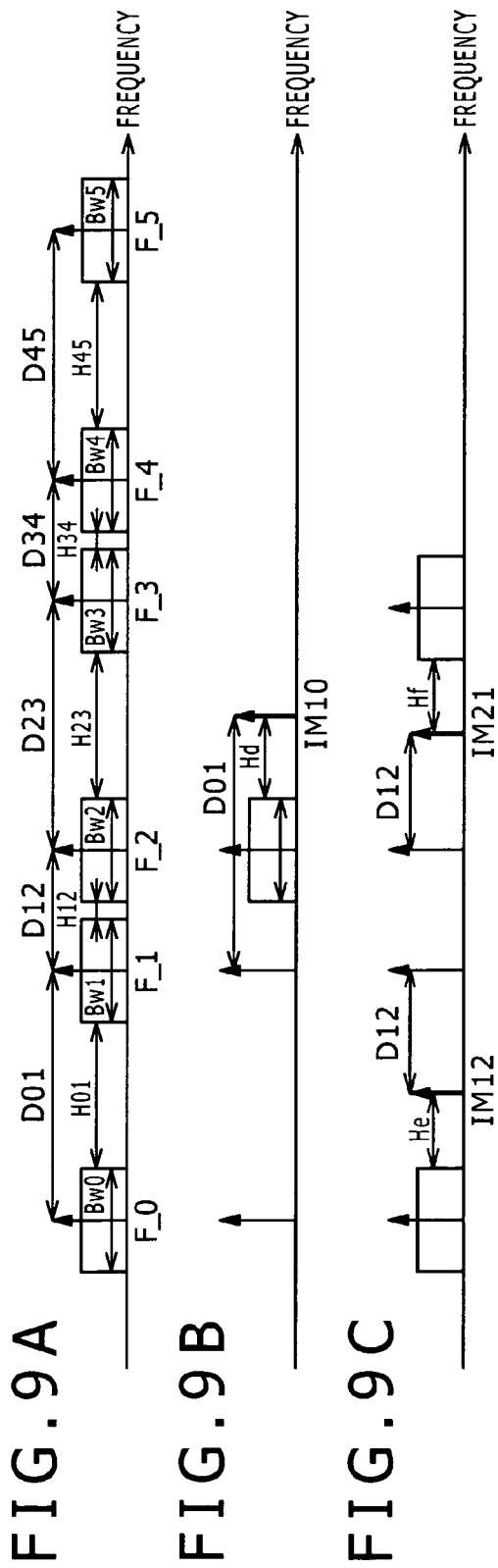

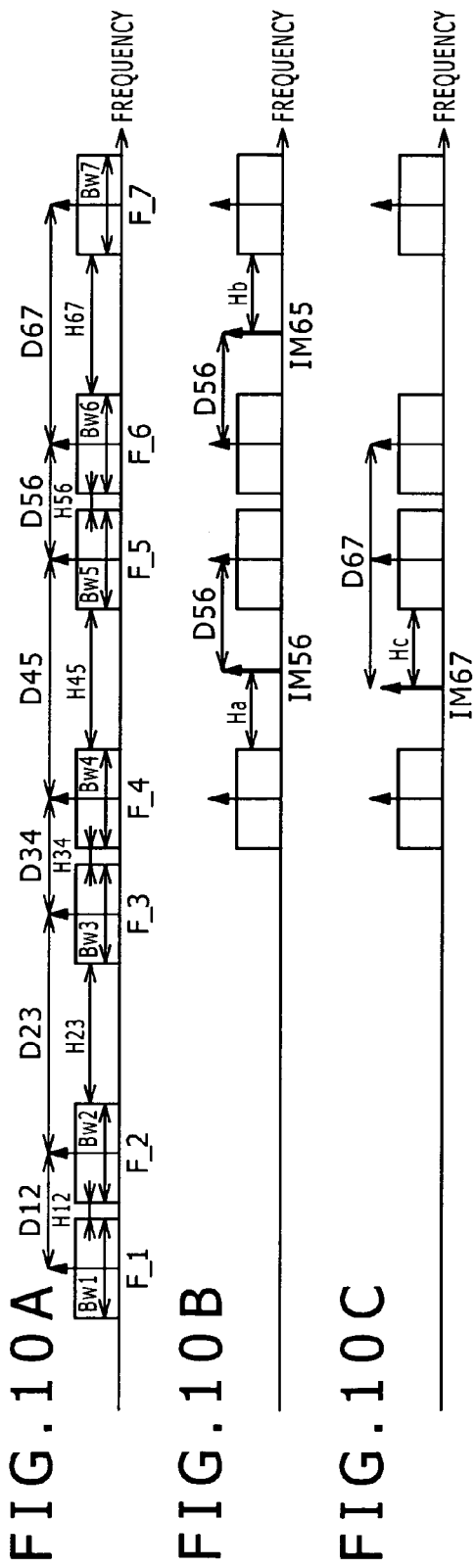

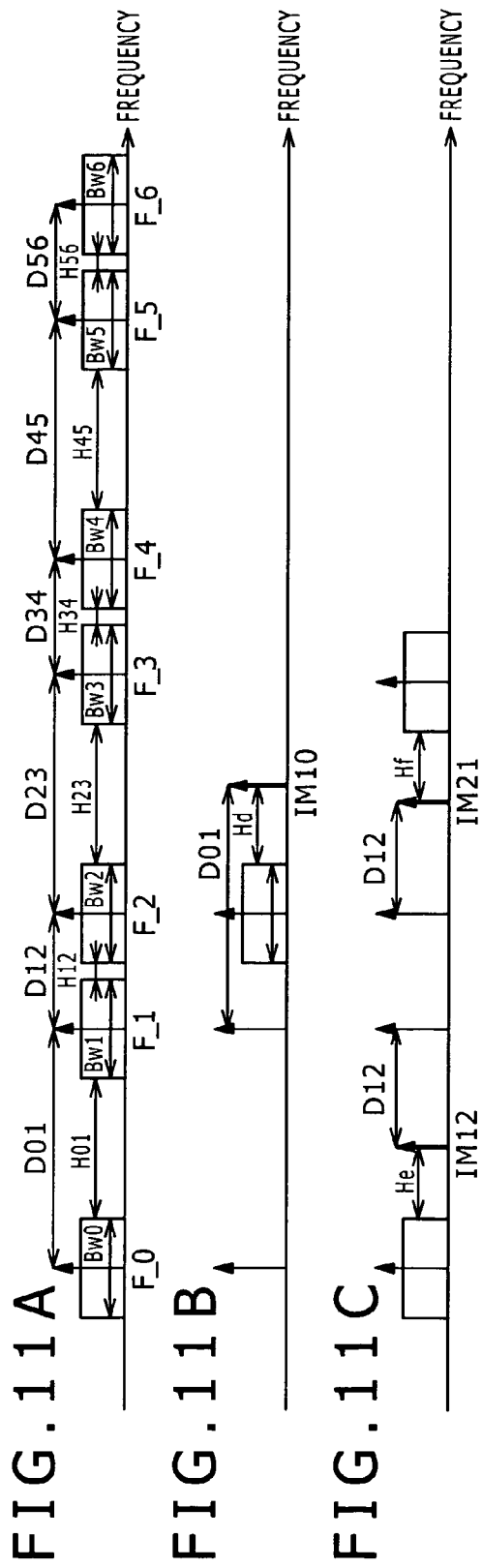

D12<D23
Bw1/2+Bw2/2<D12<X
X=D23-(Bw1 OR Bw3 WHICHEVER IS GREATER)/2

LETTING Bw0=Bw1=Bw2=Bw3=Bw,
Bw<D12<D23-Bw/2

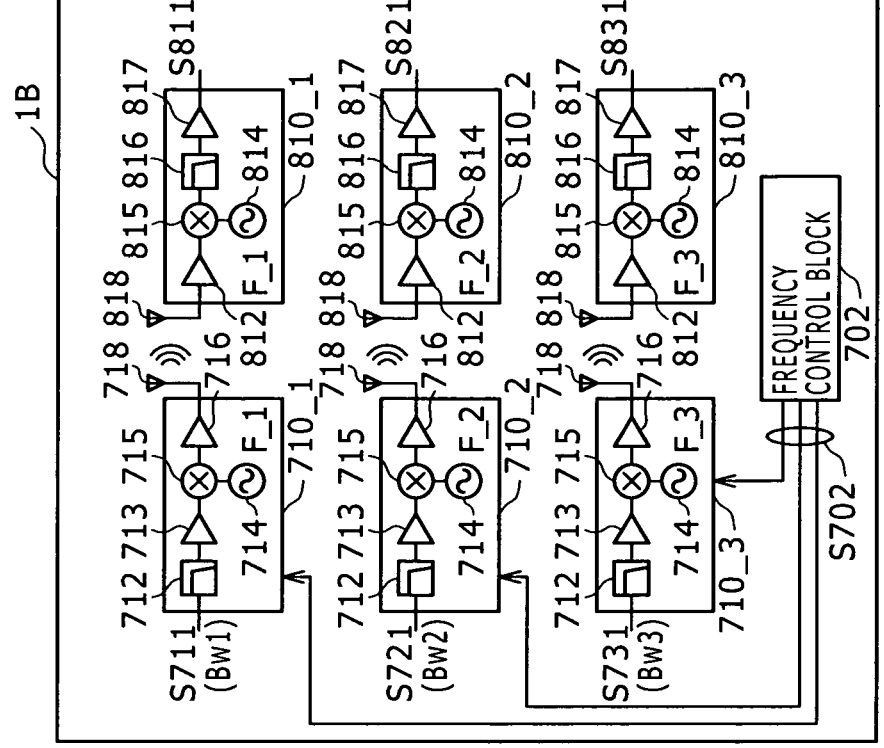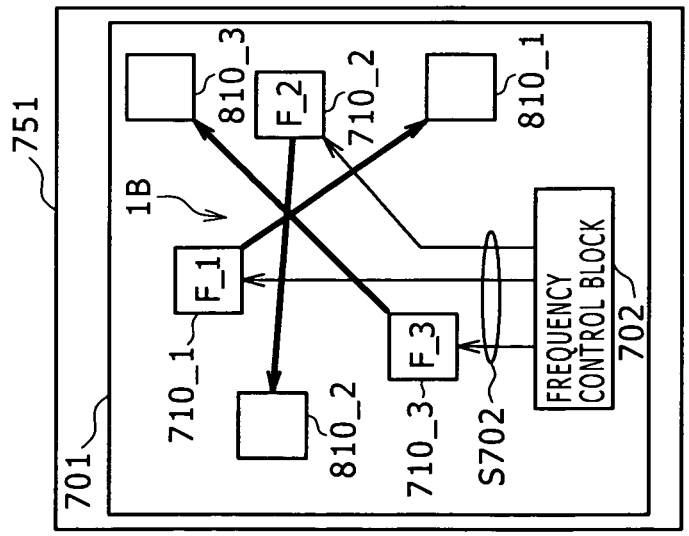
FIG. 13B
FIG. 13A

FIG.18A
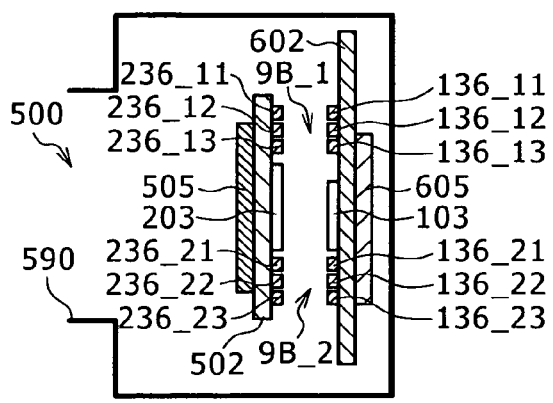
FIG.18B
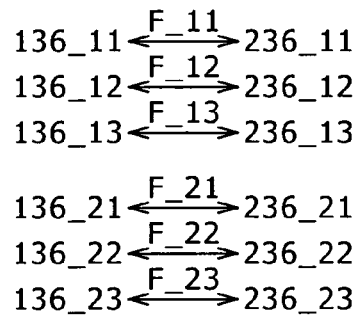
FIG.18C
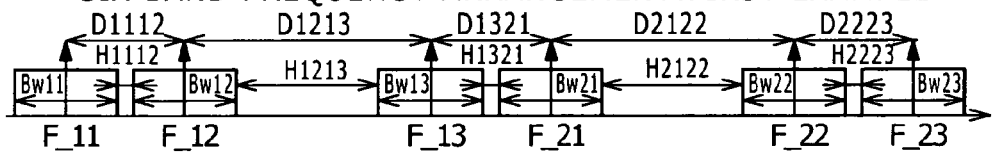
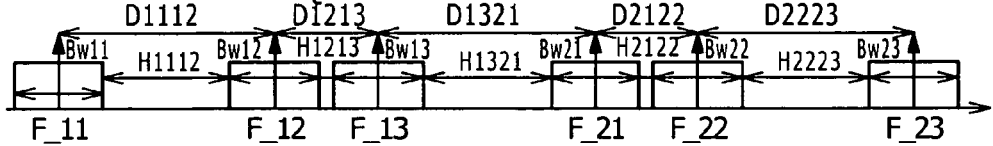

FIG.19A       FIG.19B
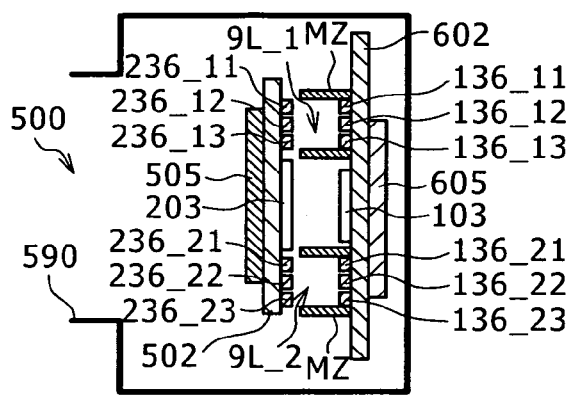
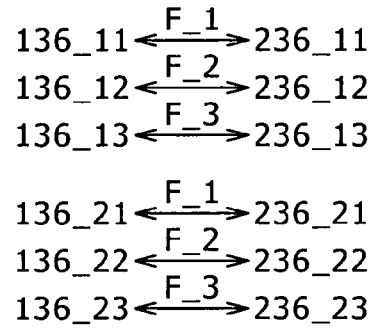
FIG.19C
THREE-BAND FREQUENCY
ARRANGEMENT:
FIRST EXAMPLE
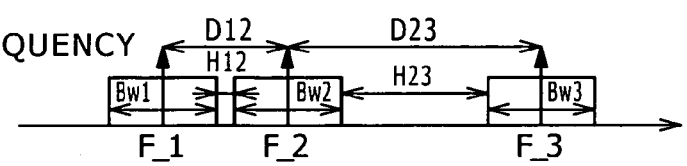
THREE-BAND FREQUENCY
ARRANGEMENT:
SECOND EXAMPLE
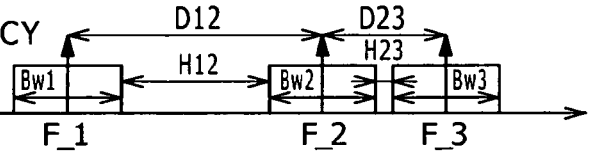

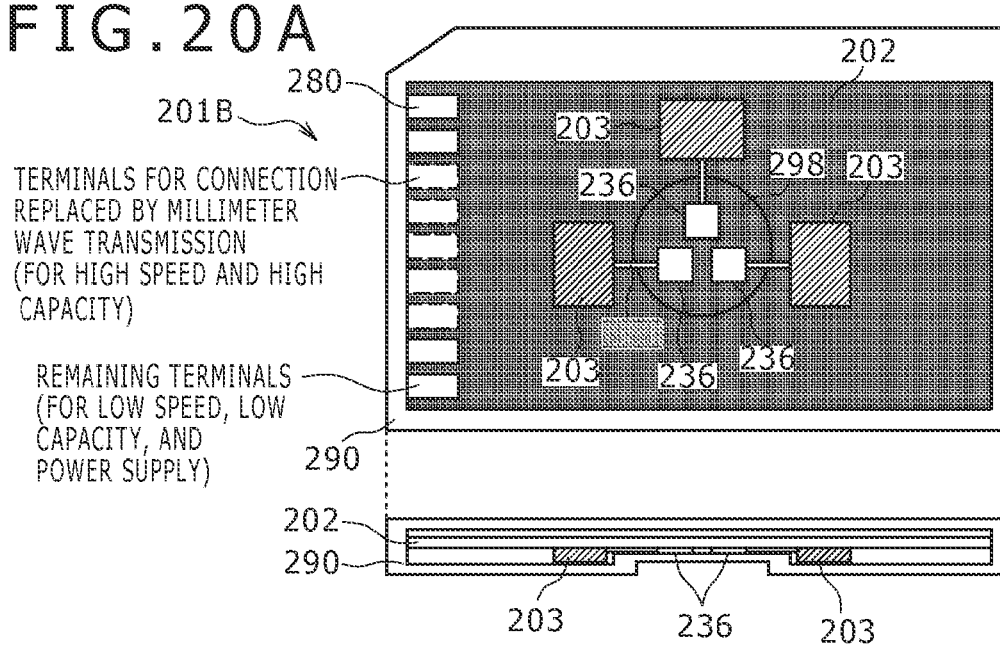
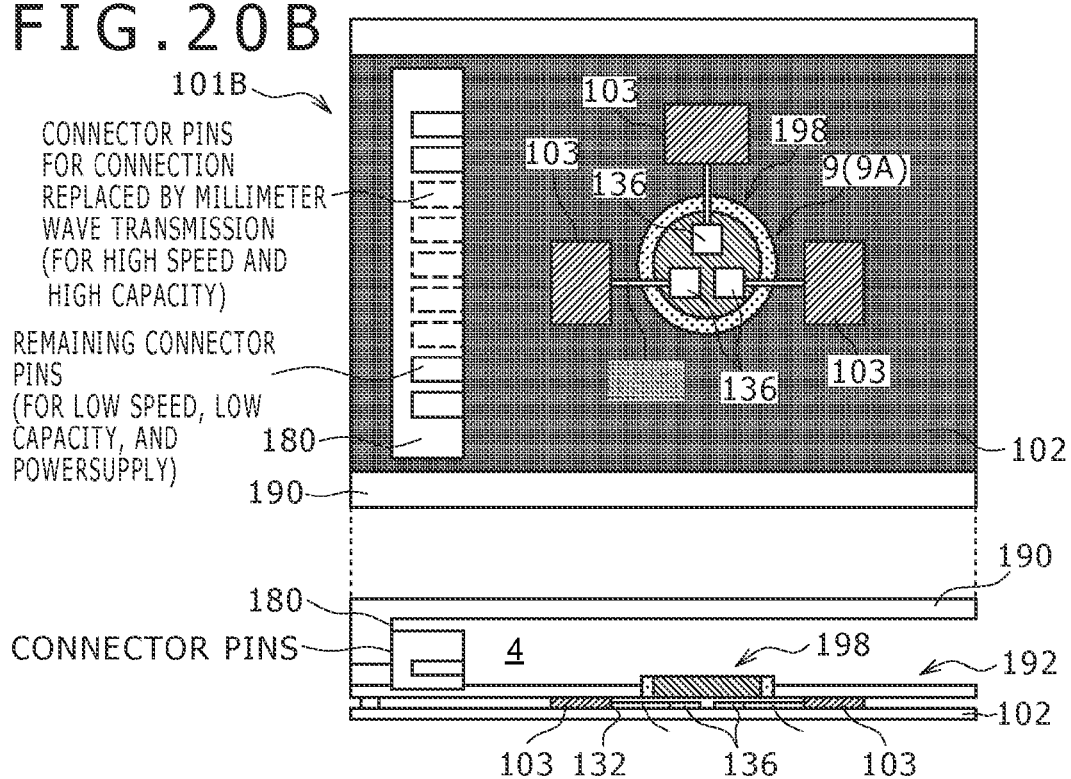
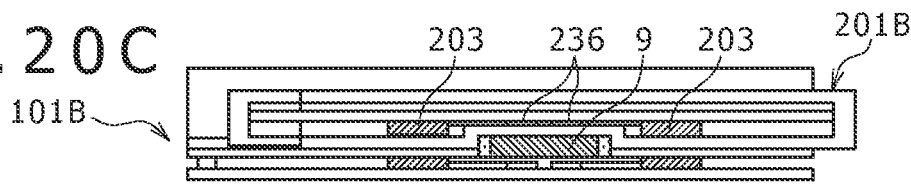

IMAGE REPRODUCING
DEVICE 201K

IMAGE OBTAINING
DEVICE 101K

MOUNTED STATE

FULL-DUPLEX SYSTEM BASED ON FREQUENCY DIVISION MULTIPLEXING SYSTEM

SIGNAL FREQUENCY DIVISION MULTIPLEXING SYSTEM

FREQUENCY DIVISION MULTIPLEXING SYSTEM +MULTIPLE CHANNELS (N1≠N2)

FREQUENCY DIVISION MULTIPLEXING SYSTEM +FULL-DUPLEX SYSTEM + MULTIPLE CHANNELS (N=N1=N2)

SIGNAL TRANSMISSION APPARATUS, ELECTRONIC DEVICE, AND SIGNAL TRANSMISSION METHOD

BACKGROUND

The present disclosure relates to a signal transmission apparatus, an electronic device, and a signal transmission method, and particularly to modulation distortion ("intermodulation distortion" in particular) occurring due to the nonlinearity of a circuit member.

Not only transmission between one set of a transmitter and a receiver using one carrier frequency but also signal transmission with a combination of a plurality of frequencies may be made within a communication area. For example, there are a case in which a frequency division multiplexing system is applied (two carrier frequencies are used) and bidirectional simultaneous communication is performed between one set of communicating devices, and there is a case in which communication (unidirectional communication or bidirectional communication) is performed with respective different carrier frequencies used between a plurality of communicating devices. There is also a case in which one set of communicating devices has a plurality of sets of modulating circuits and demodulating circuits and makes multicarrier (MC) transmission as one of methods for lowering a symbol rate, as typified by OFDM (Orthogonal Frequency Division Multiplexing) transmission.

In any case, regardless of the number of sets of communicating devices, a plurality of sets of modulating circuits and demodulating circuits are provided, and simultaneous communication is performed with the sets of the modulating circuits and the demodulating circuits using respective different carrier frequencies. When transmission is made with a combination of the plurality of frequencies, modulation distortion occurring due to the nonlinearity (nonlinear operation) of a circuit member such as an amplifier, a frequency mixing section (mixer) or the like degrades reception quality. For example, when signals of two carrier frequencies totally unrelated to a desired wave (own station) are received and input to an amplifying circuit or a frequency mixing circuit having nonlinearity, a signal (disturbing wave component) of a difference between the two carrier frequencies is also output. At this time, when the difference between the two carrier frequencies is present in the vicinity of the frequency of the desired wave, there occurs a problem of "intermodulation distortion" in that the disturbing wave component is also demodulated. Typically, when signals of a plurality of frequencies adjacent to the reception band of the own station are received, and the amplifier or the frequency mixing section has poor linear performance, third-order distortion occurs within the reception band (it usually suffices to consider only the first-order component of a modulated signal), and greatly degrades reception quality.

For example, Japanese Patent Laid-Open No. Sho 55-38777 proposes a method of disposing the frequency of narrow-band modulation at a position of an integral multiple of the reception bandwidth of spectrum spreading modulation as a method for relaxing the performance of a receiver in a case of a combination of spectrum spread and narrow-band modulation. However, when a plurality of narrow-band modulations are used, the third-order distortion of the plurality of narrow-band modulations occurs within the band of the spectrum spreading modulation, and it is not possible to adapt to a plurality of spectrum spreading modulations.

SUMMARY

A method of adding a band-pass filter having wavelength selectivity to the input section of a receiving circuit, for example, is known as a method for preventing the problem of "intermodulation distortion." However, this method invites an increase in cost by an amount corresponding to the band-pass filter, an increase in board area, and the like. In addition, because the band limiting filter generally acts only on fixed frequencies, it is difficult to use the band limiting filter while varying corresponding frequencies, and it is necessary to prepare the band limiting filter for each communication channel (that is, carrier frequency: hereinafter referred to also as a "band").

A method of remedying the "nonlinear operation of the circuit member," which is a very cause of occurrence of intermodulation distortion, is known as another method for preventing the problem of "intermodulation distortion." This method does not involve the addition of a circuit member. A measure such as increasing a bias current or optimizing a DC bias point, for example, is effective in enhancing the linear performance of the circuit, or making the circuit operate in a linear region as much as possible. However, this measure invites an increase in power supply voltage and an increase in power consumption. Alternatively, an expensive circuit member with excellent linearity may be used. However, even when an expensive circuit member is used, the nonlinearity of the circuit member cannot be theoretically reduced to zero.

As described above, the methods in the past for preventing the problem of "intermodulation distortion" are intended to deal with the problem only from an aspect of a circuit member, but cannot be said to be universal methods in terms of cost and size, power supply voltage and power consumption, or the like.

It is desirable to provide techniques that can prevent the problem of "intermodulation distortion" from an aspect of other than a circuit member.

A signal transmission apparatus according to a first embodiment of the present disclosure includes a plurality of first communicating units for transmitting a transmission object signal as a radio signal and a plurality of second communicating units for receiving the radio signals transmitted from the first communicating units. Specifically, the first communicating units are provided with a modulating section for modulating a transmission object signal, and the second communicating units are provided with a demodulating section for demodulating the modulated signal modulated by the modulating section. That is, the signal transmission apparatus is formed by providing a plurality of modulating sections for modulating a transmission object signal and a plurality of demodulating sections for demodulating the modulated signals modulated by the modulating sections. Each signal transmission apparatus described in the dependent claims of the signal transmission apparatus according to the first embodiment of the present disclosure defines additional advantageous concrete examples of the signal transmission apparatus according to the first embodiment of the present disclosure.

An electronic device according to a second embodiment of the present disclosure relates to so-called intra-device signal transmission. The electronic device includes, within one casing, a plurality of first communicating units for transmitting a transmission object signal as a radio signal and a plurality of second communicating units for receiving the radio signals transmitted from the first communicating units. Specifically, the first communicating units are provided with a modulating section for modulating a transmission object signal, and the second communicating units are provided with a demodulating section for demodulating the modulated signal modulated by the modulating section. That is, the electronic device is formed by arranging, within one casing, a plurality of modulating sections for modulating a transmission object signal and a plurality of demodulating sections for demodulating the modulated signals modulated by the modulating sections. A radio signal transmission line for allowing the modulated signals modulated by the modulating sections to be transmitted as radio signals is formed within the electronic device.

An electronic device according to a third embodiment of the present disclosure relates to so-called inter-device signal transmission. The whole of one electronic device is formed by including: a first electronic device including at least a plurality of sections of modulating sections for modulating a transmission object signal and demodulating sections for demodulating the modulated signals modulated by the modulating sections, the plurality of sections being disposed within one casing of the first electronic device; and a second electronic device including a demodulating section corresponding to each modulating section of the first electronic device and a modulating section corresponding to each demodulating section of the first electronic device, the demodulating section corresponding to each modulating section of the first electronic device and the modulating section corresponding to each demodulating section of the first electronic device each being disposed within one casing of the second electronic device. That is, one of the modulating section and the demodulating section of each of sets of modulating sections and demodulating sections is disposed in the first electronic device, and the other of the modulating section and the demodulating section is disposed in the second electronic device, and a plurality of such sets of modulating sections and demodulating sections are provided to form the whole of one electronic device. There may be any of the following cases: a case in which all of the modulating sections are disposed in the first electronic device and all of the demodulating sections are disposed in the second electronic device; a case in which all of the modulating sections are disposed in the second electronic device and all of the demodulating sections are disposed in the first electronic device; and a case in which the modulating sections of a part of the sets and the demodulating sections of the other sets are disposed in the first electronic device, and the demodulating sections corresponding to the modulating sections of the part of the sets and the modulating sections corresponding to the demodulating sections of the other sets are disposed in the second electronic device. When the first electronic device and the second electronic device are disposed at determined positions, a radio signal transmission line for allowing the modulated signals modulated by the modulating sections to be transmitted as radio signals is formed.

In a signal transmission method according to a fourth embodiment of the present disclosure, a plurality of modulating sections for modulating a transmission object signal and a plurality of demodulating sections for demodulating the modulated signals modulated by the modulating sections are provided.

Then, carrier frequencies used by the respective sets of the modulating sections and the demodulating sections in each of the signal transmission apparatus according to the first embodiment of the present disclosure, the electronic device according to the second embodiment of the present disclosure, the electronic device according to the third embodiment of the present disclosure, and the signal transmission method according to the fourth embodiment of the present disclosure are frequencies different from each other. As a matter of course, the plurality of sets of the modulating sections and the demodulating sections are provided, and signal transmission is made by radio (radio waves in particular) with the sets using the carrier frequencies as the frequencies different from each other.

In this case, as to the carrier frequencies as the frequencies different from each other used by the respective sets of the modulating sections and the demodulating sections, 1) each carrier frequency is set such that the frequency of an intermodulation distortion component generated on the basis of two carrier frequencies adjacent to each other is not present within any of the reception bands of modulated signals based on each of the other carrier frequencies, and 2) preferably, each carrier frequency is set such that the respective reception bands of modulated signals based on the respective carrier frequencies do not overlap each other.

A plurality of sets of modulating sections (modulating circuits) and demodulating sections (demodulating circuits) are provided, and in making signal transmission by radio (radio waves in particular) with the sets using carrier frequencies as frequencies different from each other, intermodulation distortion demodulated when the signals of two carrier frequencies totally unrelated to a desired wave (own station) are received (that is, come into the reception band of the own station) is taken as a problem. Thus, at least three carrier frequencies are used. Hence, directing attention to three carrier frequencies adjacent to each other, it suffices to satisfy the condition of 1) and preferably satisfy the condition of 2) too. In addition, when four or more carrier frequencies are used, it suffices for each of combinations of three carrier frequencies adjacent to each other of the four or more carrier frequencies to satisfy the condition of 1) and preferably satisfy the condition of 2) too.

A method according to an embodiment of the present disclosure can also be implemented by software using an electronic calculator (computer), and a program for implementing the method and a recording medium storing the program can be extracted as embodiments. The program may be provided in a state of being stored on a computer readable storage medium, or may be provided by distribution via wire or radio communicating means.

According to the present technology, the problem of "intermodulation distortion" is prevented from an aspect of arrangement of carrier frequencies used when a plurality of sets of modulating circuits and demodulating circuits are provided and signal transmission is made by radio (radio waves in particular) with the respective sets using the carrier frequencies as frequencies different from each other. Thus, the problem of "intermodulation distortion" can be prevented even when a circuit member is not added or changed.

BRIEF DESCRIPTION OF THE DRAWINGS

FIGS. 2A to 2C are diagrams of assistance in explaining a first example of three-band frequency arrangement;

FIGS. 5A to 5C are diagrams of assistance in explaining a second example of four-band frequency arrangement;

FIGS. 7A to 7C are diagrams of assistance in explaining a second example of five-band frequency arrangement;

FIGS. 8A to 8C are diagrams of assistance in explaining a first example of six-band frequency arrangement;

FIGS. 9A to 9C are diagrams of assistance in explaining a second example of six-band frequency arrangement;

FIGS. 10A to 10C are diagrams of assistance in explaining a first example of seven-band frequency arrangement;

FIGS. 11A to 11C are diagrams of assistance in explaining a second example of seven-band frequency arrangement;

FIGS. 13A and 13B are diagrams of assistance in explaining a second embodiment;

FIGS. 18A to 19C are diagrams of assistance in explaining a first example of an electronic device according to a sixth embodiment;

FIGS. 20A to 20C are diagrams of assistance in explaining a second example of an electronic device according to the sixth embodiment;

DETAILED DESCRIPTION OF THE PREFERRED EMBODIMENTS

Figure 1:
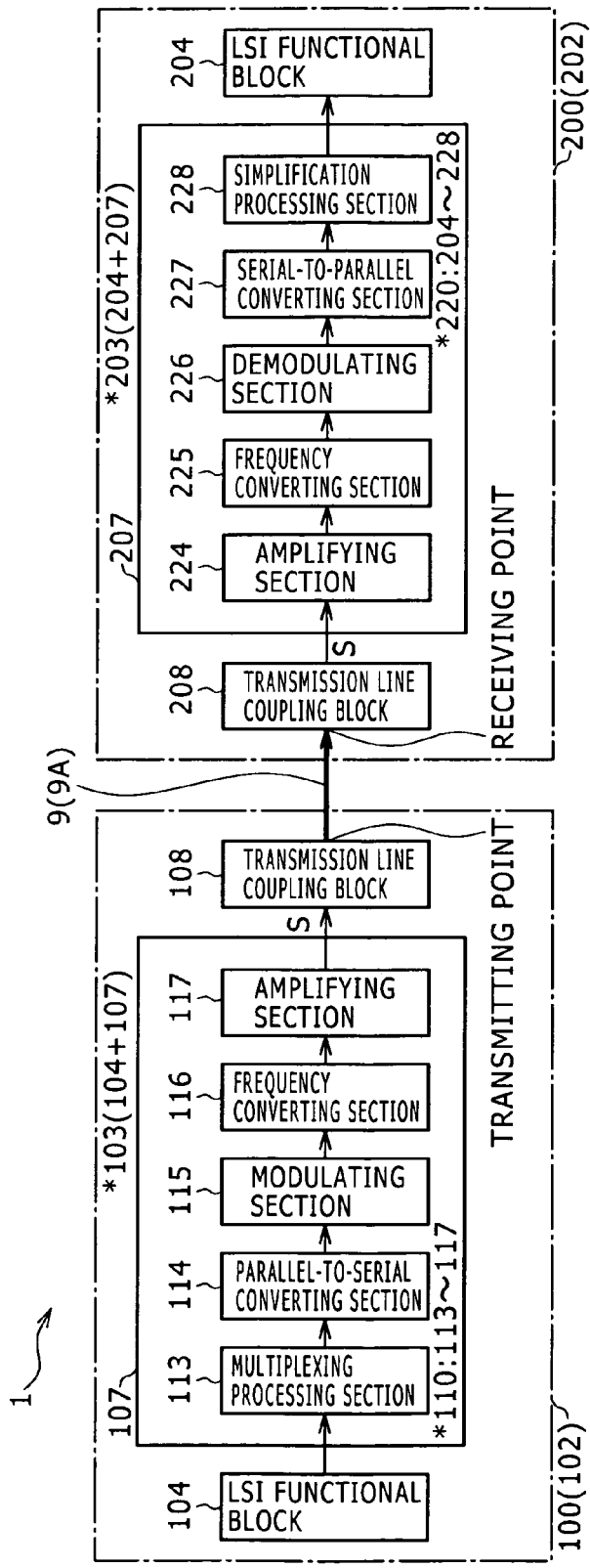
FIG. 1 shows a basic configuration of assistance in explaining a signal interface of a signal transmission apparatus according to a present embodiment from an aspect of a functional configuration.

Preferred embodiments of the present disclosure will hereinafter be described in detail with reference to the drawings. When each functional element is distinguished by form, the functional element will be described with a capital alphabetical reference such as A, B, C . . . attached thereto. The reference will be omitted when each functional element is described without being particularly distinguished. The same is true for the drawings.

Description will be made in the following order.
1. General Outlines
2. Communication Processing System: Basics
3. Three-Band Frequency Arrangement
4. Four-Band Frequency Arrangement
5. Five-Band Frequency Arrangement
6. Six-Band Frequency Arrangement
7. Seven-Band Frequency Arrangement
8. Concrete Examples of Application
First Embodiment: Transmission within Same Board and No Control (Presetting)
Second Embodiment: Transmission within Same Board and Control on Transmitting Side
Third Embodiment: Transmission within Same Board and Control on Transmitting Side and on Receiving Side
Fourth Embodiment: Transmission between Boards within One Electronic Device and Control
Fifth Embodiment: Transmission between Devices and Control
Sixth Embodiment: Cases of Application to Electronic Devices
9. Comparisons with Comparative Examples
10. Communication Processing System: Examples of Modification (Presetting of Frequency Arrangement)
<General Outlines>
[Signal Transmission Apparatus and Signal Transmission Method]

In the configuration of a present embodiment corresponding to a first to a fourth mode of the present disclosure, a signal transmission apparatus (referred to also as a radio transmission apparatus) or an electronic device is formed by providing one or a plurality of first communicating units for transmitting a transmission object signal as a radio signal and one or a plurality of second communicating units for receiving the radio signal(s) transmitted from the one or the plurality of first communicating units. A first communicating unit performing a transmitting function transmits a transmission object signal as a radio signal. A second communicating unit performing a receiving function receives the radio signal transmitted from the first communicating unit. The first communicating unit is provided with a modulating section for modulating the transmission object signal. The second communicating unit is provided with a demodulating section for demodulating the modulated signal modulated by the modulating section. A plurality of such modulating sections and a plurality of such demodulating sections are provided to form a signal transmission apparatus. Incidentally, a member (so-called bandpass filter) having wavelength selectivity that allows a desired wave to pass through but which suppresses other waves is generally provided between an antenna and a receiving circuit (second communicating unit). However, the present embodiment does not need a member having such wavelength selectivity.

Irrespective of the number of sets of first communicating units and second communicating units (in other words, the number of sets of transmission and reception pairs), suppose that a plurality of sets of modulating sections and demodulating sections are provided, and that carrier frequencies used by the respective sets of modulating sections and demodulating sections are respective different frequencies. In this case, each of the carrier frequencies as respective different frequencies is set such that the frequency of an intermodulation distortion component generated on the basis of two carrier frequencies adjacent to each other is not present within any of the reception bands of modulated signals based on each of the other carrier frequencies.

Effects of degradation in reception performance of the receiving circuit due to intermodulation distortion can be avoided by frequency arrangement without changing the receiving circuit. Because effects of intermodulation distortion can be avoided by frequency arrangement, a need for a band limiting filter having a high degree of selectivity is eliminated, and a receiving circuit of a small size can be formed at a low cost. Because effects of intermodulation distortion can be avoided by frequency arrangement, the distortion performance of the receiving circuit can be relaxed, and a configuration of a small size with low power consumption suffices.

In making signal transmission by transmitting a modulated signal modulated by a modulating section as a radio signal, receiving the radio signal, and inputting the radio signal to a demodulating section, each of the carrier frequencies as respective different frequencies used by the respective sets of modulating sections and demodulating sections is preferably set such that the respective reception bands of modulated signals based on the respective carrier frequencies do not overlap each other.

A plurality of sets of modulating circuits and demodulating circuits are provided, and in making signal transmission by radio (radio waves in particular) using carrier signals of respective different frequencies for the respective sets, an intermodulation distortion demodulated when the signals of two carrier frequencies totally unrelated to a desired wave (own station) come into the reception band of the own station is taken as a problem. Thus, at least three carrier frequencies are used. It suffices to determine a frequency arrangement with attention directed to three carrier frequencies adjacent to each other. In this case, the following conditions are desirably satisfied for the three carrier frequencies adjacent to each other.

[First Condition]

Letting a first frequency difference $\Delta 1$ be a difference between the lowest carrier frequency F_L and the intermediate carrier frequency F_M of the three carrier frequencies, and letting a second frequency difference $\Delta 2$ be a difference between the highest carrier frequency F_H and the intermediate carrier frequency F_M of the three carrier frequencies, a sum of a reception bandwidth F_a_U on a high-frequency side of a modulated signal based on a carrier frequency F_a on a low-frequency side, the carrier frequency F_a defining a smaller frequency difference $\Delta S$ of the first frequency difference $\Delta 1$ and the second frequency difference $\Delta 2$, and a reception bandwidth F_b_L on a low-frequency side of a modulated signal based on a carrier frequency F_b on a high-frequency side, the carrier frequency F_b defining the smaller frequency difference $\Delta S$ of the first frequency difference $\Delta 1$ and the second frequency difference $\Delta 2$, is smaller than the smaller frequency difference $\Delta S$ of the first frequency difference $\Delta 1$ and the second frequency difference $\Delta 2$. The first condition can be expressed by Equation (A).

$$\text{``}F\_a\_U\text{''}+\text{``}F\_b\_L\text{''}<\Delta S \tag{A}$$

[Second Condition]

When the first frequency difference $\Delta 1$ is smaller than the second frequency difference $\Delta 2$, a difference "$|\Delta 1-\Delta 2|$" between the first frequency difference $\Delta 1$ and the second frequency difference $\Delta 2$ is larger than a greater reception bandwidth of the reception bandwidth F_L_L on a low-frequency side of a modulated signal based on the lowest carrier frequency F_L and the reception bandwidth F_H_L on a low-frequency side of a modulated signal based on the highest carrier frequency F_H. The second condition can be expressed by Equation (B).

$$\text{``}F\_L\_L\text{'' or ``}F\_H\_L\text{'' whichever is greater}<|\Delta 1-\Delta 2| \tag{B}$$

[Third Condition]

When the first frequency difference $\Delta 1$ is larger than the second frequency difference $\Delta 2$, the difference "$|\Delta 1-\Delta 2|$" between the first frequency difference $\Delta 1$ and the second frequency difference $\Delta 2$ is larger than a greater reception bandwidth of the reception bandwidth F_L_H on a high-frequency side of the modulated signal based on the lowest carrier frequency F_L and the reception bandwidth F_H_H on a high-frequency side of the modulated signal based on the highest carrier frequency F_H. The third condition can be expressed by Equation (C).

$$\text{``}F\_L\_H\text{'' or ``}F\_H\_H\text{'' whichever is greater}<|\Delta 1-\Delta 2| \tag{C}$$

Letting $\Delta L$ be the larger frequency difference of the first frequency difference $\Delta 1$ and the second frequency difference $\Delta 2$, "$|\Delta 1-\Delta 2|$"=$\Delta L-\Delta S$. Thus, Equation (A) representing the first condition and Equation (B) representing the second condition can be collectively expressed by Equation (D).

$$\text{``}F\_a\_U\text{''}+\text{``}F\_b\_L\text{''}<\Delta S<\Delta L-\alpha \tag{D}$$

where $\alpha=$"F_L_L" or "F_H_L" whichever is greater.

Letting $\Delta L$ be the larger frequency difference of the first frequency difference $\Delta 1$ and the second frequency difference $\Delta 2$, "$|\Delta 1-\Delta 2|$"=$\Delta L-\Delta S$. Thus, Equation (A) representing the first condition and Equation (C) representing the third condition can be collectively expressed by Equation (E).

$$\text{``}F\_a\_U\text{''}+\text{``}F\_b\_L\text{''}<\Delta S<\Delta L-\beta \tag{E}$$

where $\beta=$"F_L_H" or "F_H_H" whichever is greater.

When four or more carrier frequencies are used, as a first aspect, it is desirable that for any of combinations of three carrier frequencies adjacent to each other of the four or more carrier frequencies, the first condition be satisfied, and the second condition be satisfied when the first frequency difference $\Delta 1$ is smaller than the second frequency difference $\Delta 2$ and the third condition be satisfied when the first frequency difference $\Delta 1$ is larger than the second frequency difference $\Delta 2$.

When four or more carrier frequencies are used, as a second aspect, for any of combinations of three carrier frequencies adjacent to each other of the four or more carrier frequencies, the following conditions are desirably satisfied.

[Fourth Condition]

An intermodulation wave generated on a lower-frequency side than the lowest carrier frequency of the three carrier frequencies, the intermodulation wave being one of intermodulation waves generated on the basis of the lowest carrier frequency and the intermediate carrier frequency of the three carrier frequencies, is not present within the band of a modulated signal based on a carrier frequency on a lower-frequency side than the lowest carrier frequency.

[Fifth Condition]

An intermodulation wave generated on a higher-frequency side than the highest carrier frequency of the three carrier frequencies, the intermodulation wave being one of intermodulation waves generated on the basis of the highest carrier frequency and the intermediate carrier frequency of the three carrier frequencies, is not present within the band of a modulated signal based on a carrier frequency on a higher-frequency side than the highest carrier frequency.

The fourth condition and the fifth condition specify that also when four or more carrier frequencies are used, the frequency of an intermodulation distortion component generated on the basis of two carrier frequencies adjacent to each other is not present within any of the reception bands of modulated signals based on each carrier frequency.

Preferably, a transmission characteristic between transmission and reception is known, and at least one of the first communicating unit and the second communicating unit includes a signal processing section for performing predetermined signal processing on a basis of a setting value and a setting value processing section for inputting the setting value for the predetermined signal processing to the signal processing section. A transmission characteristic between the first communicating unit and the second communicating unit can be determined in advance in an environment in which transmission conditions between transmission and reception are not essentially varied (that is, fixed) as in a case where the arrangement positions of the first communicating unit and the second communicating unit within one casing are not changed (a case of intra-device communication) or as in a case where even when the first communicating unit and the second communicating unit are disposed within respective separate casings, the first communicating unit and the second communicating unit in a state of being used are in predetermined arrangement positions (a case of radio transmission between devices at a relatively short distance from each other), for example.

In an environment in which transmission conditions between transmission and reception are not essentially varied (that is, fixed), even when the setting value defining the operation of the signal processing section is treated as a fixed value, that is, even when a parameter setting is fixed, the signal processing section can be operated without any inconvenience. When the setting value for signal processing is a predetermined value (that is, a fixed value), the parameter setting does not need to be changed dynamically. Thus, a parameter calculating circuit can be reduced, and also power consumption can be reduced. In radio transmission within a device or between devices at a relatively short distance from each other, a communication environment is fixed, so that various circuit parameters can be determined in advance, and in an environment in which transmission conditions are fixed, even when the setting value defining the operation of the signal processing section is treated as a fixed value, that is, even when the parameter setting is fixed, the signal processing section can be operated without any inconvenience. For example, by determining an optimum parameter in advance and retaining the parameter within a device at a time of shipment from a factory, it is possible to reduce the parameter calculating circuit and reduce power consumption.

There are various parameter settings for signal processing. For example, in relation to a case of simultaneous communication using a plurality of carrier frequencies different from each other, there are settings of a carrier frequency for modulation and a carrier frequency for demodulation. As another example of parameter settings for signal processing, there are a gain setting (signal amplitude setting) for a signal amplifying circuit (amplitude adjusting section), a setting of an amount of phase adjustment, a setting of a frequency characteristic, and the like. The gain setting is used for a transmission power setting, a reception level setting input to a demodulation functional part, automatic gain control (AGC), and the like. The setting of the amount of phase adjustment is used to adjust a phase according to an amount of delay of a transmission signal in a system in which a carrier signal and a clock are transmitted separately. The setting of the frequency characteristic is used to emphasize the amplitude of a low-frequency component or a high-frequency component in advance on a transmitting side.

Preferably, all of the modulating sections and the demodulating sections are arranged on one circuit board. This facilitates the creation of an environment in which transmission conditions between transmission and reception are not essentially changed (that is, fixed), and is convenient for fixing the carrier frequencies to be used in advance.

Even in the case where all of the modulating sections and the demodulating sections are arranged on one circuit board, a control section for changing the carrier frequencies used by the respective modulating sections for transmission may be provided. By controlling only the carrier frequencies on the transmitting side, appropriate frequency allocation can be made, and optimum control can be performed so as to prevent the effects of intermodulation distortion surely.

Even in the case where all of the modulating sections and the demodulating sections are arranged on one circuit board, a control section for changing the carrier frequencies used by the respective demodulating sections for reception may be provided. By controlling only the carrier frequencies on the receiving side, appropriate frequency allocation can be made, and optimum control can be performed so as to prevent the effects of intermodulation distortion surely.

Even in the case where all of the modulating sections and the demodulating sections are arranged on one circuit board, a control section for changing the carrier frequencies used by the respective modulating sections for transmission and the carrier frequencies used by the respective demodulating sections for reception may be provided. More flexible control can be performed than in the configuration controlling only the carrier frequencies on the transmitting side or only the carrier frequencies on the receiving side.

In a case where the modulating sections and the demodulating sections are scattered on a plurality of circuit boards, a control section for changing the carrier frequencies used by the respective modulating sections for transmission is preferably provided. By controlling only the carrier frequencies on the transmitting side, appropriate frequency allocation can be made, and optimum control can be performed so as to prevent the effects of intermodulation distortion surely.

As another form in the case where the modulating sections and the demodulating sections are scattered on a plurality of circuit boards, a control section for changing the carrier frequencies used by the respective demodulating sections for reception is preferably provided. By controlling only the carrier frequencies on the receiving side, appropriate frequency allocation can be made, and optimum control can be performed so as to prevent the effects of intermodulation distortion surely.

As another form in the case where the modulating sections and the demodulating sections are scattered on a plurality of circuit boards, a control section for changing the carrier frequencies used by the respective modulating sections for transmission and the carrier frequencies used by the respective demodulating sections for reception is preferably provided. More flexible control can be performed than in the configuration controlling only the carrier frequencies on the transmitting side or only the carrier frequencies on the receiving side.

When the control section for changing the carrier frequencies is provided, a form can be adopted in which a control signal for changing the carrier frequencies is transmitted to the modulating sections or the demodulating sections by wire. This form is applicable to the case where the modulating sections and the demodulating sections are scattered on a plurality of circuit boards, but is favorably applied particularly to the case where all of the modulating sections and the demodulating sections are arranged on one circuit board. This is because a so-called wire harness is necessary for wired transmission in the case where the modulating sections and the demodulating sections are scattered on a plurality of circuit boards, whereas printed wiring suffices in the case where all of the modulating sections and the demodulating sections are arranged on one circuit board.

When the control section for changing the carrier frequencies is provided, a form can be adopted in which a control signal for changing the carrier frequencies is transmitted to the modulating sections or the demodulating sections by radio. This form is favorably applied particularly to the case where the modulating sections and the demodulating sections are scattered on a plurality of circuit boards. This is because a control signal for frequency allocation can be transmitted to each communicating device without the use of a wire harness even in a case of transmission between boards physically separated from each other. Incidentally, this form is also applicable to the case where all of the modulating sections and the demodulating sections are arranged on one circuit board. In this case, however, the application of wired transmission using printed wiring is more advantageous in terms of cost, circuit scale, and power consumption because a need for a circuit configuration for realizing radio transmission is obviated.

In the form in which the control signal for changing the carrier frequencies is transmitted to the modulating sections or the demodulating sections by radio, a band used by a radio signal of the control signal for changing the carrier frequencies is preferably outside a band used by a radio signal of the transmission object signal. In this case, it is possible to ensure reliably that the radio transmission of control information does not hinder the radio transmission of the transmission object signal.

When the band used by the radio signal of the control signal for changing the carrier frequencies is the band used by the radio signal of the transmission object signal in the form in which the control signal for changing the carrier frequencies is transmitted to the modulating sections or the demodulating sections by radio, each carrier frequency, including a carrier frequency of the radio signal of the control signal, is preferably set so as to avoid effects of degradation in reception performance of the receiving circuit due to intermodulation distortion.

When the band used by the radio signal of the control signal for changing the carrier frequencies is the band used by the radio signal of the transmission object signal in the form in which the control signal for changing the carrier frequencies is transmitted to the modulating sections or the demodulating sections by radio, a same frequency is preferably used as the carrier frequency of the control signal for changing the carrier frequencies and the carrier frequency of the transmission object signal. In this case, a pair of a modulating section and a demodulating section can be used both for the transmission of an ordinary modulated signal and for the transmission of the control signal. Because a transmission and reception pair for the transmission of the control signal does not need to be provided separately, a configuration of a small size with low power consumption can be made at a low cost.

[Electronic Device]

In an electronic device according to the present embodiment corresponding to the second mode of the present disclosure or the third mode of the present disclosure, a device configuration in a state of each part being housed in one casing can form one electronic device, or a combination of a plurality of devices (electronic devices) can form the whole of one electronic device. A signal transmission apparatus according to the present embodiment is used in an electronic device such as a digital recording and reproducing device, a terrestrial television receiving device, a portable telephone device, a game device, or a computer, for example.

Description in the following will be made supposing that the signal transmission apparatus and the electronic device according to the present embodiment mainly use carrier frequencies in a millimeter wave band (wavelengths of 1 to 10 millimeters). However, the signal transmission apparatus and the electronic device according to the present embodiment are not limited to the millimeter wave band, but are also applicable to cases of using carrier frequencies in the vicinity of the millimeter wave band such for example as a submillimeter wave band of shorter wavelengths (wavelengths of 0.1 to 1 millimeter) or a centimeter wave band of longer wavelengths (wavelengths of 1 to 10 centimeters). For example, in a case of performing simultaneous communication using a plurality of carrier frequencies different from each other, when a large number of carrier frequencies (a large number of bands) are used, and a desired communication band cannot be secured in only the millimeter wave band, a band ranging from the submillimeter wave band to the millimeter wave band, a band ranging from the millimeter wave band to the centimeter wave band, or a band ranging from the submillimeter wave band to the millimeter wave band to the centimeter wave band is used.

When a communicating device is formed, there is a case in which the communicating device has only a transmitting side (that is, a first communicating unit), a case in which the communicating device has only a receiving side (that is, a second communicating unit), or a case in which the communicating device has both a transmitting side and a receiving side. The transmitting side and the receiving side are configured to be coupled to each other via a radio signal transmission line (for example a millimeter wave signal transmission line) and make signal transmission in the millimeter wave band. A transmission object signal is transmitted after being frequency-converted into the millimeter wave band suitable for wideband transmission. However, in any case, a signal transmission apparatus is formed by a set (pair) of a first communicating unit and a second communicating unit. In the case of the present embodiment, in particular, simultaneous communication is performed using carrier frequencies different from each other, and therefore a plurality of sets (pairs) of modulating sections and demodulating sections are provided regardless of whether the number of sets (pairs) of first communicating units and second communicating units is one or more than one.

Between the first communicating unit and the second communicating unit arranged at a relatively short distance from each other, a transmission object signal is converted into a millimeter wave signal, and then the millimeter wave signal is transmitted via the millimeter wave signal transmission line. "Radio transmission" in the present embodiment means that the transmission object signal is transmitted by radio (radio waves: millimeter waves in this example) rather than by ordinary electric wiring (simple wire wiring).

The "relatively short distance" means a shorter distance than a distance between communicating devices in the open air (outdoors) used in broadcasting or ordinary radio communication. It suffices for the relatively short distance to be such that a transmission range can be essentially identified as a closed space. The "closed space" means a space in which there is a small leakage of radio waves from the inside of the space to the outside, and conversely small amounts of radio waves come (penetrate) from the outside into the inside of the space. The closed space is typically in a state in which the space as a whole is enclosed by a casing (case) having a shielding effect on radio waves. Communication in the present embodiment corresponds to for example communication between boards within a casing of one electronic device, communication between chips on a same board, and communication between a plurality of electronic devices in a state of the devices being integral with each other as in a state of one electronic device being loaded in another electronic device. A typical example of being "integral" is a state in which both electronic devices are in complete contact with each other as a result of loading. However, it suffices for the integral state to be such that a transmission range between both electronic devices can be essentially identified as a closed space. The integral state includes a case in which both electronic devices are disposed at determined positions in a state of being somewhat distant from each other at a relatively short distance such for example as within a few centimeters to a few ten centimeters of each other, and can be considered to be "essentially" integral with each other. In short, it suffices for the integral state to be a state in which there is a small leakage of radio waves from the inside of a space formed by both electronic devices and allowing radio waves to propagate through the space to the outside, and conversely small amounts of radio waves come (penetrate) from the outside into the inside of the space.

In the following, signal transmission within a casing of one electronic device will be referred to as intra-casing signal transmission, and signal transmission in a state of a plurality of electronic devices being integral (being integral hereinafter includes being "essentially integral") with each other will be referred to as inter-device signal transmission. In the case of intra-casing signal transmission, a signal transmission apparatus in which a communicating device on a transmitting side (communicating unit: a transmitting unit) and a communicating device on a receiving side (communicating unit: a receiving unit) are housed within a same casing, and a radio signal transmission line is formed between the communicating units (the transmitting unit and the receiving unit), can be an electronic device itself. On the other hand, in the case of inter-device signal transmission, a communicating device on a transmitting side (communicating unit: a transmitting unit) and a communicating device on a receiving side (communicating unit: a receiving unit) are housed within casings of respective different electronic devices, and when both electronic devices are disposed at determined positions and thereby become integral with each other, a radio signal transmission line is formed between the communicating units (the transmitting unit and the receiving unit) within both electronic devices, whereby a signal transmission apparatus is constructed.

A transmitting system and a receiving system are combined and arranged as a pair in each of the communicating devices disposed with a millimeter wave signal transmission line interposed between the communicating devices. Bidirectional communication can be performed by making a transmitting system and a receiving system coexist in each of the communicating devices. When a transmitting system and a receiving system are made to coexist in each of the communicating devices, signal transmission between one communicating device and the other communicating device may be unidirectional (one direction) signal transmission, or may be bidirectional signal transmission. For example, when a first communicating device is a transmitting side and a second communicating device is a receiving side, a first communicating unit performing a transmitting function is disposed in the first communicating device, and a second communicating unit performing a receiving function is disposed in the second communicating device. When a second communicating device is a transmitting side and a first communicating device is a receiving side, a first communicating unit performing a transmitting function is disposed in the second communicating device, and a second communicating unit performing a receiving function is disposed in the first communicating device.

Suppose that the first communicating unit includes, in a transmitting unit, for example a signal generating block on the transmitting side for generating an electric signal in the millimeter wave band by subjecting a signal as an object of transmission to signal processing (signal converting block for converting an electric signal as an object of transmission into an electric signal in the millimeter wave band) and a signal coupling block on the transmitting side for coupling the electric signal in the millimeter wave band, which electric signal is generated by the signal generating block on the transmitting side, to a radio signal transmission line for transmitting a radio signal in the millimeter wave band (millimeter wave signal transmission line, for example). Preferably, the signal generating block on the transmitting side is integral with a functional part for generating the transmission object signal.

For example, the signal generating block on the transmitting side has a modulating circuit (modulating section). The modulating circuit modulates the transmission object signal (baseband signal). The signal generating block on the transmitting side generates the electric signal in the millimeter wave band by frequency-converting the signal after being modulated by the modulating circuit. Theoretically, the transmission object signal may also be directly converted into the electric signal in the millimeter wave band. The signal coupling block on the transmitting side converts the electric signal in the millimeter wave band which electric signal is generated by the signal generating block on the transmitting side into a radio signal (an electromagnetic wave or a radio wave), and supplies the radio signal to the millimeter wave signal transmission line as the radio signal transmission line.

Suppose that the second communicating unit for example includes, in a receiving unit, a signal coupling block on the receiving side for receiving the radio signal in the millimeter wave band which radio signal is transmitted via the millimeter wave signal transmission line as the radio signal transmission line and converting the radio signal in the millimeter wave band into an electric signal, and includes a signal generating block on the receiving side for generating (reconstructing or reproducing) a normal electric signal (the transmission object signal or the baseband signal) by subjecting the electric signal in the millimeter wave band (input signal) after the radio signal in the millimeter wave band is received and converted into the electric signal by the signal coupling block on the receiving side to signal processing (signal converting block for converting the millimeter wave signal to the transmission object electric signal). Preferably, the signal generating block on the receiving side is integral with a functional part for receiving the transmission object signal. For example, the signal generating block on the receiving side has a demodulating circuit (demodulating section). The electric signal in the millimeter wave band is frequency-converted to generate an output signal. The demodulating circuit then demodulates the output signal, whereby the transmission object signal is generated. Theoretically, the electric signal in the millimeter wave band may also be directly converted into the transmission object signal.

That is, in providing a signal interface, the transmission object signal is transmitted by a radio signal without contacts or cables (not transmitted by electric wiring). Preferably, at least signals (a video signal, a high-speed clock signal and the like that need high-speed transmission or high-capacity transmission in particular) are transmitted by a radio signal in the millimeter wave band or the like. In short, signal transmission hitherto performed by electric wiring is performed by a radio signal (radio waves) in the present embodiment. By performing signal transmission by a radio signal in the millimeter wave band or the like, it is possible to achieve high-speed signal transmission on the order of gigabits per second [Gbps], easily limit a range covered by the radio signal, and obtain effects resulting from this nature.

In this case, it suffices for each signal coupling block to allow the first communicating unit and the second communicating unit to transmit a radio signal (radio signal in the millimeter wave band in this case) via the radio signal transmission line (for example the millimeter wave signal transmission line). For example, each signal coupling block may have an antenna structure (antenna coupling section), or may achieve coupling without having an antenna structure. The radio signal transmission line such as the "millimeter wave signal transmission line for transmitting the millimeter wave signal" may be an air (so-called free space), but preferably has a structure that transmits the radio signal (an electromagnetic wave or a radio wave) while confining the radio signal in the transmission line (radio signal confining structure, for example a millimeter wave confining structure). By actively utilizing the radio signal confining structure, the routing of the radio signal transmission line can be determined arbitrarily as by electric wiring, for example. The radio signal confining structure typically corresponds to a so-called waveguide, but is not limited to this. For example, the radio signal transmission line is preferably a radio signal transmission line formed by a dielectric material capable of transmitting a radio signal (which transmission line will be referred to as a dielectric transmission line or a radio signal intra-dielectric transmission line) or a hollow waveguide forming a transmission line and provided with a shielding material for suppressing external radiation of the radio signal, the shielding material being provided so as to enclose the transmission line, and the inside of the shielding material being hollow. The radio signal transmission line can be routed by imparting flexibility to the dielectric material or the shielding material. In the case of an air (free space), each signal coupling block has an antenna structure, and signals are transmitted in the short-range space by the antenna structures. On the other hand, when the radio signal transmission line is formed by a dielectric material, an antenna structure may be adopted, but is not essential.

[Comparison between Signal Transmission by Electric Wiring and Radio Transmission]

Signal transmission via electric wiring has the following problems.

i) While a higher volume and a higher speed of transmission data are desired, there is a limit to the transmission speed and transmission capacity of electric wiring.

ii) In order to deal with the problem of increasing the speed of transmission data, there is a method of increasing the number of pieces of wiring and decreasing transmission speed per signal line by signal parallelization. However, this method increases input and output terminals. As a result, complication of a printed board and cable wiring, an increase in physical size of a connector part and an electrical interface, and the like are desired, and there occur problems of complication of the shapes of these parts, degradation in reliability of these parts, an increase in cost, and the like.

iii) As the amount of information of movie video, computer image and the like has increased to a massive amount, and thus the band of a baseband signal is widened, a problem of EMC (electromagnetic compatibility) becomes more manifest. For example, when electric wiring is used, the wiring becomes an antenna, and interferes with signals corresponding to the tuning frequency of the antenna. In addition, reflection and resonance due to a mismatch of impedance of the wiring or the like are causes of spurious radiation. The configuration of the electronic device is complicated to take measures against such problems.

iv) In addition to EMC, when there is reflection, a transmission error due to interference between symbols and a transmission error due to the jumping in of disturbance become problems on the receiving side.

On the other hand, when signal transmission is made by radio (for example using the millimeter wave band) rather than electric wiring, it is not necessary to care about the shape of wiring and the position of connectors, and thus there occurs no particular limitation on layout. Wiring and terminals for signals whose transmission is replaced by signal transmission by millimeter waves can be omitted, so that the problems of EMC are solved. Generally, there is no other functional part using frequencies in the millimeter wave band within the communicating devices, and therefore measures against EMC are realized easily. Because radio transmission is performed in a state of the communicating device on the transmitting side and the communicating device on the receiving side being in proximity to each other, and signal transmission is performed between fixed positions and in known positional relation, the following advantages are obtained.

1) It is easy to properly design a propagation channel (waveguide structure) between the transmitting side and the receiving side.

2) Excellent transmission with higher reliability than free space transmission is made possible by designing the dielectric structure of the transmission line coupling blocks sealing the transmitting side and the receiving side and the propagation channel (waveguide structure of the millimeter wave signal transmission line) in conjunction with each other.

3) The control of a controller for managing radio transmission does not need to be performed dynamically or adaptively with high frequency unlike ordinary radio communication, so that control overhead can be reduced as compared with ordinary radio communication. As a result, a setting value (so-called parameter) used in a control circuit, an arithmetic circuit, or the like can be made to be a constant (so-called fixed value), and miniaturization, lower power consumption, and higher speed can be achieved. For example, when a radio transmission characteristic is calibrated at a time of manufacturing or at a time of design, and individual variations and the like are grasped, the data can be referred to, so that the setting value defining the operation of the signal processing section can be preset or controlled statically. Because the setting value defines the operation of the signal processing section substantially correctly, high-quality communication is made possible even with a simple configuration and low power consumption.

In addition, radio communication in the millimeter wave band of short wavelengths provides the following advantages.

a) Because millimeter wave communication provides a wide communication band, a high data rate can be achieved easily.

b) Frequencies used for transmission can be separated from frequencies of other baseband signal processing, and thus interference between the frequencies of millimeter waves and baseband signals do not occur easily.

c) Because the millimeter wave band has short wavelengths, the antenna and the waveguide structure determined according to wavelength can be made smaller. In addition, because of great distance attenuation and a little diffraction of the millimeter wave band, electromagnetic shielding is provided easily.

d) There are strict regulations for ordinary outdoor radio communication in regard to the stability of carrier waves to prevent interference and the like. In order to realize a carrier wave of such high stability, an external frequency reference part of high stability, a multiplying circuit, a PLL (phase-locked loop circuit) and the like are used, thus increasing circuit scale. However, the millimeter wave (especially when used in conjunction with signal transmission between fixed positions or in known positional relation) can be shielded easily, and prevented from being leaked to the outside. An injection locking system is suitably adopted to demodulate a signal transmitted by a carrier wave of relaxed stability by a small circuit on the receiving side.

For example, LVDS (Low Voltage Differential Signaling) is known as a method for achieving high-speed signal transmission between electronic devices arranged at a relatively short distance from each other (for example within ten and a few centimeters of each other) or within an electronic device. However, recent further increases in capacity and speed of transmission data involve problems such as an increase in power consumption, an increase in effect of signal distortion due to reflection and the like, an increase in spurious radiation (the problem of so-called EMI), and the like. For example, LVDS is reaching a limit in a case of high-speed (real-time) transmission of video signals (including image pickup signals) and signals of computer images and the like within a device or between devices.

In order to make provision for high-speed transmission of data, transmission speed per signal line may be decreased by increasing the number of pieces of wiring and achieving signal parallelization. However, this provision increases input and output terminals. As a result, complication of a printed board and cable wiring, an increase in semiconductor chip size, and the like are desired. In addition, when high-speed and high-volume data is routed by wiring, so-called electromagnetic field interference becomes a problem.

Each of the problems in LVDS and the method of increasing the number of pieces of wiring is caused by signal transmission by electric wiring. Accordingly, a method of changing electric wiring to radio and making transmission (a method of making signal transmission by radio waves in particular) may be adopted as a method for solving the problems caused by signal transmission by electric wiring. As a method of changing electric wiring to radio and making transmission, for example, signal transmission within a casing may be made by radio, and a UWB (Ultra Wide Band) communication system may be applied (described as a first method), or a carrier frequency in the millimeter wave band of short wavelengths (1 to 10 millimeters) may be used (described as a second method). However, the UWB communication system of the first method, which uses a low carrier frequency, is not suitable for high-speed communication for transmitting a video signal, for example, and has problems in size such as a large antenna size and the like. Further, there is a problem in that frequencies used for transmission are close to frequencies of other baseband signal processing, so that interference between the frequencies of radio signals and baseband signals tend to occur. In addition, in a case of a low frequency, susceptibility to driving system noise within a device is increased, so that a measure to cope with the noise becomes necessary. On the other hand, when a carrier frequency in the millimeter wave band of shorter wavelengths is used as in the second method, the problems of the antenna size and interference can be solved.

The above description has been made of a case where radio communication is performed in the millimeter wave band. However, the scope of application of radio communication is not limited to communication in the millimeter wave band. Communications in a frequency band (centimeter wave band) below the millimeter wave band and a frequency band (submillimeter wave band) conversely exceeding the millimeter wave band may be applied. However, it is effective to use mainly the millimeter wave band whose wavelengths are not excessively long or short in signal transmission within a casing or signal transmission between devices.

A signal transmission apparatus and an electronic device according to the present embodiment will be concretely described in the following. Incidentally, while an example in which many functional parts are formed in a semiconductor integrated circuit (chip, for example a CMOS (Complementary Metal Oxide Semiconductor) IC (Integrated Circuit)) will be described as a most suitable example, this is not essential.

<Communication Processing System: Basics>

FIG. 1 shows a basic configuration of assistance in explaining a signal interface of a signal transmission apparatus according to the present embodiment from an aspect of a functional configuration.

[Functional Configuration]

As shown in FIG. 1, the signal transmission apparatus 1 is configured such that a first communicating device 100 as an example of a first radio device and a second communicating device 200 as an example of a second radio device are coupled to each other via a radio signal transmission line 9 and such that signal transmission is made by using radio signals mainly in the millimeter wave band. FIG. 1 represents a case in which a transmitting system is provided on the side of the first communicating device 100, and a receiving system is provided on the side of the second communicating device 200.

The first communicating device 100 is provided with a semiconductor chip 103 ready for millimeter wave band transmission. The second communicating device 200 is provided with a semiconductor chip 203 ready for millimeter wave band reception.

In the present embodiment, signals as objects of communication in the millimeter wave band are only signals desired to have a high-speed characteristic and a high-capacity characteristic, and other signals that need only a low speed and a low capacity and signals that can be considered to be a direct current such as power and the like are not set as objects for conversion into a millimeter wave signal. For the signals (including power) not set as objects for conversion into a millimeter wave signal, signal connection between boards is established by a method similar to a method in the past. Electric signals as original objects of transmission before conversion into millimeter waves will be referred to collectively as a baseband signal.

[First Communicating Device]

The semiconductor chip 103 and a transmission line coupling block 108 ready for millimeter wave band transmission are mounted on a board 102 of the first communicating device 100. The semiconductor chip 103 is an LSI (Large Scale Integrated Circuit) into which an LSI functional block 104 and a signal generating block 107 (millimeter wave signal generating block) are integrated. The semiconductor chip 103 is connected with the transmission line coupling block 108. The transmission line coupling block 108 is an example of a transmitting unit for converting an electric signal into a radio signal and transmitting the radio signal to the radio signal transmission line 9. For example an antenna structure including an antenna coupling section, an antenna terminal, a microstrip line, an antenna and the like is applied to the transmission line coupling block 108. A point of coupling of the transmission line coupling block 108 to the radio signal transmission line 9 is a transmitting point.

The LSI functional block 104 performs main application control in the first communicating device 100. The LSI functional block 104 for example includes a circuit for processing various signals desired to be transmitted to the other device.

The signal generating block 107 (electric signal converting block) has a transmitting side signal generating block 110 for converting a signal from the LSI functional block 104 into a millimeter wave signal and controlling signal transmission via the radio signal transmission line 9. The transmitting side signal generating block 110 and the transmission line coupling block 108 form a transmitting system (transmitting unit: a communicating unit on the transmitting side).

In order to generate a millimeter wave signal by processing an input signal, the transmitting side signal generating block 110 has a multiplexing processing section 113, a parallel-serial converting section 114, a modulating section 115, a frequency converting section 116, and an amplifying section 117. The amplifying section 117 is an example of an amplitude adjusting section for adjusting the magnitude of an input signal and outputting a resulting signal. Incidentally, the modulating section 115 and the frequency converting section 116 may be integrated into a section of a so-called direct conversion system.

When there are a plurality of (N1) kinds of signals as objects for communication in the millimeter wave band among signals from the LSI functional block 104, the multiplexing processing section 113 integrates the plurality of kinds of signals into a signal of one system by performing multiplexing processing such as time division multiplexing, frequency division multiplexing, code division multiplexing or the like. For example, a plurality of kinds of signals desired to have a high-speed characteristic and a high-capacity characteristic are set as objects for transmission by a millimeter wave, and integrated into a signal of one system.

The parallel-serial converting section 114 converts parallel signals into a serial data signal, and supplies the serial data signal to the modulating section 115. The modulating section 115 modulates the signal as an object for transmission, and supplies the modulated signal to the frequency converting section 116. The parallel-serial converting section 114 is provided for parallel interface specifications using a plurality of signals for parallel transmission in a case where the present embodiment is not applied. The parallel-serial converting section 114 is not necessary in a case of serial interface specifications.

It basically suffices for the modulating section 115 to modulate at least one of amplitude, frequency, and phase by the transmission object signal, and systems using arbitrary combinations of amplitude, frequency, and phase can be adopted. For example, an analog modulating system includes amplitude modulation (AM) and vector modulation. Vector modulation includes frequency modulation (FM) and phase modulation (PM). A digital modulating system includes for example amplitude shift keying (ASK), frequency shift keying (FSK), phase shift keying (PSK), and amplitude phase shift keying (APSK) that modulates amplitude and phase. Quadrature amplitude modulation (QAM) typifies the amplitude phase shift keying.

The frequency converting section 116 generates a millimeter wave electric signal by frequency-converting the transmission object signal after being modulated by the modulating section 115, and then supplies the millimeter wave electric signal to the amplifying section 117. The millimeter wave electric signal refers to an electric signal of a certain frequency in a range of approximately 30 to 300 gigahertz [GHz]. The word "approximately" is used on the basis of a fact that it suffices for the frequency to be about such a frequency as to provide an effect of millimeter wave communication, with a lower limit not limited to 30 GHz and an upper limit not limited to 300 GHz.

The frequency converting section 116 can employ various circuit configurations. However, for example, it suffices for the frequency converting section 116 to employ a configuration including a frequency mixing circuit (mixer circuit) and a local oscillating circuit. The local oscillating circuit generates a carrier wave (a carrier signal or a reference carrier wave) used for modulation. The frequency mixing circuit generates a transmission signal in the millimeter wave band by multiplying (modulating) the carrier wave in the millimeter wave band which carrier wave is generated by the local oscillating circuit by the signal from the parallel-serial converting section 114. The frequency mixing circuit then supplies the transmission signal to the amplifying section 117.

The amplifying section 117 amplifies the millimeter wave electric signal after the frequency conversion, and then supplies the amplified millimeter wave electric signal to the transmission line coupling block 108. The amplifying section 117 is connected to the bidirectional transmission line coupling block 108 via an antenna terminal not shown in the figure.

The transmission line coupling block 108 transmits the millimeter wave signal generated by the transmitting side signal generating block 110 to the radio signal transmission line 9. The transmission line coupling block 108 is formed by an antenna coupling section. The antenna coupling section forms an example or a part of the transmission line coupling block 108 (signal coupling block). The antenna coupling section in a narrow sense refers to a part for coupling an electronic circuit within a semiconductor chip to an antenna disposed within the chip or outside the chip, and in a broad sense refers to a part for signal coupling of the semiconductor chip to the radio signal transmission line 9. For example, the antenna coupling section has at least an antenna structure. The antenna structure refers to a structure in a section for coupling to the radio signal transmission line 9. It suffices for the antenna structure to convert an electric signal in the millimeter wave band into an electromagnetic wave (radio wave), and couples the electromagnetic wave (radio wave) to the radio signal transmission line 9, and the antenna structure does not mean only an antenna itself.

The radio signal transmission line 9 may be formed so as to propagate the electromagnetic wave in a space within a casing, for example, as a free space transmission line. In addition, it is desirable that the radio signal transmission line 9 be formed by a waveguide, a transmission line, a dielectric line, or a wave guiding structure within a dielectric or the like, formed so as to confine an electromagnetic wave in the millimeter wave band within a transmission line, and have a characteristic of transmitting the electromagnetic wave efficiently. For example, the radio signal transmission line 9 is desirably a dielectric transmission line 9A including a dielectric material having a relative dielectric constant in a certain range and a dielectric loss tangent in a certain range. For example, by filling the dielectric material into the whole of the inside of the casing, the dielectric transmission line 9A, rather than the free space transmission line, is disposed between the transmission line coupling block 108 and a transmission line coupling block 208. In addition, the dielectric transmission line 9A may be formed by making connection between the antenna of the transmission line coupling block 108 and the antenna of the transmission line coupling block 208 by a dielectric line as a linear member formed by a dielectric material and having a certain line diameter. Incidentally, the radio signal transmission line 9 formed so as to confine a millimeter wave signal in the transmission line may not only be the dielectric transmission line 9A but also be a hollow waveguide whose periphery is surrounded by a shielding material and whose inside is hollow.

[Second Communicating Device]

The semiconductor chip 203 and the transmission line coupling block 208 ready for millimeter wave band reception are mounted on a board 202 of the second communicating device 200. The semiconductor chip 203 is an LSI into which an LSI functional block 204 and a signal generating block 207 (millimeter wave signal generating block) are integrated. Though not shown, as in the first communicating device 100, a configuration in which the LSI functional block 204 and the signal generating block 207 are not integrated with each other may also be adopted.

The semiconductor chip 203 is connected with the transmission line coupling block 208 similar to the transmission line coupling block 108. The transmission line coupling block 208 is an example of a receiving unit for converting a radio signal transmitted via the radio signal transmission line 9 into an electric signal. A transmission line coupling block similar to the transmission line coupling block 108 is employed as the transmission line coupling block 208. The transmission line coupling block 208 receives a radio signal in the millimeter wave band from the radio signal transmission line 9, converts the radio signal into an electric signal, and outputs the electric signal to a receiving side signal generating block 220. A point of coupling of the transmission line coupling block 208 to the radio signal transmission line 9 is a receiving point.

The signal generating block 207 (electric signal converting block) has the receiving side signal generating block 220 for controlling signal reception via the radio signal transmission line 9. The receiving side signal generating block 220 and the transmission line coupling block 208 form a receiving system (receiving unit: a communicating unit on the receiving side).

In order to generate an output signal by subjecting the millimeter wave electric signal received by the transmission line coupling block 208 to signal processing, the receiving side signal generating block 220 has an amplifying section 224, a frequency converting section 225, a demodulating section 226, a serial-parallel converting section 227, and a simplification processing section 228. The amplifying section 224 is an example of an amplitude adjusting section for adjusting the magnitude of an input signal and outputting a resulting signal. The frequency converting section 225 and the demodulating section 226 may be integrated into a section of a so-called direct conversion system.

The transmission line coupling block 208 is connected with the receiving side signal generating block 220. The amplifying section 224 on the receiving side is connected to the transmission line coupling block 208. The amplifying section 224 amplifies the millimeter wave electric signal after being received by an antenna, and then supplies the millimeter wave electric signal to the frequency converting section 225. The frequency converting section 225 frequency-converts the millimeter wave electric signal after the amplification, and then supplies the signal after the frequency conversion to the demodulating section 226. The demodulating section 226 obtains a baseband signal by demodulating the signal after the frequency conversion, and then supplies the baseband signal to the serial-parallel converting section 227.

The serial-parallel converting section 227 converts serial received data to parallel output data, and then supplies the parallel output data to the simplification processing section 228. As with the parallel-serial converting section 114, the serial-parallel converting section 227 is provided for the parallel interface specifications using a plurality of signals for parallel transmission in a case where the present embodiment is not applied. When original signal transmission between the first communicating device 100 and the second communicating device 200 is in a serial form, the parallel-serial converting section 114 and the serial-parallel converting section 227 do not need to be provided.

When original signal transmission between the first communicating device 100 and the second communicating device 200 is in a parallel form, the number of signals as objects of millimeter wave conversion is reduced by subjecting an input signal to parallel-serial conversion and then transmitting the signal to the semiconductor chip 203 side, and subjecting the signal received from the semiconductor chip 103 side to serial-parallel conversion.

The simplification processing section 228 corresponds to the multiplexing processing section 113. The simplification processing section 228 separates the signal integrated in one system into a plurality of kinds of signals_@ (@ is 1 to N). For example, the simplification processing section 228 separates the plurality of data signals integrated in the signal of one system into each separate data signal, and then supplies each separate data signal to the LSI functional block 204.

The LSI functional block 204 performs main application control in the second communicating device 200. The LSI functional block 204 for example includes a circuit for processing various signals received from the other device.

[Provision for Bidirectional Communication]

The signal generating block 107, the transmission line coupling block 108, the signal generating block 207, and the transmission line coupling block 208 are also capable of bidirectional communication by being configured to have data bidirectionality. For example, the signal generating block 107 and the signal generating block 207 are provided with a signal generating block on a receiving side and a signal generating block on a transmitting side, respectively. While the transmission line coupling block 108 and the transmission line coupling block 208 may be each divided into separate parts on the transmitting side and the receiving side, the transmission line coupling block 108 and the transmission line coupling block 208 can also be shared for both transmission and reception.

Incidentally, "bidirectional communication" in this case is single-core bidirectional transmission where the radio signal transmission line 9 as a millimeter wave transmission channel is one system (one core). In order to realize this, a half-duplex system to which time division multiplexing (TDD: Time Division Duplex) is applied, frequency division multiplexing (FDD: Frequency Division Duplex), or the like may be applied. However, frequency division multiplexing is adopted in the present embodiment.

[Connection and Operation]

A method of frequency-converting an input signal and making signal transmission is commonly used in broadcasting and radio communications. In these applications, relatively complex transmitters and receivers and the like are used which can deal with problems of how far communication can be attained (problem of S/N with respect to thermal noise), how to cope with reflection and multiple paths, and how to suppress disturbance and interference with other channels, for example.

On the other hand, the signal generating block 107 and the signal generating block 207 used in the present embodiment mainly use the millimeter wave band of a higher frequency band than usable frequencies of complex transmitters and receivers and the like commonly used in broadcasting and radio communication. Thus, because of short wavelength λ, frequency reuse is easily made, and signal generating blocks suitable for performing communication between many devices arranged in proximity to each other are used.

In the present embodiment, unlike a signal interface using electric wiring in the past, provision can be made flexibly for high speed and high capacity by making signal transmission in the millimeter wave band, as described above. For example, only signals desired to have a high-speed characteristic and a high-capacity characteristic are set as objects for communication in the millimeter wave band, and depending on a system configuration, the first communicating device 100 and the second communicating device 200 have, in a part thereof, an interface (connection by a terminal or a connector) using electric wiring in the past for low-speed and low-capacity signals and for power supply.

The signal generating block 107 is an example of a signal processing section for performing predetermined signal processing. In this example, the signal generating block 107 generates a millimeter wave signal by subjecting an input signal input from the LSI functional block 104 to signal processing. The signal generating block 107 is connected to the transmission line coupling block 108 by a transmission line such as a microstrip line, a strip line, a coplanar line, or a slot line, for example. The generated millimeter wave signal is supplied in the form of an electromagnetic wave (a radio wave or a radio signal) to the radio signal transmission line 9 via the transmission line coupling block 108.

The transmission line coupling block 108 has an antenna structure. The transmission line coupling block 108 has a function of converting the transmitted millimeter wave signal into an electromagnetic wave and sending out the electromagnetic wave. The transmission line coupling block 108 is coupled to the radio signal transmission line 9. The electromagnetic wave converted by the transmission line coupling block 108 is supplied to one end part of the radio signal transmission line 9. The transmission line coupling block 208 on the side of the second communicating device 200 is coupled to another end of the radio signal transmission line 9. By providing the radio signal transmission line 9 between the transmission line coupling block 108 on the side of the first communicating device 100 and the transmission line coupling block 208 on the side of the second communicating device 200, electromagnetic waves mainly in the millimeter wave band propagate through the radio signal transmission line 9.

The transmission line coupling block 208 on the side of the second communicating device 200 is coupled to the radio signal transmission line 9. The transmission line coupling block 208 receives the electromagnetic wave transmitted to the other end of the radio signal transmission line 9, converts the electromagnetic wave into a millimeter wave signal, and then supplies the millimeter wave signal to the signal generating block 207 (baseband signal generating block). The signal generating block 207 is an example of a signal processing section for performing predetermined signal processing. In this example, the signal generating block 207 subjects the converted millimeter wave signal to signal processing, thereby generates an output signal (baseband signal), and then supplies the output signal to the LSI functional block 204.

The above description has been made of a case of signal transmission from the first communicating device 100 to the second communicating device 200. However, when the first communicating device 100 and the second communicating device 200 are both configured to be capable of bidirectional communication, it suffices to similarly consider a case of transmitting a signal from the LSI functional block 204 of the second communicating device 200 to the first communicating device 100, and millimeter wave signals can be transmitted bidirectionally.

Description will next be made of a method according to the present embodiment, in which method provision is made from an aspect of arrangement of carrier frequencies without any circuit member being added or changed in a case where a plurality of sets of modulating circuits and demodulating circuits are provided in a same communication area and simultaneous communication is performed with the sets of the modulating circuits and the demodulating circuits using respective different carrier frequencies.

<Three-Band Frequency Arrangement>

Figure 3A:
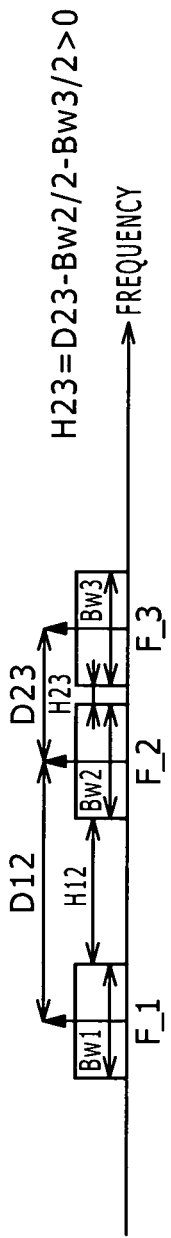
FIGS. 3A to 3C are diagrams of assistance in explaining a second example of three-band frequency arrangement.
Figure 3B:
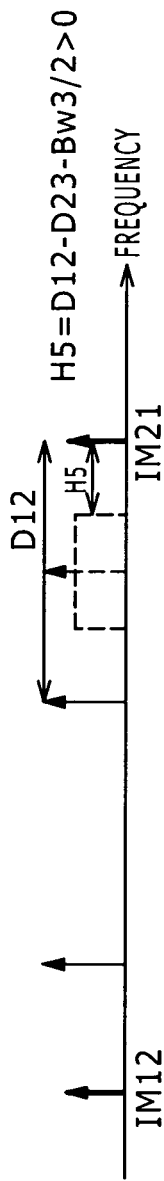
Figure 3C:
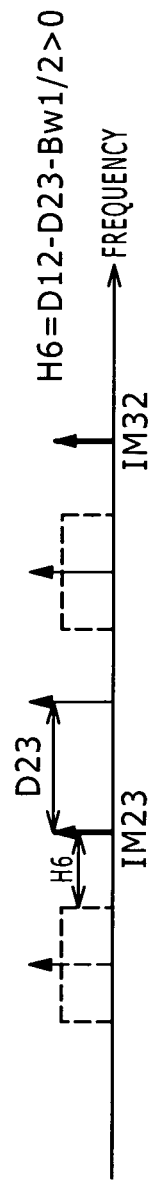

FIGS. 2A, 2B, and 2C and FIGS. 3A, 3B, and 3C are diagrams of assistance in explaining a method for determining a frequency arrangement in a case where three carrier frequencies $F\_1$, $F\_2$, and $F\_3$ different from each other are used (which case will be referred to as three bands). FIGS. 2A to 2C show a first example of a three-band frequency arrangement. FIGS. 3A to 3C show a second example of a three-band frequency arrangement.

For the convenience of description, suppose that $F\_1 < F\_2 < F\_3$ in terms of the height of the frequencies. Specifically, the lowest carrier frequency $F\_L$ of the three carrier frequencies $F\_1$, $F\_2$, and $F\_3$ is the carrier frequency $F\_1$, the intermediate carrier frequency $F\_M$ of the three carrier frequencies $F\_1$, $F\_2$, and $F\_3$ is the carrier frequency $F\_2$, and the highest carrier frequency $F\_H$ of the three carrier frequencies $F\_1$, $F\_2$, and $F\_3$ is the carrier frequency $F\_3$.

Let D12 be a frequency difference between the carrier frequency $F\_1$ and the carrier frequency $F\_2$ ($=F\_2-F\_1$), and let D23 be a frequency difference between the carrier frequency $F\_2$ and the carrier frequency $F\_3$ ($=F\_3-F\_2$). That is, a first frequency difference $\Delta 1$ obtained as a difference between the lowest carrier frequency $F\_L$ ($=F\_1$) and the intermediate carrier frequency $F\_M$ ($=F\_2$) of the three carrier frequencies $F\_1$, $F\_2$, and $F\_3$ is D12, and a second frequency difference $\Delta 2$ obtained as a difference between the highest carrier frequency $F\_H$ ($=F\_3$) and the intermediate carrier frequency $F\_M$ ($=F\_2$) of the three carrier frequencies $F\_1$, $F\_2$, and $F\_3$ is D23.

Let Bw1 be the total reception bandwidth of a modulated signal based on the carrier frequency $F\_1$. Let Bw1_L be a reception bandwidth on a low-frequency side of the total reception bandwidth Bw1. Let Bw1_H be a reception bandwidth on a high-frequency side of the total reception bandwidth Bw1. Let Bw2 be the total reception bandwidth of a modulated signal based on the carrier frequency $F\_2$. Let Bw2_L be a reception bandwidth on a low-frequency side of the total reception bandwidth Bw2. Let Bw2_H be a reception bandwidth on a high-frequency side of the total reception bandwidth Bw2. Let Bw3 be the total reception bandwidth of a modulated signal based on the carrier frequency $F\_3$. Let Bw3_L be a reception bandwidth on a low-frequency side of the total reception bandwidth Bw3. Let Bw3_H be a reception bandwidth on a high-frequency side of the total reception bandwidth Bw3.

Let H12 be a band interval between the modulated signal based on the carrier frequency $F\_1$ and the modulated signal based on the carrier frequency $F\_2$. Let H23 be a band interval between the modulated signal based on the carrier frequency $F\_2$ and the modulated signal based on the carrier frequency $F\_3$. In terms of equations, the band interval H12 is "D12−Bw1_H−Bw2_L," and the band interval H23 is "D23−Bw2_H−Bw3_L."

Let IM12 be the distortion frequency ($=2F\_1-F\_2$) of a low-frequency component (component on a low-frequency side) of third-order intermodulation distortion components generated on the basis of the carrier frequency $F\_1$ and the carrier frequency $F\_2$. Let IM21 be the distortion frequency ($=2F\_2-F\_1$) of a high-frequency component (component on a high-frequency side) of the third-order intermodulation distortion components generated on the basis of the carrier frequency $F\_1$ and the carrier frequency $F\_2$. Let IM23 be the distortion frequency (=2F_2–F_3) of a low-frequency component (component on a low-frequency side) of third-order intermodulation distortion components generated on the basis of the carrier frequency F_2 and the carrier frequency F_3. Let IM32 be the distortion frequency (=2F_3–F_2) of a high-frequency component (component on a high-frequency side) of the third-order intermodulation distortion components generated on the basis of the carrier frequency F_2 and the carrier frequency F_3.

First Example

The first example is a case of D12<D23. FIGS. 2A to 2C show relation between the three carrier frequencies F_1, F_2, and F_3 and the third-order intermodulation distortion frequencies IM12, IM21, IM23, and IM32 in this case.

In this case, the smaller frequency difference ΔS of the first frequency difference Δ1 (=D12) and the second frequency difference Δ2 (=D23) is the first frequency difference Δ1 (=D12). A carrier frequency F_a on a low-frequency side which carrier frequency defines the smaller frequency difference ΔS (=D12) is the carrier frequency F_1, and the reception bandwidth F_a_U on a high-frequency side of a modulated signal based on the carrier frequency F_a (=F_1) is Bw1_H. In addition, a carrier frequency F_b on a high-frequency side which carrier frequency defines the smaller frequency difference ΔS (=D12) is the carrier frequency F_2, and the reception bandwidth F_b_L on a low-frequency side of a modulated signal based on the carrier frequency F_b (=F_2) is Bw2_L.

In this case, conditions for preventing the respective bands of the modulated signals based on the three respective carrier frequencies F_1, F_2, and F_3 from overlapping each other and for preventing the frequency of an Nth-order intermodulation distortion component (third-order intermodulation distortion component in this case) generated on the basis of two carrier frequencies adjacent to each other from being present within any of the bands of the modulated signals based on each carrier frequency are as follows.

To prevent the respective bands of the modulated signals based on the respective carrier frequencies from overlapping each other may require, as shown in Equation (1) (Equation (1-1) and Equation (1-2)), that the band interval H12 between the modulated signal based on the carrier frequency F_1 and the modulated signal based on the carrier frequency F_2 be a positive value and that the band interval H23 between the modulated signal based on the carrier frequency F_2 and the modulated signal based on the carrier frequency F_3 be also a positive value (see FIG. 2A).

[Equation 1]

$$H12 = D12 - Bw1\_H - Bw2\_L > 0 \quad (1\text{-}1)$$

$$H23 = D23 - Bw2\_H - Bw3\_L > 0 \quad (1\text{-}2)$$

The distortion frequency IM12 of the low-frequency component of the third-order intermodulation distortion components generated on the basis of the carrier frequency F_1 and the carrier frequency F_2 is present on a lower-frequency side than the carrier frequency F_1, so that the problem of disturbance does not occur (see FIG. 2B).

On the other hand, the distortion frequency IM21 of the high-frequency component of the third-order intermodulation distortion components generated on the basis of the carrier frequency F_1 and the carrier frequency F_2 is present on a higher-frequency side than the carrier frequency F_2, so that disturbance due to the overlapping of the modulated signal based on the carrier frequency F_3 can occur. In order to prevent this, it suffices for the distortion frequency IM21 not to occur within the band of the modulated signal based on the carrier frequency F_3. As shown in Equation (2), it may be necessary that an interval H2 between the distortion frequency IM21 and the band on a low-frequency side of the modulated signal based on the carrier frequency F_3 be a positive value (see FIG. 2B).

[Equation 2]

$$H2 = D23 - D12 - Bw3\_L > 0 \quad (2)$$

The distortion frequency IM32 of the high-frequency component of the third-order intermodulation distortion components generated on the basis of the carrier frequency F_2 and the carrier frequency F_3 is present on a higher-frequency side than the carrier frequency F_3, so that the problem of disturbance does not occur (see FIG. 2C).

On the other hand, the distortion frequency IM23 of the low-frequency component of the third-order intermodulation distortion components generated on the basis of the carrier frequency F_2 and the carrier frequency F_3 is present on a lower-frequency side than the carrier frequency F_1, so that disturbance due to the overlapping of the modulated signal based on the carrier frequency F_1 can occur. In order to prevent this, it suffices for the distortion frequency IM23 not to occur within the band of the modulated signal based on the carrier frequency F_1. As shown in Equation (3), it may be necessary that an interval H3 between the distortion frequency IM23 and the band on a low-frequency side of the modulated signal based on the carrier frequency F_1 be a positive value (see FIG. 2C).

[Equation 3]

$$H3 = D23 - D12 - Bw1\_L > 0 \quad (3)$$

From Equation (1), Equation (2), and Equation (3), the first frequency difference Δ1 (=D12) obtained as the difference between the carrier frequency F_L (=F_1) and the carrier frequency F_M (=F_2) is defined in a range shown in Equation (4).

[Equation 4]

$$Bw1\_H + Bw2\_L < D12 < D23 - (Bw1\_L \text{ or } Bw3\_L \text{ whichever is greater}) \quad (4)$$

"Bw1_H+Bw2_L<D12" in Equation (4) corresponds to the above-described first condition. "D12<D23–(Bw1_L or Bw3_L whichever is greater)" in Equation (4) can be modified into "|D12–D23|>(Bw1_L or Bw3_L whichever is greater)," which corresponds to the above-described second condition.

Hence, when the frequency arrangement of the three carrier frequencies F_1, F_2, and F_3 is set so as to satisfy Equation (4), the linear performance of the amplifier, the frequency mixing section (mixer) and the like of the receiver can be relaxed without a band limiting filter having a high degree of selectivity being used, and cost reduction, reduction in power consumption, reduction in circuit scale, and the like can be achieved.

Incidentally, when Bw1_L=Bw1_H, Bw1_L=Bw1_H=Bw1/2. When Bw2_L=Bw2_H, Bw2_L=Bw2_H=Bw2/2. When Bw3_L=Bw3_H, Bw3_L=Bw3_H=Bw3/2. Thus, Equation (1-1) can be modified into Equation (5-1), Equation (1-2) can be modified into Equation (5-2), Equation (2) can be modified into Equation (5-3), Equation (3) can be modified into Equation (5-4), and Equation (4) can be modified into Equation (5-5). Further, when the total bands of the respective modulated signals are equal to each other, and are Bw (=Bw1=Bw2=Bw3), Equation (5-5) can be simplified as in Equation (5-6).

[Equation 5]

$$H12 = D12 - Bw1/2 - Bw2/2 > 0 \quad (5\text{-}1)$$

$$H23 = D23 - Bw2/2 - Bw3/2 > 0 \quad (5\text{-}2)$$

$$H2 = D23 - D12 - Bw3/2 > 0 \quad (5\text{-}3)$$

$$H3 = D23 - D12 - Bw1/2 > 0 \quad (5\text{-}4)$$

$$Bw1/2 + Bw2/2 < D12 < D23 - (Bw1 \text{ or } Bw3 \text{ whichever is greater})/2 \quad (5\text{-}5)$$

$$Bw < D12 < D23 - Bw/2 \quad (5\text{-}6)$$

Second Example

The second example is a case of D12>D23. FIGS. 3A to 3C show relation between the three carrier frequencies F_1, F_2, and F_3 and the third-order intermodulation distortion frequencies IM12, IM21, IM23, and IM32 in this case.

In this case, the smaller frequency difference ΔS of the first frequency difference Δ1 (=D12) and the second frequency difference Δ2 (=D23) is the second frequency difference Δ2 (=D23). A carrier frequency F_a on a low-frequency side which carrier frequency defines the smaller frequency difference ΔS (=D23) is the carrier frequency F_2, and the reception bandwidth F_a_U on a high-frequency side of a modulated signal based on the carrier frequency F_a (=F_2) is Bw2_H. In addition, a carrier frequency F_b on a high-frequency side which carrier frequency defines the smaller frequency difference ΔS (=D23) is the carrier frequency F_3, and the reception bandwidth F_b_L on a low-frequency side of a modulated signal based on the carrier frequency F_b (=F_3) is Bw3_L.

In this case, conditions for preventing the respective bands of the modulated signals based on the three respective carrier frequencies F_1, F_2, and F_3 from overlapping each other and for preventing the frequency of an Nth-order intermodulation distortion component (third-order intermodulation distortion component in this case) generated on the basis of two carrier frequencies adjacent to each other from being present within any of the bands of the modulated signals based on each carrier frequency are as follows.

To prevent the respective bands of the modulated signals based on the respective carrier frequencies from overlapping each other may require, as shown in Equation (6) (Equation (6-1) and Equation (6-2)), that the band interval H12 between the modulated signal based on the carrier frequency F_1 and the modulated signal based on the carrier frequency F_2 be a positive value and that the band interval H23 between the modulated signal based on the carrier frequency F_2 and the modulated signal based on the carrier frequency F_3 be also a positive value (see FIG. 3A).

[Equation 6]

$$H12 = D12 - Bw1\_H - Bw2\_L > 0 \quad (6\text{-}1)$$

$$H23 = D23 - Bw2\_H - Bw3\_L > 0 \quad (6\text{-}2)$$

The distortion frequency IM12 of the low-frequency component of the third-order intermodulation distortion components generated on the basis of the carrier frequency F_1 and the carrier frequency F_2 is present on a lower-frequency side than the carrier frequency F_1, so that the problem of disturbance does not occur (see FIG. 3B).

On the other hand, the distortion frequency IM21 of the high-frequency component of the third-order intermodulation distortion components generated on the basis of the carrier frequency F_1 and the carrier frequency F_2 is present on a higher-frequency side than the carrier frequency F_3, so that disturbance due to the overlapping of the modulated signal based on the carrier frequency F_3 can occur. In order to prevent this, it suffices for the distortion frequency IM21 not to occur within the band of the modulated signal based on the carrier frequency F_3. As shown in Equation (7), it may be necessary that an interval H5 between the distortion frequency IM21 and the band on a high-frequency side of the modulated signal based on the carrier frequency F_3 be a positive value (see FIG. 3B).

[Equation 7]

$$H2 = D23 - D12 - Bw3\_L > 0 \quad (7)$$

The distortion frequency IM32 of the high-frequency component of the third-order intermodulation distortion components generated on the basis of the carrier frequency F_2 and the carrier frequency F_3 is present on a higher-frequency side than the carrier frequency F_3, so that the problem of disturbance does not occur (see FIG. 3C).

On the other hand, the distortion frequency IM23 of the low-frequency component of the third-order intermodulation distortion components generated on the basis of the carrier frequency F_2 and the carrier frequency F_3 is present on a lower-frequency side than the carrier frequency F_2, so that disturbance due to the overlapping of the modulated signal based on the carrier frequency F_1 can occur. In order to prevent this, it suffices for the distortion frequency IM23 not to occur within the band of the modulated signal based on the carrier frequency F_1. As shown in Equation (8), it may be necessary that an interval H6 between the distortion frequency IM23 and the band on a high-frequency side of the modulated signal based on the carrier frequency F_1 be a positive value (see FIG. 3C).

[Equation 8]

$$H6 = D12 - D23 - Bw1\_H > 0 \quad (8)$$

From Equation (6), Equation (7), and Equation (8), the second frequency difference Δ2 (=D23) obtained as the difference between the carrier frequency F_H (=F_3) and the carrier frequency F_M (=F_2) is defined in a range shown in Equation (9).

[Equation 9]

$$Bw2\_H + Bw3\_L < D23 < D12 - (Bw1\_H \text{ or } Bw3\_H \text{ whichever is greater}) \quad (9)$$

"Bw2_H+Bw3_L<D23" in Equation (9) corresponds to the above-described first condition. "D23<D12−(Bw1_H or Bw3_H whichever is greater)" in Equation (9) can be modified into "|D12−D23|>(Bw1_H or Bw3_H whichever is greater)," which corresponds to the above-described third condition.

Hence, when the frequency arrangement of the three carrier frequencies F_1, F_2, and F_3 is set so as to satisfy Equation (9), the linear performance of the amplifier, the frequency mixing section (mixer) and the like of the receiver can be relaxed without a band limiting filter having a high degree of selectivity being used, and cost reduction, reduction in power consumption, reduction in circuit scale, and the like can be achieved.

Incidentally, when Bw1_L=Bw1_H, Bw1_L=Bw1_H=Bw1/2. When Bw2_L=Bw2_H, Bw2_L=Bw2_H=Bw2/2. When Bw3_L=Bw3_H, Bw3_L=Bw3_H=Bw3/2. Thus, Equation (6-1) can be modified into Equation (10-1), Equation (6-2) can be modified into Equation (10-2), Equation (7) can be modified into Equation (10-3), Equation (8) can be modified into Equation (10-4), and Equation (9) can be modified into Equation (10-5). Further, when the total bands of the respective modulated signals are equal to each other, and are Bw (=Bw1=Bw2=Bw3), Equation (10-5) can be simplified as in Equation (10-6).

[Equation 10]

$$H12 = D12 - Bw1/2 - Bw2/2 > 0 \quad (10\text{-}1)$$

$$H23 = D23 - Bw2/2 - Bw3/2 > 0 \quad (10\text{-}2)$$

$$H5 = D12 - D23 - Bw3/2 > 0 \quad (10\text{-}3)$$

$$H6 = D12 - D23 - Bw1/2 > 0 \quad (10\text{-}4)$$

$$Bw2/2 + Bw3/2 < D23 < D12 - (Bw1 \text{ or } Bw3 \text{ whichever is greater})/2 \quad (10\text{-}5)$$

$$Bw < D23 < D12 - Bw/2 \quad (10\text{-}6)$$

When the frequency arrangement of the three carrier frequencies $F\_1$, $F\_2$, and $F\_3$ is set so as to satisfy Equation (4) or Equation (9), effects of Nth-order intermodulation distortion (third-order intermodulation distortion in this case) can be avoided. Thus, for example, a band limiting filter having a high degree of selectivity is not needed, a receiver of a small size can be formed at low cost, the distortion performance of the receiver can be relaxed, and a receiver of a small size with low power consumption can be formed.

<Four-Band Frequency Arrangement>

Figure 4A:
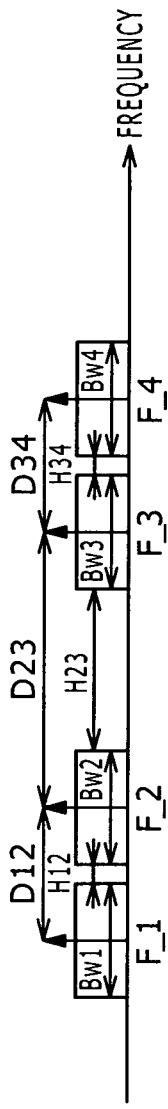
FIGS. 4A to 4C are diagrams of assistance in explaining a first example of four-band frequency arrangement.
Figure 4B:
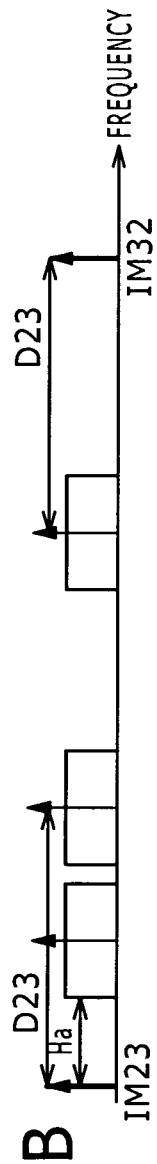
Figure 4C:
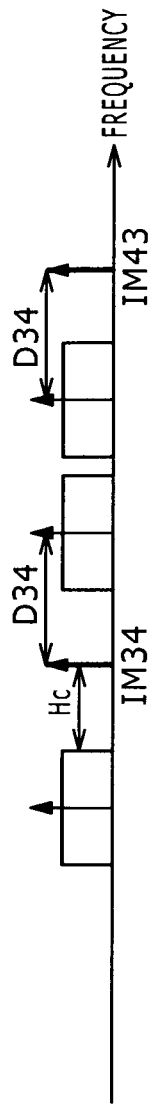

FIGS. 4A, 4B, and 4C and FIGS. 5A, 5B, and 5C are diagrams of assistance in explaining a method for determining a frequency arrangement in a case where four carrier frequencies different from each other are used (which case will be referred to as four bands). FIGS. 4A to 4C show a first example of a four-band frequency arrangement. FIGS. 5A to 5C show a second example of a four-band frequency arrangement.

As for conditions for preventing the respective bands of the modulated signals based on the four respective carrier frequencies from overlapping each other and for preventing the frequency of an Nth-order intermodulation distortion component (third-order intermodulation distortion component in this case) generated on the basis of two carrier frequencies adjacent to each other from being present within any of the bands of the modulated signals based on each carrier frequency, it suffices to similarly apply the method for determining a three-band frequency arrangement to three carrier frequencies adjacent to each other which carrier frequencies include a fourth carrier frequency newly added on a lower-frequency side or a higher-frequency side on the basis of the frequency arrangement determined at the time of three bands. Concrete description will be made in the following.

First Example

A first example is a mode in which a fourth carrier frequency is newly added on a higher-frequency side on the basis of the first example of three-band frequency arrangement. Let $F\_4$ be the fourth carrier frequency, and the height of the frequencies is set such that $F\_1 < F\_2 < F\_3 < F\_4$. Then, the method for determining a three-band frequency arrangement is similarly applied to the three carrier frequencies $F\_2$, $F\_3$, and $F\_4$.

The lowest carrier frequency $F\_L$ of the three carrier frequencies $F\_2$, $F\_3$, and $F\_4$ is the carrier frequency $F\_2$, the intermediate carrier frequency $F\_M$ of the three carrier frequencies $F\_2$, $F\_3$, and $F\_4$ is the carrier frequency $F\_3$, and the highest carrier frequency $F\_H$ of the three carrier frequencies $F\_2$, $F\_3$, and $F\_4$ is the carrier frequency $F\_4$.

Let D34 be a frequency difference between the carrier frequency $F\_3$ and the carrier frequency $F\_4$ ($=F\_4-F\_3$). A first frequency difference $\Delta 1$ obtained as a difference between the lowest carrier frequency $F\_L$ ($=F\_2$) and the intermediate carrier frequency $F\_M$ ($=F\_3$) of the three carrier frequencies $F\_2$, $F\_3$, and $F\_4$ is D23. A second frequency difference $\Delta 2$ obtained as a difference between the highest carrier frequency $F\_H$ ($=F\_4$) and the intermediate carrier frequency $F\_M$ ($=F\_3$) of the three carrier frequencies $F\_2$, $F\_3$, and $F\_4$ is D34.

Let Bw4 be the total reception bandwidth of a modulated signal based on the carrier frequency $F\_4$. Let Bw4_L be a reception bandwidth on a low-frequency side of the total reception bandwidth Bw4. Let Bw4_H be a reception bandwidth on a high-frequency side of the total reception bandwidth Bw4. Let H34 be a band interval between the modulated signal based on the carrier frequency $F\_3$ and the modulated signal based on the carrier frequency $F\_4$. In terms of an equation, the band interval H34 is "D34−Bw3_H−Bw4_L."

Let IM34 be the distortion frequency ($=2F\_3-F\_4$) of a low-frequency component (component on a low-frequency side) of third-order intermodulation distortion components generated on the basis of the carrier frequency $F\_3$ and the carrier frequency $F\_4$. Let IM43 be the distortion frequency ($=2F\_4-F\_3$) of a high-frequency component (component on a high-frequency side) of the third-order intermodulation distortion components generated on the basis of the carrier frequency $F\_3$ and the carrier frequency $F\_4$.

In these cases, as for the frequency arrangement of the three carrier frequencies $F\_2$, $F\_3$, and $F\_4$, it suffices to similarly apply the method for determining the second example of three-band frequency arrangement with D23>D34.

Though not described in detail, the second frequency difference $\Delta 2$ ($=D34$) obtained as the difference between the carrier frequency $F\_H$ ($=F\_4$) and the carrier frequency $F\_M$ ($=F\_3$) is defined in a range shown in Equation (11) as a modification of Equation (9).

[Equation 11]

$$Bw3\_H + Bw4\_L < D34 < D23 - (Bw2\_H \text{ or } Bw4\_H \text{ whichever is greater}) \quad (11)$$

"Bw3_H+Bw4_L<D34" in Equation (11) corresponds to the above-described first condition. "D34<D23−(Bw2_H or Bw4_H whichever is greater)" in Equation (11) can be modified into "|D23−D34|>(Bw2_H or Bw4_H whichever is greater)," which corresponds to the above-described third condition.

Hence, the frequency arrangement of the three carrier frequencies $F\_1$, $F\_2$, and $F\_3$ is set so as to satisfy Equation (4), and the frequency arrangement of the three carrier frequencies $F\_2$, $F\_3$, and $F\_4$ is set so as to satisfy Equation (11).

An intermodulation wave (distortion frequency IM23) generated on a lower-frequency side than the lowest carrier frequency $F\_L$ ($=F\_2$) of the three carrier frequencies $F\_2$, $F\_3$, and $F\_4$, the intermodulation wave being one of intermodulation waves generated on the basis of the lowest carrier frequency F_L (=F_2) and the intermediate carrier frequency F_M (=F_3) of the three carrier frequencies F_2, F_3, and F_4, is not present within the band of the modulated signal based on the carrier frequency (=F_1) on a lower-frequency side than the lowest carrier frequency F_L (=F_2). That is, the fourth condition is satisfied.

An intermodulation wave (distortion frequency IM32) generated on a higher-frequency side than the highest carrier frequency F_H (=F_3) of the three carrier frequencies F_1, F_2, and F_3, the intermodulation wave being one of intermodulation waves generated on the basis of the highest carrier frequency F_H (=F_3) and the intermediate carrier frequency F_M (=F_2) of the three carrier frequencies F_1, F_2, and F_3, is not present within the band of the modulated signal based on the carrier frequency (=F_4) on a higher-frequency side than the highest carrier frequency F_H (=F_3). That is, the fifth condition is satisfied.

Thereby, as in three-band frequency arrangement, the linear performance of the amplifier, the frequency mixing section (mixer) and the like of the receiver can be relaxed without a band limiting filter having a high degree of selectivity being used, and cost reduction, reduction in power consumption, reduction in circuit scale, and the like can be achieved.

Incidentally, when Bw4_L=Bw4_H, Bw4_L=Bw4_H=Bw4/2. Thus, Equation (11) can be modified into Equation (12-1). Further, when the total bands of the respective modulated signals are equal to each other, and are Bw (=Bw1=Bw2=Bw3=Bw4), Equation (12-1) can be simplified as in Equation (12-2). Further, setting D12=D34, Equation (12-2) can be modified into Equation (12-3).

[Equation 12]

$$Bw3/2+Bw4/2<D34<D23-(Bw2 \text{ or } Bw4 \text{ whichever is greater})/2 \quad (12\text{-}1)$$

$$Bw<D34<D23-Bw/2 \quad (12\text{-}2)$$

$$Bw<D12<D23-Bw/2 \quad (12\text{-}3)$$

Second Example

A second example is a mode in which a fourth carrier frequency is newly added on a lower-frequency side on the basis of the second example of three-band frequency arrangement. Let F_0 be the fourth carrier frequency, and the height of the frequencies is set such that F_0<F_1<F_2<F_3. Then, the method for determining a three-band frequency arrangement is similarly applied to the three carrier frequencies F_0, F_1, and F_2.

The lowest carrier frequency F_L of the three carrier frequencies F_0, F_1, and F_2 is the carrier frequency F_0, the intermediate carrier frequency F_M of the three carrier frequencies F_0, F_1, and F_2 is the carrier frequency F_1, and the highest carrier frequency F_H of the three carrier frequencies F_0, F_1, and F_2 is the carrier frequency F_2.

Let D01 be a frequency difference between the carrier frequency F_0 and the carrier frequency F_1 (=F_1–F_0). A first frequency difference Δ1 obtained as a difference between the lowest carrier frequency F_L (=F_0) and the intermediate carrier frequency F_M (=F_1) of the three carrier frequencies F_0, F_1, and F_2 is D01. A second frequency difference Δ2 obtained as a difference between the highest carrier frequency F_H (=F_2) and the intermediate carrier frequency F_M (=F_1) of the three carrier frequencies F_0, F_1, and F_2 is D12.

Let Bw0 be the total reception bandwidth of a modulated signal based on the carrier frequency F_0. Let Bw0_L be a reception bandwidth on a low-frequency side of the total reception bandwidth Bw0. Let Bw0_H be a reception bandwidth on a high-frequency side of the total reception bandwidth Bw0. Let H01 be a band interval between the modulated signal based on the carrier frequency F_0 and the modulated signal based on the carrier frequency F_1. In terms of an equation, the band interval H01 is "D01–Bw0_H–Bw1_L."

Let IM01 be the distortion frequency (=2F_0–F_1) of a low-frequency component (component on a low-frequency side) of third-order intermodulation distortion components generated on the basis of the carrier frequency F_0 and the carrier frequency F_1. Let IM10 be the distortion frequency (=2F_1–F_0) of a high-frequency component (component on a high-frequency side) of the third-order intermodulation distortion components generated on the basis of the carrier frequency F_0 and the carrier frequency F_1.

In these cases, as for the frequency arrangement of the three carrier frequencies F_0, F_1, and F_2, it suffices to similarly apply the method for determining the first example of three-band frequency arrangement with D01<D12.

Though not described in detail, the first frequency difference Δ1 (=D01) obtained as the difference between the carrier frequency F_L (=F_0) and the carrier frequency F_M (=F_1) is defined in a range shown in Equation (13) as a modification of Equation (4).

[Equation 13]

$$Bw0\_H+Bw1\_L<D01<D12-(Bw0\_L \text{ or } Bw2\_L \text{ whichever is greater}) \quad (13)$$

"Bw0_H+Bw1_L<D01" in Equation (13) corresponds to the above-described first condition. "D01<D12–(Bw0_L or Bw2_L whichever is greater)" in Equation (13) can be modified into "|D01–D12|>(Bw0_L or Bw2_L whichever is greater)," which corresponds to the above-described second condition.

Hence, the frequency arrangement of the three carrier frequencies F_1, F_2, and F_3 is set so as to satisfy Equation (9), and the frequency arrangement of the three carrier frequencies F_0, F_1, and F_2 is set so as to satisfy Equation (13).

An intermodulation wave (distortion frequency IM12) generated on a lower-frequency side than the lowest carrier frequency F_L (=F_1) of the three carrier frequencies F_1, F_2, and F_3, the intermodulation wave being one of intermodulation waves generated on the basis of the lowest carrier frequency F_L (=F_1) and the intermediate carrier frequency F_M (=F_2) of the three carrier frequencies F_1, F_2, and F_3, is not present within the band of the modulated signal based on the carrier frequency (=F_0) on a lower-frequency side than the lowest carrier frequency F_L (=F_1).

An intermodulation wave (distortion frequency IM21) generated on a higher-frequency side than the highest carrier frequency F_H (=F_2) of the three carrier frequencies F_0, F_1, and F_2, the intermodulation wave being one of intermodulation waves generated on the basis of the highest carrier frequency F_H (=F_2) and the intermediate carrier frequency F_M (=F_1) of the three carrier frequencies F_0, F_1, and F_2, is not present within the band of the modulated signal based on the carrier frequency (=F_3) on a higher-frequency side than the highest carrier frequency F_H (=F_2).

Thereby, as in three-band frequency arrangement, the linear performance of the amplifier, the frequency mixing section (mixer) and the like of the receiver can be relaxed without a band limiting filter having a high degree of selectivity being used, and cost reduction, reduction in power consumption, reduction in circuit scale, and the like can be achieved.

Incidentally, when $Bw0\_L=Bw0\_H$, $Bw0\_L=Bw0\_H=Bw0/2$. Thus, Equation (13) can be modified into Equation (14-1). Further, when the total bands of the respective modulated signals are equal to each other, and are Bw ($=Bw0=Bw1=Bw2=Bw3$), Equation (14-1) can be simplified as in Equation (14-2). Further, setting $D01=D23$, Equation (14-2) can be modified into Equation (14-3).

[Equation 14]

$$Bw0/2+Bw1/2<D01<D12-(Bw0 \text{ or } Bw2 \text{ whichever is greater})/2 \quad (14\text{-}1)$$

$$Bw<D01<D12-Bw/2 \quad (14\text{-}2)$$

$$Bw<D23<D12-Bw/2 \quad (14\text{-}3)$$

<Five-Band Frequency Arrangement>

Figures 6A, 6B, 6C:
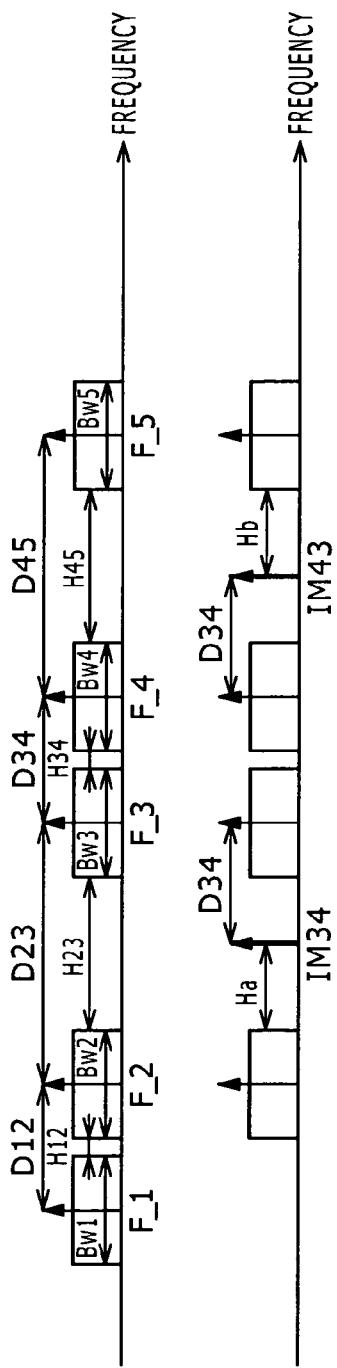
FIGS. 6A to 6C are diagrams of assistance in explaining a first example of five-band frequency arrangement.

FIGS. 6A, 6B, and 6C and FIGS. 7A, 7B, and 7C are diagrams of assistance in explaining a method for determining a frequency arrangement in a case where five carrier frequencies different from each other are used (which case will be referred to as five bands). FIGS. 6A to 6C show a first example of a five-band frequency arrangement. FIGS. 7A to 7C show a second example of a five-band frequency arrangement.

As for conditions for preventing the respective bands of the modulated signals based on the five respective carrier frequencies from overlapping each other and for preventing the frequency of an Nth-order intermodulation distortion component (third-order intermodulation distortion component in this case) generated on the basis of two carrier frequencies adjacent to each other from being present within any of the bands of the modulated signals based on each carrier frequency, it suffices to similarly apply the method for determining a three-band frequency arrangement to three carrier frequencies adjacent to each other which carrier frequencies include a fifth carrier frequency newly added on a lower-frequency side or a higher-frequency side on the basis of the frequency arrangement determined at the time of four bands.

Concrete description will be made in the following. Incidentally, for the convenience of description of the height relation of the frequencies, description will be made of examples as examples of modification based on the first example of four-band frequency arrangement.

First Example

A first example is a mode in which a fifth carrier frequency is newly added on a higher-frequency side on the basis of the first example of four-band frequency arrangement. Let F_5 be the fifth carrier frequency, and the height of the frequencies is set such that $F\_1<F\_2<F\_3<F\_4<F\_5$. Then, the method for determining a three-band frequency arrangement is similarly applied to the three carrier frequencies F_3, F_4, and F_5.

Incidentally, it is considered that the beats of not adjoining carrier frequencies, for example the carrier frequencies F_3, F_4, and F_5 for the carrier frequency F_1, do not disturb a modulated signal based on the carrier frequency F_1 as bands. This similarly applies to a second example.

The lowest carrier frequency F_L of the three carrier frequencies F_3, F_4, and F_5 is the carrier frequency F_3, the intermediate carrier frequency F_M of the three carrier frequencies F_3, F_4, and F_5 is the carrier frequency F_4, and the highest carrier frequency F_H of the three carrier frequencies F_3, F_4, and F_5 is the carrier frequency F_5.

Let D45 be a frequency difference between the carrier frequency F_4 and the carrier frequency F_5 ($=F\_5-F\_4$). A first frequency difference Δ1 obtained as a difference between the lowest carrier frequency F_L ($=F\_3$) and the intermediate carrier frequency F_M ($=F\_4$) of the three carrier frequencies F_3, F_4, and F_5 is D34. A second frequency difference Δ2 obtained as a difference between the highest carrier frequency F_H ($=F\_5$) and the intermediate carrier frequency F_M ($=F\_4$) of the three carrier frequencies F_3, F_4, and F_5 is D45.

Let Bw5 be the total reception bandwidth of a modulated signal based on the carrier frequency F_5. Let Bw5_L be a reception bandwidth on a low-frequency side of the total reception bandwidth Bw5. Let Bw5_H be a reception bandwidth on a high-frequency side of the total reception bandwidth Bw5. Let H45 be a band interval between the modulated signal based on the carrier frequency F_4 and the modulated signal based on the carrier frequency F_5. In terms of an equation, the band interval H45 is "$D45-Bw4\_H-Bw5\_L$."

Let IM45 be the distortion frequency ($=2F\_4-F\_5$) of a low-frequency component (component on a low-frequency side) of third-order intermodulation distortion components generated on the basis of the carrier frequency F_4 and the carrier frequency F_5. Let IM54 be the distortion frequency ($=2F\_5-F\_4$) of a high-frequency component (component on a high-frequency side) of the third-order intermodulation distortion components generated on the basis of the carrier frequency F_4 and the carrier frequency F_5.

In these cases, as for the frequency arrangement of the three carrier frequencies F_3, F_4, and F_5, it suffices to similarly apply the method for determining the first example of three-band frequency arrangement with D34<D45.

Though not described in detail, the first frequency difference Δ1 ($=D34$) obtained as the difference between the carrier frequency F_L ($=F\_3$) and the carrier frequency F_M ($=F\_4$) is defined in a range shown in Equation (15) as a modification of Equation (4).

[Equation 15]

$$Bw3\_H+Bw4\_L<D34<D45-(Bw3\_L \text{ or } Bw5\_L \text{ whichever is greater}) \quad (15)$$

"$Bw3\_H+Bw4\_L<D34$" in Equation (15) corresponds to the above-described first condition. "$D34<D45-(Bw3\_L \text{ or } Bw5\_L \text{ whichever is greater})$" in Equation (15) can be modified into "$|D34-D45|>(Bw3\_L \text{ or } Bw5\_L \text{ whichever is greater})$," which corresponds to the above-described second condition.

Hence, the frequency arrangement of the three carrier frequencies F_1, F_2, and F_3 is set so as to satisfy Equation (4), the frequency arrangement of the three carrier frequencies F_2, F_3, and F_4 is set so as to satisfy Equation (11), and the frequency arrangement of the three carrier frequencies F_3, F_4, and F_5 is set so as to satisfy Equation (15). Thereby, as in three-band frequency arrangement, the linear performance of the amplifier, the frequency mixing section (mixer) and the like of the receiver can be relaxed without a band limiting filter having a high degree of selectivity being used, and cost reduction, reduction in power consumption, reduction in circuit scale, and the like can be achieved.

Incidentally, Equation (15) defines the range of the frequency difference D34 as with Equation (11). The frequency difference D34 consequently needs to satisfy both of Equation (11) and Equation (15). Hence, the frequency difference D34 is defined in a range shown in Equation (16) obtained by putting together Equation (11) and Equation (15).

[Equation 16]

$$Bw3\_H+Bw4\_L < D34 < [D23-(Bw2\_H \text{ or } Bw4\_H \text{ whichever is greater})] \text{ or } [D45-(Bw3\_L \text{ or } Bw5\_L \text{ whichever is greater})], \text{ whichever is smaller} \quad (16)$$

In addition, when Bw5_L=Bw5_H, Bw5_L=Bw5_H=Bw5/2. Thus, Equation (15) can be modified into Equation (17-1). Further, when the total bands of the respective modulated signals are equal to each other, and are Bw (=Bw1=Bw2=Bw3=Bw4=Bw5), Equation (17-1) can be simplified as in Equation (17-2). Further, setting D12=D34 and D23=D45, Equation (17-2) can be modified into Equation (17-3).

[Equation 17]

$$Bw3/2+Bw4/2 < D34 < D45-(Bw3 \text{ or } Bw5 \text{ whichever is greater})/2 \quad (17\text{-}1)$$

$$Bw < D34 < D45-Bw/2 \quad (17\text{-}2)$$

$$Bw < D12 < D23-Bw/2 \quad (17\text{-}3)$$

Second Example

A second example is a mode in which a fifth carrier frequency is newly added on a lower-frequency side on the basis of the first example of four-band frequency arrangement. Let F_0 be the fifth carrier frequency, and the height of the frequencies is set such that F_0<F_1<F_2<F_3<F_4. Then, the method for determining a three-band frequency arrangement is similarly applied to the three carrier frequencies F_0, F_1, and F_2.

The lowest carrier frequency F_L of the three carrier frequencies F_0, F_1, and F_2 is the carrier frequency F_0, the intermediate carrier frequency F_M of the three carrier frequencies F_0, F_1, and F_2 is the carrier frequency F_1, and the highest carrier frequency F_H of the three carrier frequencies F_0, F_1, and F_2 is the carrier frequency F_2.

The frequencies and frequency differences are similar to those described in the method for determining the second example of four-band frequency arrangement. As for the frequency arrangement of the three carrier frequencies F_0, F_1, and F_2, the method for determining the second example of three-band frequency arrangement is similarly applied with D01>D12.

Though not described in detail, a second frequency difference Δ2 (=D12) obtained as the difference between the carrier frequency F_H (=F_2) and the carrier frequency F_M (=F_1) is defined in a range shown in Equation (18) as a modification of Equation (9).

[Equation 18]

$$Bw1\_H+Bw2\_L < D12 < D01-(Bw0\_H \text{ or } Bw2\_H \text{ whichever is greater}) \quad (18)$$

"Bw1_H+Bw2_L<D12" in Equation (18) corresponds to the above-described first condition. "D12<D01−(Bw0_H or Bw2_H whichever is greater)" in Equation (18) can be modified into "|D01−D12|>(Bw0_H or Bw2_H whichever is greater)," which corresponds to the above-described second condition.

Hence, the frequency arrangement of the three carrier frequencies F_1, F_2, and F_3 is set so as to satisfy Equation (4), the frequency arrangement of the three carrier frequencies F_2, F_3, and F_4 is set so as to satisfy Equation (11), and the frequency arrangement of the three carrier frequencies F_0, F_1, and F_2 is set so as to satisfy Equation (18). Thereby, as in three-band frequency arrangement, the linear performance of the amplifier, the frequency mixing section (mixer) and the like of the receiver can be relaxed without a band limiting filter having a high degree of selectivity being used, and cost reduction, reduction in power consumption, reduction in circuit scale, and the like can be achieved.

Incidentally, Equation (18) defines the range of the frequency difference D12 as with Equation (4). The frequency difference D12 consequently needs to satisfy both of Equation (4) and Equation (18). Hence, the frequency difference D12 is defined in a range shown in Equation (19) obtained by putting together Equation (4) and Equation (18).

[Equation 19]

$$Bw1\_H+Bw2\_L < D12 < [D23-(Bw1\_L \text{ or } Bw3\_L \text{ whichever is greater})] \text{ or } [D01-(Bw0\_H \text{ or } Bw2\_H \text{ whichever is greater})], \text{ whichever is smaller} \quad (19)$$

In addition, when Bw0_L=Bw0_H, Bw0_L=Bw0_H=Bw0/2. Thus, Equation (18) can be modified into Equation (20-1). Further, when the total bands of the respective modulated signals are equal to each other, and are Bw (=Bw0=Bw1=Bw2=Bw3=Bw4), Equation (20-1) can be simplified as in Equation (20-2). Further, setting D12=D34 and D01=D23, Equation (20-2) can be modified into Equation (20-3).

[Equation 20]

$$Bw1/2+Bw2/2 < D12 < D01-(Bw0 \text{ or } Bw2 \text{ whichever is greater})/2 \quad (20\text{-}1)$$

$$Bw < D12 < D01-Bw/2 \quad (20\text{-}2)$$

$$Bw < D12 < D23-Bw/2 \quad (20\text{-}3)$$

In each of the first example and the second example, the fourth condition is satisfied, the fourth condition being that an intermodulation wave generated on a lower-frequency side than the lowest carrier frequency F_L of three carrier frequencies adjacent to each other, the intermodulation wave being one of intermodulation waves generated on the basis of the lowest carrier frequency F_L and the intermediate carrier frequency F_M of the three carrier frequencies adjacent to each other, be not present within the band of a modulated signal based on a carrier frequency on a lower-frequency side than the lowest carrier frequency F_L. Incidentally, the combination of the "three carrier frequencies adjacent to each other" is "F_2, F_3, and F_4" or "F_3, F_4, and F_5" in the case of the first example, and is "F_1, F_2, and F_3" or "F_2, F_3, and F_4" in the case of the second example.

In addition, in each of the first example and the second example, the fifth condition is satisfied, the fifth condition being that an intermodulation wave generated on a higher-frequency side than the highest carrier frequency F_H of three carrier frequencies adjacent to each other, the intermodulation wave being one of intermodulation waves generated on the basis of the highest carrier frequency F_H and the intermediate carrier frequency F_M of the three carrier frequencies adjacent to each other, be not present within the band of a modulated signal based on a carrier frequency on a higher-frequency side than the highest carrier frequency F_H. Incidentally, the combination of the "three carrier frequencies adjacent to each other" is "F_1, F_2, and F_3" or "F_2, F_3, and F_4" in the case of the first example, and is "F_0, F_1, and F_2" or "F_1, F_2, and F_3" in the case of the second example.

<Six-Band Frequency Arrangement>

FIGS. 8A, 8B, and 8C and FIGS. 9A, 9B, and 9C are diagrams of assistance in explaining a method for determining a frequency arrangement in a case where six carrier frequencies different from each other are used (which case will be referred to as six bands). FIGS. 8A to 8C show a first example of a six-band frequency arrangement. FIGS. 9A to 9C show a second example of a six-band frequency arrangement.

As for conditions for preventing the respective bands of the modulated signals based on the six respective carrier frequencies from overlapping each other and for preventing the frequency of an Nth-order intermodulation distortion component (third-order intermodulation distortion component in this case) generated on the basis of two carrier frequencies adjacent to each other from being present within any of the bands of the modulated signals based on each carrier frequency, it suffices to similarly apply the method for determining a three-band frequency arrangement to three carrier frequencies adjacent to each other which carrier frequencies include a sixth carrier frequency newly added on a lower-frequency side or a higher-frequency side on the basis of the frequency arrangement determined at the time of five bands.

Concrete description will be made in the following. Incidentally, for the convenience of description of the height relation of the frequencies, description will be made of examples as examples of modification based on the first example of five-band frequency arrangement.

First Example

A first example is a mode in which a sixth carrier frequency is newly added on a higher-frequency side on the basis of the first example of five-band frequency arrangement. Let F_6 be the sixth carrier frequency, and the height of the frequencies is set such that F_1<F_2<F_3<F_4<F_5<F_6. Then, the method for determining a three-band frequency arrangement is similarly applied to the three carrier frequencies F_4, F_5, and F_6.

Incidentally, it is considered that the beats of not adjoining carrier frequencies, for example the carrier frequencies F_3, F_4, and F_5 for the carrier frequency F_1, do not disturb a modulated signal based on the carrier frequency F_1 as bands. This similarly applies to a second example.

The lowest carrier frequency F_L of the three carrier frequencies F_4, F_5, and F_6 is the carrier frequency F_4, the intermediate carrier frequency F_M of the three carrier frequencies F_4, F_5, and F_6 is the carrier frequency F_5, and the highest carrier frequency F_H of the three carrier frequencies F_4, F_5, and F_6 is the carrier frequency F_6.

Let D56 be a frequency difference between the carrier frequency F_5 and the carrier frequency F_6 (=F_6−F_5). A first frequency difference Δ1 obtained as a difference between the lowest carrier frequency F_L (=F_4) and the intermediate carrier frequency F_M (=F_5) of the three carrier frequencies F_4, F_5, and F_6 is D45. A second frequency difference Δ2 obtained as a difference between the highest carrier frequency F_H (=F_6) and the intermediate carrier frequency F_M (=F_5) of the three carrier frequencies F_4, F_5, and F_6 is D56.

Let Bw6 be the total reception bandwidth of a modulated signal based on the carrier frequency F_6. Let Bw6L be a reception bandwidth on a low-frequency side of the total reception bandwidth Bw6. Let Bw6_H be a reception bandwidth on a high-frequency side of the total reception bandwidth Bw6. Let H56 be a band interval between the modulated signal based on the carrier frequency. F_5 and the modulated signal based on the carrier frequency F_6. In terms of an equation, the band interval H56 is "D56−Bw5_H−Bw6_L."

Let IM56 be the distortion frequency (=2F_5−F_6) of a low-frequency component (component on a low-frequency side) of third-order intermodulation distortion components generated on the basis of the carrier frequency F_5 and the carrier frequency F_6. Let IM65 be the distortion frequency (=2F_6−F_5) of a high-frequency component (component on a high-frequency side) of the third-order intermodulation distortion components generated on the basis of the carrier frequency F_5 and the carrier frequency F_6.

In these cases, as for the frequency arrangement of the three carrier frequencies F_4, F_5, and F_6, it suffices to similarly apply the method for determining the second example of three-band frequency arrangement with D45>D56.

Though not described in detail, the second frequency difference Δ2 (=D56) obtained as the difference between the carrier frequency F_H (=F_6) and the carrier frequency F_M (=F_5) is defined in a range shown in Equation (21) as a modification of Equation (9).

[Equation 21]

$$Bw5\_H+Bw6\_L<D56<D45-(Bw4\_H \text{ or } Bw6\_H \text{ whichever is greater}) \quad (21)$$

"Bw5_H+Bw6_L<D56" in Equation (21) corresponds to the above-described first condition. "D56<D45−(Bw4_H or Bw6_H whichever is greater)" in Equation (21) can be modified into "|D45−D56|>(Bw4_H or Bw6_H whichever is greater)," which corresponds to the above-described third condition.

Hence, the frequency arrangement of the three carrier frequencies F_1, F_2, and F_3 is set so as to satisfy Equation (4), the frequency arrangement of the three carrier frequencies F_2, F_3, and F_4 is set so as to satisfy Equation (11), the frequency arrangement of the three carrier frequencies F_3, F_4, and F_5 is set so as to satisfy Equation (15), and the frequency arrangement of the three carrier frequencies F_4, F_5, and F_6 is set so as to satisfy Equation (21). Alternatively, the frequency arrangement of the three carrier frequencies F_1, F_2, and F_3 is set so as to satisfy Equation (4), the frequency arrangement of the four carrier frequencies F_2, F_3, F_4, and F_5 is set so as to satisfy Equation (16), and the frequency arrangement of the three carrier frequencies F_4, F_5, and F_6 is set so as to satisfy Equation (21). Thereby, as in three-band frequency arrangement, the linear performance of the amplifier, the frequency mixing section (mixer) and the like of the receiver can be relaxed without a band limiting filter having a high degree of selectivity being used, and cost reduction, reduction in power consumption, reduction in circuit scale, and the like can be achieved.

Incidentally, when Bw6_L=Bw6_H, Bw6_L=Bw6_H=Bw6/2. Thus, Equation (21) can be modified into Equation (22-1). Further, when the total bands of the respective modulated signals are equal to each other, and are Bw (=Bw1=Bw2=Bw3=Bw4=Bw5=Bw6), Equation (22-1) can be simplified as in Equation (22-2). Further, setting D12=D34=D56 and D23=D45, Equation (22-2) can be modified into Equation (22-3).

[Equation 22]

$$Bw5/2+Bw6/2<D56<D45-(Bw4 \text{ or } Bw6 \text{ whichever is greater})/2 \quad (22\text{-}1)$$

$$Bw<D56<D45-Bw/2 \quad (22\text{-}2)$$

$$Bw<D12<D23-Bw/2 \quad (22\text{-}3)$$

Second Example

A second example is a mode in which a sixth carrier frequency is newly added on a lower-frequency side on the basis of the first example of five-band frequency arrangement. Let F_0 be the sixth carrier frequency, and the height of the frequencies is set such that F_0<F_1<F_2<F_3<F_4<F_5. Then, the method for determining a three-band frequency arrangement is similarly applied to the three carrier frequencies F_0, F_1, and F_2.

The lowest carrier frequency F_L of the three carrier frequencies F_0, F_1, and F_2 is the carrier frequency F_0, the intermediate carrier frequency F_M of the three carrier frequencies F_0, F_1, and F_2 is the carrier frequency F_1, and the highest carrier frequency F_H of the three carrier frequencies F_0, F_1, and F_2 is the carrier frequency F_2.

The frequencies and frequency differences are similar to those described in the method for determining the second example of four-band frequency arrangement. As for the frequency arrangement of the three carrier frequencies F_0, F_1, and F_2, the method for determining the second example of three-band frequency arrangement is similarly applied with D01>D12.

Though not described in detail, a second frequency difference Δ2 (=D12) obtained as the difference between the carrier frequency F_H (=F_2) and the carrier frequency F_M (=F_1) is defined in a range shown in Equation (23) as a modification of Equation (9).

[Equation 23]

$$Bw1\_H+Bw2\_L<D12<D01-(Bw0\_H \text{ or } Bw2\_H \text{ whichever is greater}) \quad (23)$$

Incidentally, Equation (23) is the same as Equation (18), and defines the range of the frequency difference D12 as with Equation (4) and Equation (18). The frequency difference D12 is consequently defined in a range shown in Equation (19) obtained by putting together Equation (4) and Equation (23).

The frequency arrangement of the three carrier frequencies F_1, F_2, and F_3 is set so as to satisfy Equation (4), the frequency arrangement of the three carrier frequencies F_2, F_3, and F_4 is set so as to satisfy Equation (11), the frequency arrangement of the three carrier frequencies F_3, F_4, and F_5 is set so as to satisfy Equation (15), and the frequency arrangement of the three carrier frequencies F_0, F_1, and F_2 is set so as to satisfy Equation (23). Alternatively, the frequency arrangement of the three carrier frequencies F_1, F_2, and F_3 is set so as to satisfy Equation (4), the frequency arrangement of the four carrier frequencies F_2, F_3, F_4, and F_5 is set so as to satisfy Equation (16), and the frequency arrangement of the three carrier frequencies F_0, F_1, and F_2 is set so as to satisfy Equation (23). Thereby, as in three-band frequency arrangement, the linear performance of the amplifier, the frequency mixing section (mixer) and the like of the receiver can be relaxed without a band limiting filter having a high degree of selectivity being used, and cost reduction, reduction in power consumption, reduction in circuit scale, and the like can be achieved.

Incidentally, when Bw0_L=Bw0_H, Bw0_L=Bw0_H=Bw0/2. Thus, Equation (23) can be modified into Equation (24-1). Further, when the total bands of the respective modulated signals are equal to each other, and are Bw (=Bw0=Bw1=Bw2=Bw3=Bw4=Bw5), Equation (24-1) can be simplified as in Equation (24-2). Further, setting D12=D34 and D01=D23=D45, Equation (24-2) can be modified into Equation (24-3).

[Equation 24]

$$Bw1/2+Bw2/2<D12<D01-(Bw0 \text{ or } Bw2 \text{ whichever is greater})/2 \quad (24\text{-}1)$$

$$Bw<D12<D01-Bw/2 \quad (24\text{-}2)$$

$$Bw<D12<D23-Bw/2 \quad (24\text{-}3)$$

In each of the first example and the second example, the fourth condition is satisfied, the fourth condition being that an intermodulation wave generated on a lower-frequency side than the lowest carrier frequency F_L of three carrier frequencies adjacent to each other, the intermodulation wave being one of intermodulation waves generated on the basis of the lowest carrier frequency F_L and the intermediate carrier frequency F_M of the three carrier frequencies adjacent to each other, be not present within the band of a modulated signal based on a carrier frequency on a lower-frequency side than the lowest carrier frequency F_L. Incidentally, the combination of the "three carrier frequencies adjacent to each other" is "F_2, F_3, and F_4" or "F_3, F_4, and F_5" or "F_4, F_5, and F_6" in the case of the first example, and is "F_1, F_2, and F_3" or "F_2, F_3, and F_4" or "F_3, F_4, and F_5" in the case of the second example.

In addition, in each of the first example and the second example, the fifth condition is satisfied, the fifth condition being that an intermodulation wave generated on a higher-frequency side than the highest carrier frequency F_H of three carrier frequencies adjacent to each other, the intermodulation wave being one of intermodulation waves generated on the basis of the highest carrier frequency F_H and the intermediate carrier frequency F_M of the three carrier frequencies adjacent to each other, be not present within the band of a modulated signal based on a carrier frequency on a higher-frequency side than the highest carrier frequency F_H. Incidentally, the combination of the "three carrier frequencies adjacent to each other" is "F_1, F_2, and F_3" or "F_2, F_3, and F_4" or "F_3, F_4, and F_5" in the case of the first example, and is "F_0, F_1, and F_2" or "F_1, F_2, and F_3" or "F_2, F_3, and F_4" in the case of the second example.

<Seven-Band Frequency Arrangement>

FIGS. 10A, 10B, and 100 and FIGS. 11A, 11B, and 11C are diagrams of assistance in explaining a method for determining a frequency arrangement in a case where seven carrier frequencies different from each other are used (which case will be referred to as seven bands). FIGS. 10A to 10C show a first example of a seven-band frequency arrangement. FIGS. 11A to 11C show a second example of a seven-band frequency arrangement.

As for conditions for preventing the respective bands of the modulated signals based on the seven respective carrier frequencies from overlapping each other and for preventing the frequency of an Nth-order intermodulation distortion component (third-order intermodulation distortion component in this case) generated on the basis of two carrier frequencies adjacent to each other from being present within any of the bands of the modulated signals based on each carrier frequency, it suffices to similarly apply the method for determining a three-band frequency arrangement to three carrier frequencies adjacent to each other which carrier frequencies include a seventh carrier frequency newly added on a lower-frequency side or a higher-frequency side on the basis of the frequency arrangement determined at the time of six bands.

Concrete description will be made in the following. Incidentally, for the convenience of description of the height relation of the frequencies, description will be made of examples as examples of modification based on the first example of six-band frequency arrangement.

First Example

A first example is a mode in which a seventh carrier frequency is newly added on a higher-frequency side on the basis of the first example of six-band frequency arrangement. Let $F\_7$ be the seventh carrier frequency, and the height of the frequencies is set such that $F\_1 < F\_2 < F\_3 < F\_4 < F\_5 < F\_6 < F\_7$. Then, the method for determining a three-band frequency arrangement is similarly applied to the three carrier frequencies $F\_5$, $F\_6$, and $F\_7$.

The lowest carrier frequency $F\_L$ of the three carrier frequencies $F\_5$, $F\_6$, and $F\_7$ is the carrier frequency $F\_5$, the intermediate carrier frequency $F\_M$ of the three carrier frequencies $F\_5$, $F\_6$, and $F\_7$ is the carrier frequency $F\_6$, and the highest carrier frequency $F\_H$ of the three carrier frequencies $F\_5$, $F\_6$, and $F\_7$ is the carrier frequency $F\_7$.

Let D67 be a frequency difference between the carrier frequency $F\_6$ and the carrier frequency $F\_7$ (=$F\_7-F\_6$). A first frequency difference $\Delta1$ obtained as a difference between the lowest carrier frequency $F\_L$ (=$F\_5$) and the intermediate carrier frequency $F\_M$ (=$F\_6$) of the three carrier frequencies $F\_5$, $F\_6$, and $F\_7$ is D56. A second frequency difference $\Delta2$ obtained as a difference between the highest carrier frequency $F\_H$ (=$F\_7$) and the intermediate carrier frequency $F\_M$ (=$F\_6$) of the three carrier frequencies $F\_5$, $F\_6$, and $F\_7$ is D67.

Let Bw7 be the total reception bandwidth of a modulated signal based on the carrier frequency $F\_7$. Let Bw7_L be a reception bandwidth on a low-frequency side of the total reception bandwidth Bw7. Let Bw7_H be a reception bandwidth on a high-frequency side of the total reception bandwidth Bw7. Let H67 be a band interval between the modulated signal based on the carrier frequency $F\_6$ and the modulated signal based on the carrier frequency $F\_7$. In terms of an equation, the band interval H67 is "D67−Bw6_H−Bw7_L."

Let IM67 be the distortion frequency (=$2F\_6-F\_7$) of a low-frequency component (component on a low-frequency side) of third-order intermodulation distortion components generated on the basis of the carrier frequency $F\_6$ and the carrier frequency $F\_7$. Let IM76 be the distortion frequency (=$2F\_7-F\_6$) of a high-frequency component (component on a high-frequency side) of the third-order intermodulation distortion components generated on the basis of the carrier frequency $F\_6$ and the carrier frequency $F\_7$.

In these cases, as for the frequency arrangement of the three carrier frequencies $F\_5$, $F\_6$, and $F\_7$, it suffices to similarly apply the method for determining the first example of three-band frequency arrangement with D56<D67.

Though not described in detail, the first frequency difference $\Delta1$ (=D56) obtained as the difference between the carrier frequency $F\_L$ (=$F\_5$) and the carrier frequency $F\_M$ (=$F\_6$) is defined in a range shown in Equation (25) as a modification of Equation (4).

[Equation 25]

$$Bw5\_H + Bw6\_L < D56 < D67 - (Bw5\_L \text{ or } Bw7\_L \text{ whichever is greater}) \quad (25)$$

"Bw5_H+Bw6_L<D56" in Equation (25) corresponds to the above-described first condition. "D56<D67−(Bw5_L or Bw7_L whichever is greater)" in Equation (25) can be modified into "|D56−D67|>(Bw5_L or Bw7_L whichever is greater)," which corresponds to the above-described second condition.

Hence, the frequency arrangement of the three carrier frequencies $F\_1$, $F\_2$, and $F\_3$ is set so as to satisfy Equation (4), the frequency arrangement of the three carrier frequencies $F\_2$, $F\_3$, and $F\_4$ is set so as to satisfy Equation (11), the frequency arrangement of the three carrier frequencies $F\_3$, $F\_4$, and $F\_5$ is set so as to satisfy Equation (15), the frequency arrangement of the three carrier frequencies $F\_4$, $F\_5$, and $F\_6$ is set so as to satisfy Equation (21), and the frequency arrangement of the three carrier frequencies $F\_5$, $F\_6$, and $F\_7$ is set so as to satisfy Equation (25). Alternatively, the frequency arrangement of the three carrier frequencies $F\_1$, $F\_2$, and $F\_3$ is set so as to satisfy Equation (4), the frequency arrangement of the four carrier frequencies $F\_2$, $F\_3$, $F\_4$, and $F\_5$ is set so as to satisfy Equation (16), the frequency arrangement of the three carrier frequencies $F\_4$, $F\_5$, and $F\_6$ is set so as to satisfy Equation (21), and the frequency arrangement of the three carrier frequencies $F\_5$, $F\_6$, and $F\_7$ is set so as to satisfy Equation (25). Thereby, as in three-band frequency arrangement, the linear performance of the amplifier, the frequency mixing section (mixer) and the like of the receiver can be relaxed without a band limiting filter having a high degree of selectivity being used, and cost reduction, reduction in power consumption, reduction in circuit scale, and the like can be achieved.

Incidentally, Equation (25) defines the range of the frequency difference D45 as with Equation (21). The frequency difference D45 consequently needs to satisfy both of Equation (21) and Equation (25). Hence, the frequency difference D45 is defined in a range shown in Equation (26) obtained by putting together Equation (21) and Equation (25).

[Equation 26]

$$Bw5\_H + Bw6\_L < D56 < [D45 - (Bw4\_H \text{ or } Bw6\_H \text{ whichever is greater})] \text{ or } [D67 - (Bw5\_L \text{ or } Bw7\_L \text{ whichever is greater})], \text{ whichever is smaller} \quad (26)$$

In addition, when Bw7_L=Bw7_H, Bw7_L=Bw7_H=Bw7/2. Thus, Equation (25) can be modified into Equation (27-1). Further, when the total bands of the respective modulated signals are equal to each other, and are Bw (=Bw1=Bw2=Bw3=Bw4=Bw5=Bw6=Bw7), Equation (27-1) can be simplified as in Equation (27-2). Further, setting D12=D34=D56 and D23=D45=D67, Equation (27-2) can be modified into Equation (27-3).

[Equation 27]

$$Bw5/2 + Bw6/2 < D56 < D67 - (Bw5 \text{ or } Bw7 \text{ whichever is greater})/2 \quad (27\text{-}1)$$

$$Bw < D56 < D67 - Bw/2 \quad (27\text{-}2)$$

$$Bw < D12 < D23 - Bw/2 \quad (27\text{-}3)$$

Second Example

A second example is a mode in which a seventh carrier frequency is newly added on a lower-frequency side on the basis of the first example of six-band frequency arrangement. Let F_0 be the seventh carrier frequency, and the height of the frequencies is set such that F_0<F_1<F_2<F_3<F_4<F_5<F_6. Then, the method for determining a three-band frequency arrangement is similarly applied to the three carrier frequencies F_0, F_1, and F_2.

The lowest carrier frequency F_L of the three carrier frequencies F_0, F_1, and F_2 is the carrier frequency F_0, the intermediate carrier frequency F_M of the three carrier frequencies F_0, F_1, and F_2 is the carrier frequency F_1, and the highest carrier frequency F_H of the three carrier frequencies F_0, F_1, and F_2 is the carrier frequency F_2.

The frequencies and frequency differences are similar to those described in the method for determining the second example of four-band frequency arrangement. As for the frequency arrangement of the three carrier frequencies F_0, F_1, and F_2, the method for determining the second example of three-band frequency arrangement is similarly applied with D01>D12.

Though not described in detail, a second frequency difference Δ2 (=D12) obtained as the difference between the carrier frequency F_H (=F_2) and the carrier frequency F_M (=F_1) is defined in a range shown in Equation (28) as a modification of Equation (9).

[Equation 28]

$$Bw1\_H + Bw2\_L < D12 < D01 - (Bw0\_H \text{ or } Bw2\_H \text{ whichever is greater}) \quad (28)$$

Incidentally, Equation (28) is the same as Equation (23), and defines the range of the frequency difference D12 as with Equation (4) and Equation (18) and Equation (23). The frequency difference D12 is consequently defined in the range shown in Equation (19) obtained by putting together Equation (4) and Equation (28).

The frequency arrangement of the three carrier frequencies F_1, F_2, and F_3 is set so as to satisfy Equation (4), the frequency arrangement of the three carrier frequencies F_2, F_3, and F_4 is set so as to satisfy Equation (11), the frequency arrangement of the three carrier frequencies F_3, F_4, and F_5 is set so as to satisfy Equation (15), the frequency arrangement of the three carrier frequencies F_4, F_5, and F_6 is set so as to satisfy Equation (21), and the frequency arrangement of the three carrier frequencies F_0, F_1, and F_2 is set so as to satisfy Equation (28). Alternatively, the frequency arrangement of the three carrier frequencies F_1, F_2, and F_3 is set so as to satisfy Equation (4), the frequency arrangement of the four carrier frequencies F_2, F_3, F_4, and F_5 is set so as to satisfy Equation (16), the frequency arrangement of the three carrier frequencies F_4, F_5, and F_6 is set so as to satisfy Equation (21), and the frequency arrangement of the three carrier frequencies F_0, F_1, and F_2 is set so as to satisfy Equation (28). Thereby, as in three-band frequency arrangement, the linear performance of the amplifier, the frequency mixing section (mixer) and the like of the receiver can be relaxed without a band limiting filter having a high degree of selectivity being used, and cost reduction, reduction in power consumption, reduction in circuit scale, and the like can be achieved.

Incidentally, when Bw0_L=Bw0_H, Bw0_L=Bw0_H=Bw0/2. Thus, Equation (28) can be modified into Equation (29-1). Further, when the total bands of the respective modulated signals are equal to each other, and are Bw (=Bw0=Bw1=Bw2=Bw3=Bw4=Bw5=Bw6), Equation (29-1) can be simplified as in Equation (29-2). Further, setting D12=D34=D56 and D01=D23=D45, Equation (29-2) can be modified into Equation (29-3).

[Equation 29]

$$Bw1/2 + Bw2/2 < D12 < D01 - (Bw0 \text{ or } Bw2 \text{ whichever is greater})/2 \quad (29\text{-}1)$$

$$Bw < D12 < D01 - Bw/2 \quad (29\text{-}2)$$

$$Bw < D12 < D23 - Bw/2 \quad (29\text{-}3)$$

In each of the first example and the second example, the fourth condition is satisfied, the fourth condition being that an intermodulation wave generated on a lower-frequency side than the lowest carrier frequency F_L of three carrier frequencies adjacent to each other, the intermodulation wave being one of intermodulation waves generated on the basis of the lowest carrier frequency F_L and the intermediate carrier frequency F_M of the three carrier frequencies adjacent to each other, be not present within the band of a modulated signal based on a carrier frequency on a lower-frequency side than the lowest carrier frequency F_L. Incidentally, the combination of the "three carrier frequencies adjacent to each other" is "F_2, F_3, and F_4" or "F_3, F_4, and F_5" or "F_4, F_5, and F_6" or "F_5, F_6, and F_7" in the case of the first example, and is "F_1, F_2, and F_3" or "F_2, F_3, and F_4" or "F_3, F_4, and F_5" or "F_4, F_5, and F_6" in the case of the second example.

In addition, in each of the first example and the second example, the fifth condition is satisfied, the fifth condition being that an intermodulation wave generated on a higher-frequency side than the highest carrier frequency F_H of three carrier frequencies adjacent to each other, the intermodulation wave being one of intermodulation waves generated on the basis of the highest carrier frequency F_H and the intermediate carrier frequency F_M of the three carrier frequencies adjacent to each other, be not present within the band of a modulated signal based on a carrier frequency on a higher-frequency side than the highest carrier frequency F_H. Incidentally, the combination of the "three carrier frequencies adjacent to each other" is "F_1, F_2, and F_3" or "F_2, F_3, and F_4" or "F_3, F_4, and F_5" or "F_4, F_5, and F_6" in the case of the first example, and is "F_0, F_1, and F_2" or "F_1, F_2, and F_3" or "F_2, F_3, and F_4" or "F_3, F_4, and F_5" in the case of the second example.

<Frequency Arrangement for Eight Bands or More>

While detailed description of frequency arrangement in cases of eight bands or more will be omitted, it is desirable to add one band with the first example of three-band frequency arrangement or the second example of three-band frequency arrangement applied on the basis of frequency arrangement for a number of bands which number is smaller by one than eight or more, as is understood from the description thus far. That is, on the basis of frequency arrangement for a number of bands which number is smaller by one, it is desirable to add a new carrier frequency on a lower-frequency side or a higher-frequency side, apply the first example of frequency arrangement or the second example of frequency arrangement to three carrier frequencies adjacent to each other which carrier frequencies include the added carrier frequency, and determine a frequency arrangement.

<Concrete Examples of Application>

Concrete examples of application will be shown in the following. In order to facilitate description and understanding, description will be made supposing that one communicating device includes one of a modulating section and a demodulating section unless otherwise specified. A communicating device on a transmitting side and a communicating device on a receiving side form a signal transmission apparatus. Incidentally, in the following, a configuration in which each part forming a device is housed within one casing can be a signal transmission apparatus or an electronic device. A signal transmission apparatus or an electronic device may be a discrete device, or a combination of a plurality of signal transmission apparatuses or a plurality of electronic devices may form the whole of a signal transmission apparatus or an electronic device.

It is to be noted that while the present technology will be described using embodiments thereof, the technical scope of the present technology is not limited to the scope described in the embodiments to be described below. Various changes or improvements can be added to the embodiments to be described below without departing from the spirit of the disclosure, and forms obtained by adding such changes or improvements are also included in the technical scope of the present technology. In addition, the embodiments to be described below do not limit the technologies of claims, and not all combinations of features described in the embodiments are necessarily essential to solving means of the technologies. The embodiments to be described below include technologies in various stages, and various technologies can be extracted by appropriately combining a plurality of disclosed constitutional requirements. Each of the embodiments to be described below is not limited to being applied singly, but can also be applied in arbitrary combination within a possible scope. Even when a few constitutional requirements are omitted from all the constitutional requirements disclosed in the embodiments, constitutions resulting from the omission of the few constitutional requirements can be extracted as technologies as long as an effect is obtained.

First Embodiment

Figure 12B:
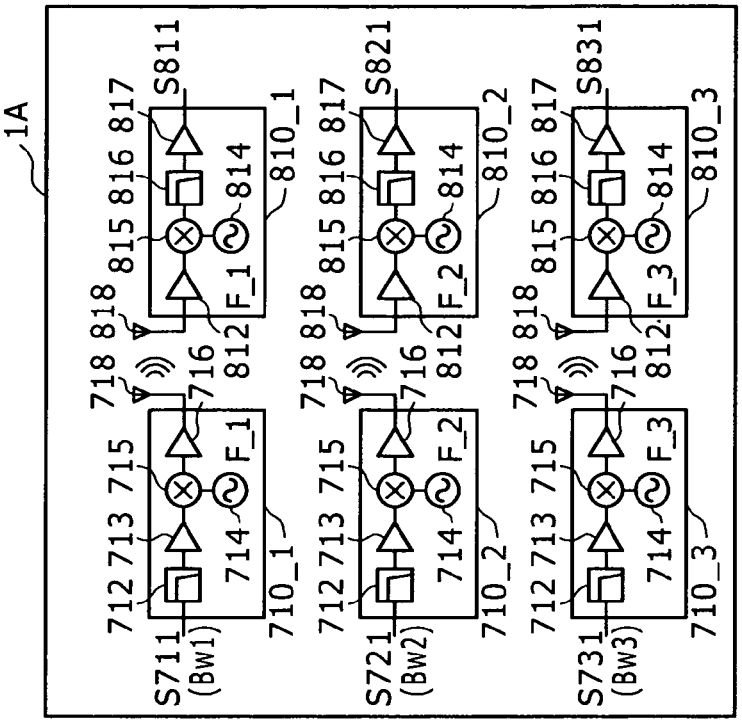
FIGS. 12A to 12C are diagrams of assistance in explaining a first embodiment.
Figure 12A:
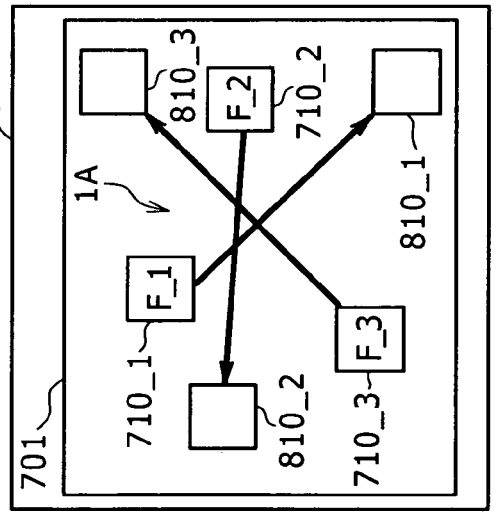
Figure 12C:
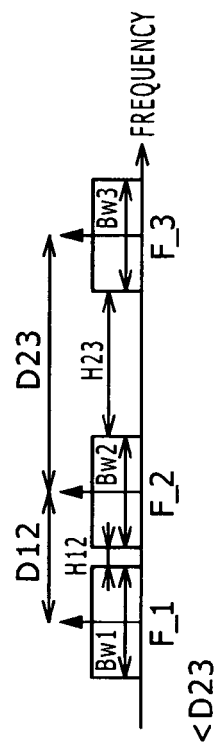

FIGS. 12A, 12B, and 12C are diagrams of assistance in explaining a first embodiment. FIG. 12A shows an image of arrangement of communicating devices. FIG. 12B shows an example of detailed configuration of the communicating devices. FIG. 12C shows an example of frequency arrangement of carrier frequencies.

The first embodiment is a form in which all communicating devices (communicating chips) are mounted within a same board within an electronic device and each carrier frequency is set in advance. A case is assumed in which a combination of three or more sets of transmission and reception is performed at random on the circuit board within the electronic device irrespective of arrangement, the directivity of radio waves, and the like.

For example, FIGS. 12A to 12C represent a case of application of a three-band frequency arrangement. As shown in FIG. 12A, a signal transmission apparatus 1A including three sets for transmission and reception is housed on the circuit board 701 within the electronic device 751, the three sets being a set of a communicating device 710_1 having the functions of a transmitter and a communicating device 810_1 having the functions of a receiver, a set of a communicating device 710_2 having the functions of a transmitter and a communicating device 810_2 having the functions of a receiver, and a set of a communicating device 710_3 having the functions of a transmitter and a communicating device 810_3 having the functions of a receiver.

As shown in FIG. 12B, each of the communicating device 710_1, the communicating device 710_2, and the communicating device 710_3 includes a modulation object signal processing section 712, a signal amplifying section 713, a transmitting side local oscillating section 714 for generating a carrier frequency $F\_@$ (@ is one of 1, 2, and 3) as a local frequency, a frequency mixing section 715 (so-called mixer), and an output amplifying section 716. A transmitting antenna 718 is connected to the output amplifying section 716. The transmitting side local oscillating section 714 and the frequency mixing section 715 form a modulating section. The modulation object signal processing section 712 has for example a low-pass filter, and limits the reception bandwidth of a signal to be modulated. The signal amplifying section 713 multiplies the amplitude of the signal output from the modulation object signal processing section 712 by a gain. The frequency mixing section 715 performs modulation processing by multiplying the signal output from the signal amplifying section 713 by a carrier signal (carrier frequency $F\_@$) from the transmitting side local oscillating section 714. The output amplifying section 716 multiplies the amplitude of the signal modulated by the frequency mixing section 715 by a gain.

As shown in FIG. 12B, each of the communicating device 810_1, the communicating device 810_2, and the communicating device 810_3 includes an input amplifying section 812, a receiving side local oscillating section 814 for generating the carrier frequency $F\_@$, a frequency mixing section 815 (so-called mixer), a demodulated signal processing section 816 (for example a low-pass filter), and an output amplifying section 817. A receiving antenna 818 is connected to the input amplifying section 812. The receiving side local oscillating section 814 and the frequency mixing section 815 form a demodulating section. The input amplifying section 812 multiplies the amplitude of a received signal received by the receiving antenna 818 by a gain. The frequency mixing section 815 performs demodulation processing by multiplying the received signal output from the input amplifying section 812 by a carrier signal (carrier frequency $F\_@$) from the receiving side local oscillating section 814. The demodulated signal processing section 816 has for example a low-pass filter, and limits the reception bandwidth of a demodulated signal. The output amplifying section 817 multiplies the amplitude of the demodulated signal output from the demodulated signal processing section 816 by a gain.

As shown in FIG. 12B, a signal S711 to be modulated with a total reception bandwidth Bw1 is input to the communicating device 710_1, the transmitting side local oscillating section 714 of a carrier frequency $F\_1$ applies modulation, and the transmitting antenna 718 transmits a radio wave. The receiving antenna 818 receives the modulated signal and inputs the modulated signal to the communicating device 810_1, the demodulating section performs demodulation, and a demodulated signal S811 is output from the output amplifying section 817.

As shown in FIG. 12B, a signal S721 to be modulated with a total reception bandwidth Bw2 is input to the communicating device 710_2, the transmitting side local oscillating section 714 of a carrier frequency $F\_2$ applies modulation, and the transmitting antenna 718 transmits a radio wave. The receiving antenna 818 receives the modulated signal and inputs the modulated signal to the communicating device 810_2, the demodulating section performs demodulation, and a demodulated signal S821 is output from the output amplifying section 817.

As shown in FIG. 12B, a signal S731 to be modulated with a total reception bandwidth Bw3 is input to the communicating device 710_3, the transmitting side local oscillating section 714 of a carrier frequency $F\_3$ applies modulation, and the transmitting antenna 718 transmits a radio wave. The receiving antenna 818 receives the modulated signal and inputs the modulated signal to the communicating device

810_3, the demodulating section performs demodulation, and a demodulated signal S831 is output from the output amplifying section 817.

In this case, the first example of three-band frequency arrangement or the second example of three-band frequency arrangement described above is applied as the frequency arrangement of the three carrier frequencies F_1, F_2, and F_3. For example, an example shown in FIG. 12C represents a case in which the first example of three-band frequency arrangement is applied. By presetting the frequency arrangement of the three carrier frequencies F_1, F_2, and F_3 as shown in FIG. 12C, the linear performance of the amplifier, the frequency mixing section (mixer) and the like of the receiver can be relaxed without a band limiting filter having a high degree of selectivity being used, and cost reduction, reduction in power consumption, reduction in circuit scale, and the like can be achieved.

For example, unlike outdoor communication such as so-called cellular communication or the like, intra-device or inter-device radio transmission has features of no change in conditions of a propagation path, no substantial reception power variation or timing variation (no variation at all or very little variation), a short propagation distance, a small multipath delay spread, and the like. These features will be referred to collectively as a feature of "intra-device or inter-device radio transmission." In "intra-device or inter-device radio transmission," unlike outdoor radio communication, it is not necessary to check the conditions of the propagation path at all times, and it may be considered that a setting value set in advance can be used. That is, "intra-device or inter-device radio transmission" may be considered to be radio signal transmission in a static environment, and may be considered to have substantially unvarying communication environment characteristics. This means that "a communication environment is unchanged (fixed), and therefore a parameter setting may also be unchanged (fixed)."

Transmission characteristics between a transmitting unit and a receiving unit can be treated as known transmission characteristics. For example, transmission characteristics between a transmitting unit and a receiving unit can be determined in advance in an environment in which transmission conditions between transmission and reception are essentially unchanged (that is, fixed), as in a case in which the arrangement positions of a transmitting unit and a receiving unit within one casing are not changed (case of intra-device communication) or a case in which the arrangement positions of a transmitting unit and a receiving unit in a state of being used are in a state set in advance even when the transmitting unit and the receiving unit are disposed within respective separate casings (case of radio transmission between devices at a relatively short distance from each other).

For example, as in the present embodiment, when simultaneous communication is performed within a device as a same area or between devices at a relatively short distance from each other with a plurality of sets of modulating circuits and demodulating circuits using respective different carrier frequencies, it may be considered to be impossible that a communication channel using a carrier frequency not assumed appears suddenly. Hence, it suffices for example to determine each carrier frequency to be used for multichannel transmission based on frequency division multiplexing in advance at a time of product shipment or the like, store the information in a memory, and set carrier frequencies to be used for modulation and demodulation at a time of operation on the basis of the information. Unlike a second embodiment to be described later and the like, a combination of transmissions and receptions is fixed. However, a dynamic control mechanism for monitoring communication environment characteristics at all times and set the arrangement of carrier frequencies in an optimum state on the basis of a result of the monitoring is not necessary. It is therefore possible to reduce a circuit scale, and reduce power consumption.

Second Embodiment

FIGS. 13A and 13B are diagrams of assistance in explaining a second embodiment. FIG. 13A shows an image of arrangement of communicating devices and a frequency control block. FIG. 13B shows an example of detailed configuration of the communicating devices as well as a connection relation between the communicating devices and the frequency control block.

The second embodiment is a form in which carrier frequencies can be controlled dynamically, in contrast to the first embodiment. A difference from a third embodiment to be described later lies in that control information is transmitted to only a transmitting side in the second embodiment. Differences from the first embodiment will be described in the following.

A signal transmission apparatus 1B including a frequency control block 702 for controlling three carrier frequencies F_1, F_2, and F_3 on the transmitting side as well as three sets of communicating devices 710 and communicating devices 810 is housed on a circuit board 701 within an electronic device 751. For example, supposing that the frequency control block 702 is a device capable of program execution by software such as a CPU or the like, appropriate frequency allocation can be made dynamically. When simultaneous communication is performed with a plurality of sets of modulating circuits and demodulating circuits using respective different carrier frequencies in intra-device signal transmission by radio (that is, signal transmission by radio within a same area), each carrier frequency can be controlled to be at an optimum position.

Figure 15A:
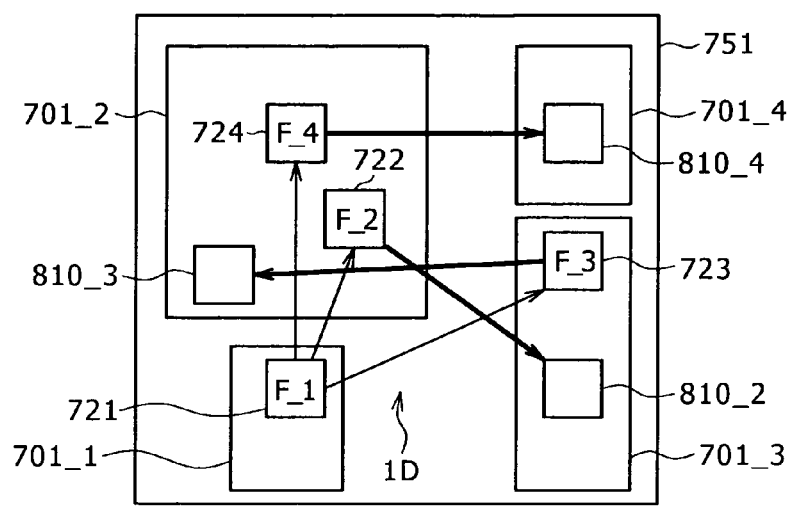
FIGS. 15A and 15B are diagrams of assistance in explaining a fourth embodiment.
Figure 15B:
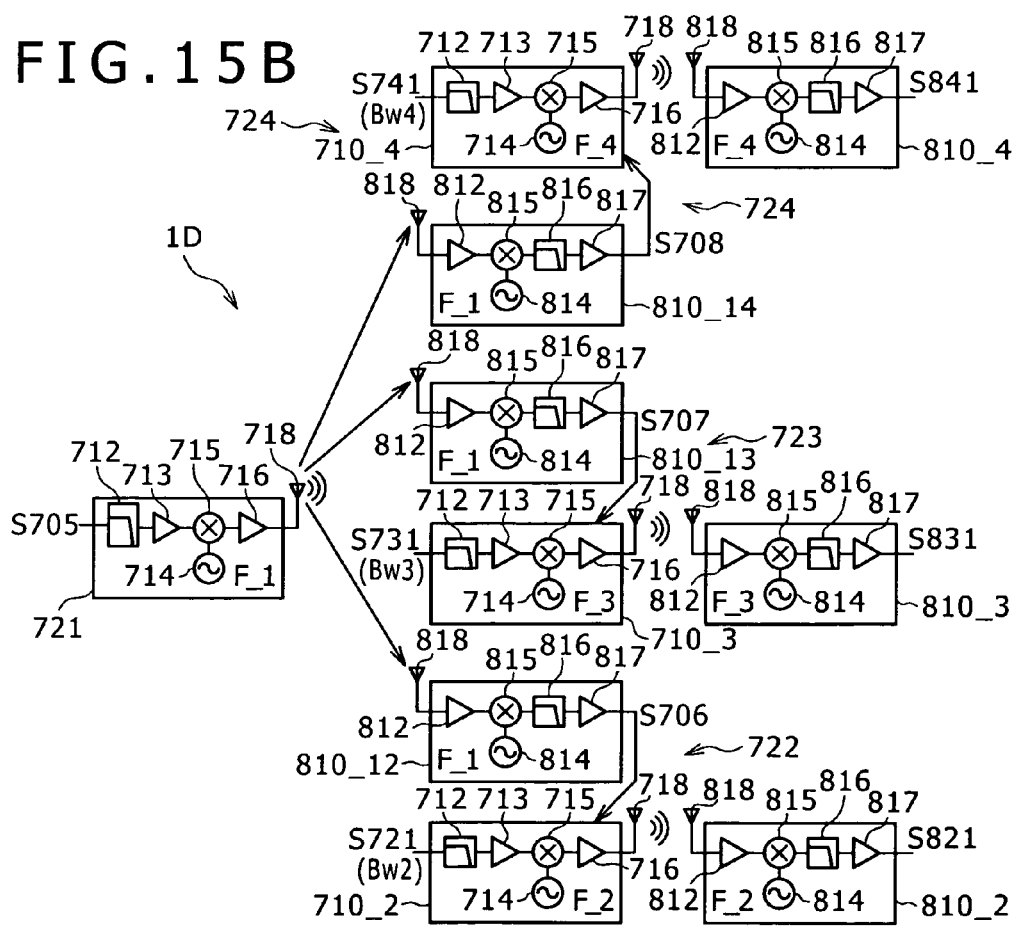

In addition, the signal transmission apparatus 1B is provided with a transmission and reception set for auxiliary use as required. FIGS. 13A and 13B show an example to which a set of a communicating device 710_4 and a communicating device 810_4 (as shown in FIGS. 15A and 15B) for performing modulation and demodulation with a carrier frequency F_4 may optionally be provided as a transmission and reception set for auxiliary use.

Control information S702 including control information for frequency allocation for controlling each carrier frequency F_@ (@ is one of 1, 2, 3, and 4) is supplied from the frequency control block 702 to each communicating device 710. Incidentally, control information other than the control information for frequency allocation may also be supplied from the frequency control block 702 to each communicating device 710.

The transmission of the control information S702 to each communicating device 710 may be by wire or by radio. In this case, however, the transmission of the control information S702 to each communicating device 710 is wired transmission using printed wiring with attention directed to simultaneous communication performed with the plurality of sets of modulating circuits and demodulating circuits within the same board using the respective different carrier frequencies. The wired transmission can make the device configuration more compact than radio transmission.

When the control information S702 is transmitted by radio, a communication band used by the control information S702 is set so as not to use the frequency band of the carrier frequencies used for radio communication of normal modulated signals between the communicating devices 710 and the communicating devices 810 (which frequency band is for example the millimeter wave band or the frequency band from the centimeter wave band below the millimeter wave band to the submillimeter wave band above the millimeter wave band). For example, the control information S702 is desirably transmitted by infrared communication or laser light communication. This is to ensure reliably that the radio transmission of the control information S702 does not hinder the radio transmission of the normal modulated signals.

According to the second embodiment, the frequency control block 702 for controlling the carrier frequencies on the transmitting side makes appropriate frequency allocation, whereby intra-device transmission can be controlled optimally. While frequency allocation can be made at a time of an initial setting, the second embodiment has an advantage of being able to set the carrier frequencies on the transmitting side dynamically at a time of device use.

For example, one band (carrier frequency F_4) for the set of the communicating device 710_4 and the communicating device 810_4 can be newly added (as shown in FIGS. 15A and 15B) in a state of operation in three bands (three carrier frequencies F_1, F_2, and F_3) being already performed by the set of the communicating device 710_1 and the communicating device 810_1, the set of the communicating device 710_2 and the communicating device 810_2, and the set of the communicating device 710_3 and the communicating device 810_3. In addition, the transmission and reception sets can be changed by selecting the carrier frequencies used by the communicating device 710_1, the communicating device 710_2, and the communicating device 710_3, respectively, among the three carrier frequencies F_1, F_2, and F_3 without changing the carrier frequencies for reception.

In addition, though not shown in the figures, information indicating whether disturbance due to intermodulation distortion has occurred or not may be notified from each communicating device 810 to the frequency control block 702, and control may be performed so as to change the carrier frequency used on the side of a disturbing station on the basis of the information. Communication interference due to intermodulation distortion can be prevented even when the carrier frequency used on the side of a disturbed station affected by the communication interference is not changed. The second embodiment is effective in a case in which a frequency arrangement setting is not made properly or as a measure against communication interference caused by an intermodulation distortion component of a fourth order or higher. For example, while it may be possible that the carrier frequency used on the side of a disturbed station is changed when communication interference due to intermodulation distortion has occurred in outdoor radio communication, the disturbed station cannot perform control so as to change the carrier frequency used on the side of a disturbing station, which greatly differs from the second embodiment.

Third Embodiment

Figure 14B:
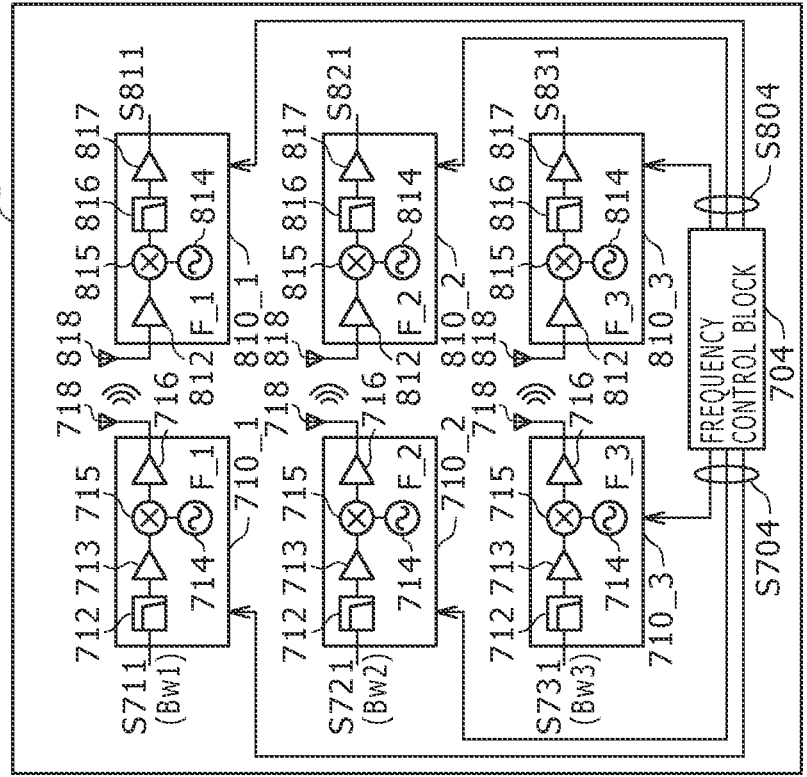
FIGS. 14A and 14B are diagrams of assistance in explaining a third embodiment.
Figure 14A:
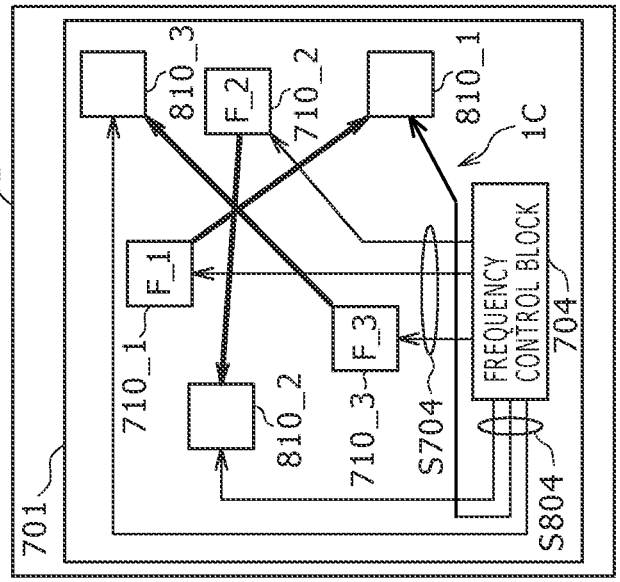

FIGS. 14A and 14B are diagrams of assistance in explaining a third embodiment. FIG. 14A shows an image of arrangement of communicating devices and a frequency control block. FIG. 14B shows an example of detailed configuration of the communicating devices as well as a connection relation between the communicating devices and the frequency control block.

The third embodiment is similar to the second embodiment in that the third embodiment is a form in which carrier frequencies can be controlled dynamically, in contrast to the first embodiment. A difference from the second embodiment lies in that control information is transmitted also to a receiving side in the third embodiment. Differences from the first embodiment and the second embodiment will be described in the following.

A signal transmission apparatus 1C including a frequency control block 704 for controlling three carrier frequencies F_1, F_2, and F_3 on each of the transmitting side and the receiving side as well as three sets of communicating devices 710 and communicating devices 810 is housed on a circuit board 701 within an electronic device 751. In addition, a transmission and reception set for auxiliary use is provided as required. FIGS. 14A and 14B show an example to which a set of a communicating device 710_4 and a communicating device 810_4 (as shown in FIGS. 15A and 15B) for performing modulation and demodulation with a carrier frequency F_4 may optionally be provided as a transmission and reception set for auxiliary use.

Control information S704 including control information for frequency allocation for controlling each carrier frequency F_@ (@ is one of 1, 2, 3, and 4) is supplied from the frequency control block 704 to each communicating device 710. In addition, control information S804 including control information for frequency allocation for controlling each carrier frequency F_@ (@ is one of 1, 2, 3, and 4) is supplied from the frequency control block 704 to each communicating device 810. Incidentally, control information other than the control information for frequency allocation may also be supplied from the frequency control block 704 to each communicating device 710 and each communicating device 810. The transmission of the control information S704 to each communicating device 710 and the transmission of the control information S804 to each communicating device 810 may be by wire or by radio (for example infrared rays). In this case, however, the transmission of the control information S704 to each communicating device 710 and the transmission of the control information S804 to each communicating device 810 are wired transmission using printed wiring.

According to the third embodiment, the frequency control block 704 for controlling the carrier frequencies on the transmitting side and the receiving side makes appropriate frequency allocation, whereby intra-device transmission can be controlled optimally. While frequency allocation can be made at a time of an initial setting, the third embodiment not only has an advantage of being able to set the carrier frequencies on the transmitting side dynamically at a time of device use but also has an advantage of being able to set the carrier frequencies on the receiving side dynamically and control the operation of the receiver. For example, the transmission and reception sets can be changed by selecting the carrier frequencies used by the communicating device 810_1, the communicating device 810_2, and the communicating device 810_3, respectively, among the three carrier frequencies F_1, F_2, and F_3. Because the carrier frequencies on both of the transmitting side and the receiving side can be changed, a degree of freedom of change is higher than in the configuration that changes the carrier frequencies on only one of the transmitting side and the receiving side.

Example of Modification of Second Embodiment or Third Embodiment

Though not shown, a configuration in which the carrier frequencies for reception can be controlled dynamically by transmitting control information to only the receiving side may be adopted as an example of modification of second or third embodiment. In this case, the transmission and reception sets can be, changed by changing the carrier frequencies for reception without changing the carrier frequencies for transmission.

Fourth Embodiment

Figure 16A:
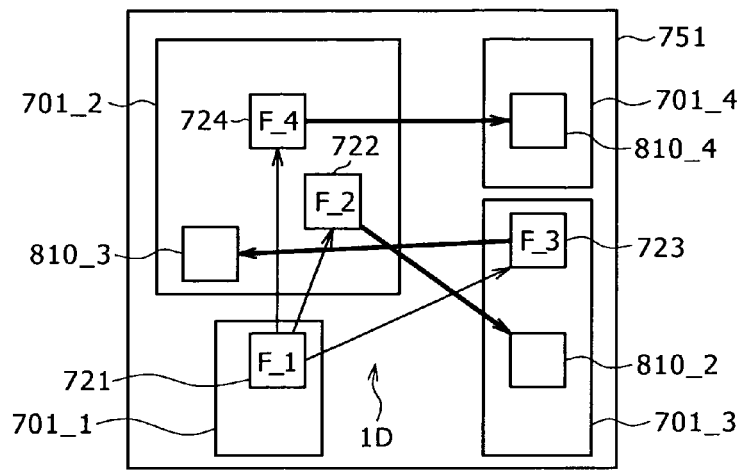
FIGS. 16A and 16B are diagrams of assistance in explaining an example of modification of the fourth embodiment.
Figure 16B:
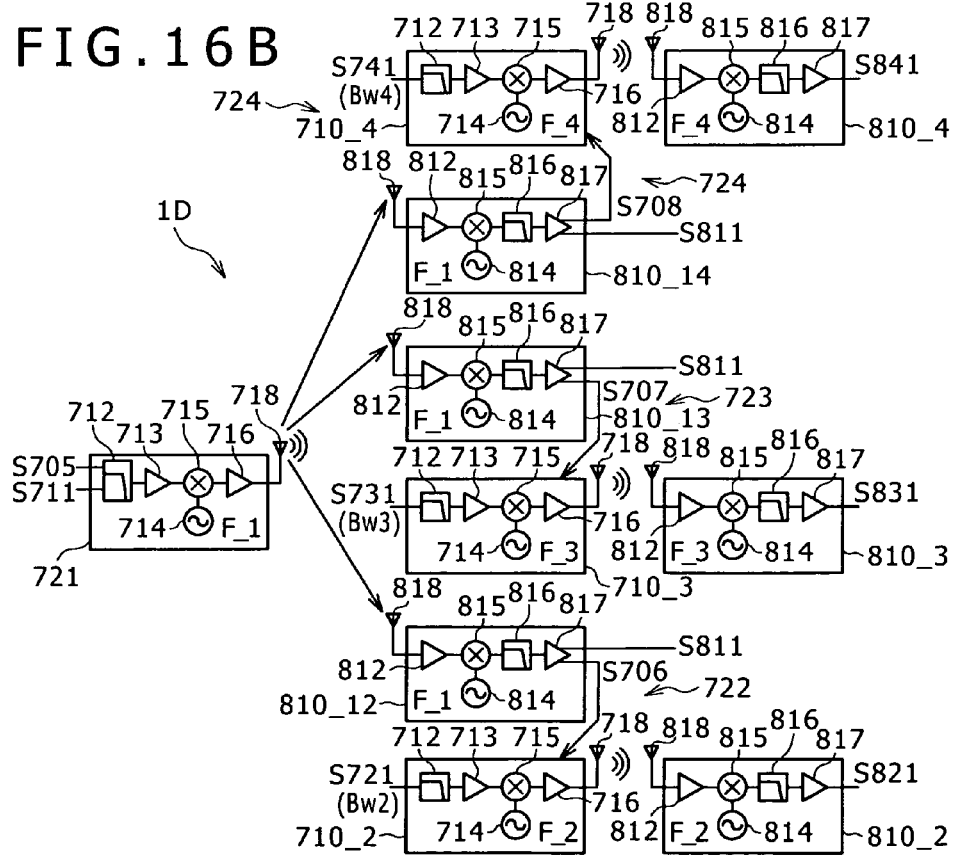

FIGS. 15A and 15B are diagrams of assistance in explaining a fourth embodiment. FIG. 15A shows an image of arrangement of communicating devices. FIG. 15B shows an example of detailed configuration of the communicating devices. FIGS. 16A and 16B are diagrams of assistance in explaining an example of modification of the fourth embodiment. FIG. 16A shows an image of arrangement of communicating devices. FIG. 16B shows an example of detailed configuration of the communicating devices.

The fourth embodiment and the example of modification of the fourth embodiment are forms in which the communicating devices are provided with the functions of a frequency control block for controlling carrier frequencies, in contrast to the second embodiment and the third embodiment. That is, a difference from the second embodiment and the third embodiment lies in that a control signal including frequency allocation information is transmitted by radio. FIGS. 15A and 15B represent an example of modification of the second embodiment, in which example only carrier frequencies on a transmitting side are changed. However, as in the third embodiment, a configuration in which carrier frequencies on both of a transmitting side and a receiving side are changed may be adopted, or a configuration in which only carrier frequencies on a receiving side are changed may be adopted. Differences from the second embodiment will be described in the following.

As shown in FIGS. 15A and 16A, a signal transmission apparatus 1D including four circuit boards, that is, a circuit board 701_1, a circuit board 701_2, a circuit board 701_3, and a circuit board 701_4 is housed within an electronic device 751. The circuit board 701_1 is provided with a communicating device 721 having the functions of a transmitter (similar to the communicating device 710_1) and a frequency control block 702 (or a frequency control block 704). The circuit board 701_2 is provided with a communicating device 722 and a communicating device 724 having the functions of a transmitter and a receiver and a communicating device 810_3 having the functions of a receiver. The circuit board 701_3 is provided with a communicating device 723 having the functions of a transmitter and a receiver and a communicating device 810_2 having the functions of a receiver. The circuit board 701_4 is provided with a communicating device 810_4 having the functions of a receiver. The bands of a carrier frequency F_2 and a carrier frequency F_3 are used for mutual transmission and reception between the circuit board 701_2 and the circuit board 701_3, whereby bidirectional signal transmission can be controlled between the circuit boards.

As shown in FIGS. 15B and 16B, the communicating device 722 includes a communicating device 810_12 having the functions of a receiver and a communicating device 710_2 having the functions of a transmitter. The communicating device 810_12 controls the carrier frequency F_2 of the communicating device 710_2 by a demodulated control signal S706. The communicating device 723 includes a communicating device 810_13 having the functions of a receiver and a communicating device 710_3 having the functions of a transmitter. The communicating device 810_13 controls the carrier frequency F_3 of the communicating device 710_3 by a demodulated control signal S707. The communicating device 724 includes a communicating device 810_14 having the functions of a receiver and a communicating device 710_4 having the functions of a transmitter. The communicating device 810_14 controls the carrier frequency F_4 of the communicating device 710_4 by a demodulated control signal S708. There are three sets as transmission and reception pairs for the transmission of the control information S705, the three sets being a pair of the communicating device 710_1 of the communicating device 721 and the communicating device 810_12 of the communicating device 722, a pair of the communicating device 710_1 of the communicating device 721 and the communicating device 810_13 of the communicating device 723, and a pair of the communicating device 710_1 of the communicating device 721 and the communicating device 810_14 of the communicating device 724. The communicating device 710_1 is shared in the transmission and reception pairs of the three sets.

When the control information S705 is transmitted to the communicating device 810_12, the communicating device 810_13, and the communicating device 810_14 by radio, a communication band used by the control information S705 is set so as to be the same as the frequency band of the carrier frequencies used for radio communication between the communicating device 710_@ (@ is one of 2, 3, and 4) and the communicating device 810_@ (@ is one of 2, 3, and 4) (which frequency band is for example the millimeter wave band or the frequency band from the centimeter wave band below the millimeter wave band to the submillimeter wave band above the millimeter wave band). For example, radio communication is performed with the carrier frequency F_1 between the communicating device 721 and the communicating devices 810_12, 810_13, and 810_14. A transmitting side local oscillating section 714 of the carrier frequency F_1 in the communicating device 721 applies modulation to the control signal S705 including frequency allocation information, and the control signal S705 is emitted from a transmitting antenna 718 by a radio wave. For example, supposing that the communicating device 721 performing the functions of the frequency control block 702 or the frequency control block 704 is a device capable of program execution by software such as a CPU or the like, appropriate frequency allocation can be made dynamically. When simultaneous communication is performed with a plurality of sets of modulating circuits and demodulating circuits using respective different carrier frequencies in intra-device signal transmission or inter-device signal transmission by radio (that is, signal transmission by radio within a same area), the carrier frequencies can be controlled to be at optimum positions.

In the communicating device 722 including the communicating device 810_12 of the carrier frequency F_1 and the communicating device 7102 of the carrier frequency F_2, a modulated signal based on the carrier frequency F_1 is received by a receiving antenna 818 and then received by the communicating device 810_12, and the control signal S706 is demodulated. The control signal S706 is supplied to the communicating device 710_2, whereby the carrier frequency F_2 of the communicating device 710_2 and the like are controlled. A signal S721 to be modulated is subjected to modulation in the communicating device 710_2 of the carrier frequency F_2, and then emitted from a transmitting antenna 718 by a radio wave. This radio wave is received by a receiving antenna 818 and then received by the communicating device 810_2, and a demodulated signal S821 is demodulated in a demodulating section.

In the communicating device 723 including the communicating device 810_13 of the carrier frequency F_1 and the communicating device 710_3 of the carrier frequency F_3, the modulated signal based on the carrier frequency F_1 is received by a receiving antenna 818 and then received by the communicating device 810_13, and the control signal S707 is demodulated. The control signal S707 is supplied to the communicating device 710_3, whereby the carrier frequency F_3 of the communicating device 710_3 and the like are controlled. A signal S731 to be modulated is subjected to modulation in the communicating device 710_3 of the carrier frequency F_3, and then emitted from a transmitting antenna 718 by a radio wave. This radio wave is received by a receiving antenna 818 and then received by the communicating device 810_3, and a demodulated signal S831 is demodulated in a demodulating section.

In the communicating device 724 including the communicating device 810_14 of the carrier frequency F_1 and the communicating device 710_4 of the carrier frequency F_4, the modulated signal based on the carrier frequency F_1 is received by a receiving antenna 818 and then received by the communicating device 810_14, and the control signal S708 is demodulated. The control signal S708 is supplied to the communicating device 710_4, whereby the carrier frequency F_4 of the communicating device 710_4 and the like are controlled. A signal S741 to be modulated is subjected to modulation in the communicating device 710_4 of the carrier frequency F_4, and then emitted from a transmitting antenna 718 by a radio wave. This radio wave is received by a receiving antenna 818 and then received by the communicating device 810_4, and a demodulated signal S841 is demodulated in a demodulating section.

Thus, the fourth embodiment can produce similar effects to those of the second embodiment by transmitting the frequency control signal for controlling the carrier frequencies by radio, and can control frequency allocation even in such a case as a case of transmission between boards physically separated from each other. For example, although frequency allocation can also be set at a time of an initial setting, when one band is newly added in a state of the operation of radio communication being already performed, it is possible to, while setting proper frequency arrangement of the carrier frequency F_1, dynamically control the frequency allocation of the other carrier frequencies F_2 to F_4 by radio.

For example, in the mode shown in FIGS. 15A and 15B, the carrier frequency F_1 is used only for the radio transmission of the control signal S705, and signal transmission between the communicating device 710_4 and the communicating device 810_4 using the carrier frequency F_4 is newly started in a state in which signal transmission between the communicating device 710_2 and the communicating device 810_2 using the carrier frequency F_2 and signal transmission between the communicating device 710_3 and the communicating device 810_3 using the carrier frequency F_3 are being performed.

On the other hand, in the example of modification shown in FIGS. 16A and 16B, in addition to the mode shown in FIGS. 15A and 15B, the carrier frequency F_1 is used to transmit not only the control signal S705 but also a modulated signal S711 with a total reception bandwidth Bw1. That is, the communicating device 721 is used both for the transmission of the normal modulated signal and for the transmission of the control signal. FIG. 16B shows that all of the communicating device 722, the communicating device 723, and the communicating device 724 output a demodulated signal S811 corresponding to the modulated signal S711. However, this is not essential. It suffices for only one of the communicating device 722, the communicating device 723, and the communicating device 724 to correspond to the communicating device 721. In this example of modification, signal transmission between the communicating device 710_4 and the communicating device 810_4 using the carrier frequency F_4 can be newly started in a state in which signal transmission between a communicating device 710 (similar to the communicating device 710_1) and a communicating device 810_1 using the carrier frequency F_1, signal transmission between the communicating device 710_2 and the communicating device 810_2 using the carrier frequency F_2, and signal transmission between the communicating device 710_3 and the communicating device 810_3 using the carrier frequency F_3 are being performed.

Though not shown, when a receiver (communicating device 810_1 as shown in FIGS. 14A and 14B) for the band of the carrier frequency F_1 is provided also on a receiver side as in the third embodiment, the operation of the receiver can also be controlled, and frequency allocation as in the third embodiment can be controlled by radio.

Also in the case in which the bands of the carrier frequency F_2 and the carrier frequency F_3 are used for mutual transmission and reception between the circuit board 701_2 and the circuit board 701_3, and thereby bidirectional signal transmission between the circuit boards is controlled, frequency allocation can be similarly controlled by radio.

Fifth Embodiment

Figure 17A:
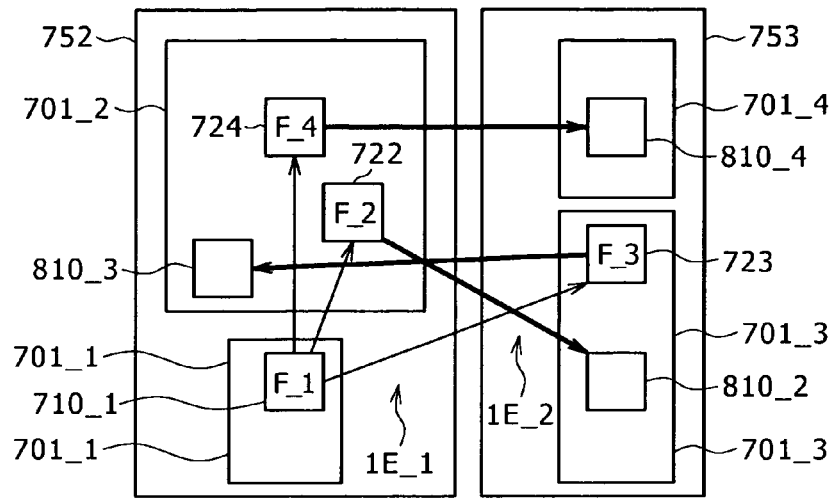
FIGS. 17A and 17B are diagrams of assistance in explaining a fifth embodiment.
Figure 17B:
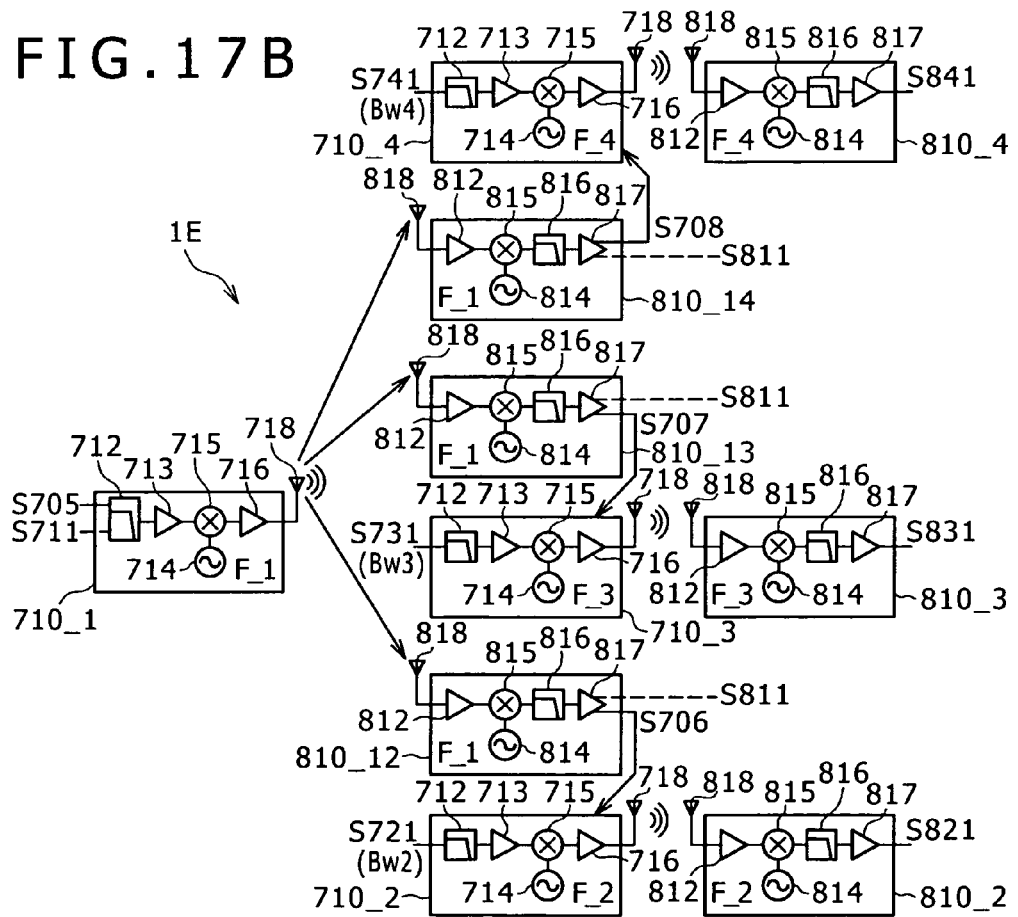

FIGS. 17A and 17B are diagrams of assistance in explaining a fifth embodiment. FIG. 17A shows an image of arrangement of communicating devices. FIG. 17B shows an example of detailed configuration of the communicating devices.

In the fifth embodiment, similar action to that of the fourth embodiment in radio transmission is performed between a plurality of electronic devices. FIGS. 17A and 17B represent a configuration in which only carrier frequencies on a transmitting side are changed. However, as in the third embodiment, a configuration in which carrier frequencies on both of a transmitting side and a receiving side are changed may be adopted, or a configuration in which only carrier frequencies on a receiving side are changed may be adopted.

For example, as shown in FIG. 17A, a signal transmission apparatus 1E_1 including two circuit boards, that is, a circuit board 701_1 and a circuit board 701_2 is housed within a first electronic device 752. A signal transmission apparatus 1E_2 including two circuit boards, that is, a circuit board 701_3 and a circuit board 701_4 is housed within a second electronic device 753. The signal transmission apparatus 1E_1 and the signal transmission apparatus 1E_2 form the whole of a signal transmission apparatus 1E. The fifth embodiment is otherwise similar to the fourth embodiment.

Incidentally, dotted lines in FIG. 17B represent a mode in which a communicating device 721 is used both for the transmission of a normal modulated signal (modulated signal S711) and for the transmission of a control signal S705, as in the example of modification of the fourth embodiment.

Each transmission and reception set includes a communicating device 710_@ (@ is one of 1, 2, 3, and 4) on a transmitting side (communicating section: a transmitting unit) and a communicating device 810_@ (@ is one of 2, 3, and 4) on a receiving side (communicating section: a receiving unit), the communicating device 710_@ (@ is one of 1, 2, 3, and 4) and the communicating device 810_@ (@ is one of 1, 2, 3, and 4) being housed within the casings of the respective different electronic devices. When the electronic device 752 and the electronic device 753 are disposed at determined positions and thereby become integral with each other, a radio signal transmission line is formed between the communicating sections (the transmitting unit and the receiving unit) within both electronic devices, whereby a state similar to that of the fourth embodiment is obtained. Hence, as in the fourth embodiment, frequency allocation can be controlled by transmitting the frequency control signal for controlling the carrier frequencies by radio.

Examples of Modification of First to Fifth Embodiments

The above description has been made supposing that one communicating device includes one of a modulating section and a demodulating section. However, the present technology is not limited to this. For example, the concepts of the first to fifth embodiments described above can be similarly applied also to a case in which a plurality of sets of modulating sections and demodulating sections are provided in one set of communicating devices, and in which multicarrier transmission (for example OFDM transmission) is performed. In short, regardless of the position at which each of modulating sections and demodulating sections is provided (disposed) in a communicating device or an electronic device, the concepts of the first to fifth embodiments described above can be similarly applied to a case in which a plurality of sets of modulating sections and demodulating sections are provided, and in which the sets composed of the modulating sections and the demodulating sections use carrier signals of respective different frequencies.

Sixth Embodiment

A sixth embodiment represents cases in which the frequency arrangement (frequency allocation) of carrier frequencies in each embodiment described above is applied to an electronic device. Three typical cases will be shown in the following.

First Example

FIGS. 18A to 18C and FIGS. 19A to 19C are diagrams of assistance in explaining a first example of an electronic device according to the sixth embodiment. The first example is an example of application in a case where signal transmission is performed by radio within the casing of one electronic device. In this example of application, the electronic device is an imaging device including a solid-state imaging device. This kind of imaging device is distributed to a market as a digital camera, a video camera (camcorder), or a camera (Web camera) of a computer device, for example.

The first example has a device configuration in which a first communicating device is mounted on a main board having a control circuit, an image processing circuit and the like mounted thereon and a second communicating device is mounted on an imaging board (camera board) having the solid-state imaging device mounted thereon.

The imaging board 502 and the main board 602 are disposed within the casing 590 of the imaging device 500. The solid-state imaging device 505 is mounted on the imaging board 502. For example, the solid-state imaging device 505 corresponds to a CCD (Charge Coupled Device) mounted on the imaging board 502 including a driving section therefor (a horizontal driver and a vertical driver) or a CMOS (Complementary Metal Oxide Semiconductor) sensor.

A semiconductor chip 103 is mounted on the main board 602, and a semiconductor chip 203 is mounted on the imaging board 502. Though not shown in FIGS. 18A to 19C, not only the solid-state imaging device 505 but also a peripheral circuit such as an imaging driving section and the like is mounted on the imaging board 502, and an image processing engine 605, an operating section, various sensors and the like are mounted on the main board 602.

Each of the semiconductor chip 103 and the semiconductor chip 203 incorporates functions equivalent to those of a transmitting chip and a receiving chip. Provision can be made for bidirectional communication by incorporating the functions of both the transmitting chip and the receiving chip.

The solid-state imaging device 505 and the imaging driving section correspond to an application functional part of an LSI functional block on the side of the first communicating device. The LSI functional block is connected with a signal generating block on a transmitting side, and further connected with an antenna 236 (transmitting point) via a transmission line coupling block. The signal generating block and the transmission line coupling block are housed in the semiconductor chip 203 separate from the solid-state imaging device 505, and mounted on the imaging board 502.

The image processing engine 605, the operating section, the various sensors and the like correspond to an application functional part of an LSI functional block on the side of the second communicating device, and house an image processing section for processing an imaging signal obtained by the solid-state imaging device 505. The LSI functional block is connected with a signal generating block on a receiving side, and further connected with an antenna 136 (receiving point) via a transmission line coupling block. The signal generating block and the transmission line coupling block are housed in the semiconductor chip 103 separate from the image processing engine 605, and mounted on the main board 602.

The signal generating block on the transmitting side includes for example a multiplexing processing section, a parallel-serial converting section, a modulating section, a frequency converting section, and an amplifying section. The signal generating block on the receiving side includes for example an amplifying section, a frequency converting section, a demodulating section, a serial-parallel converting section, and a simplification processing section. These points are also true for the other cases of application to be described later.

By performing radio communication between the antenna 136 and the antenna 236, an image signal obtained by the solid-state imaging device 505 is transmitted to the main board 602 via a radio signal transmission line 9 between the antennas. The electronic device may be configured to be ready for bidirectional communication. In this case, for example, a reference clock and various control signals for controlling the solid-state imaging device 505 are transmitted to the imaging board 502 via the radio signal transmission line 9 between the antennas.

In each of FIG. 18A and FIG. 19A, the radio signal transmission line 9 of two systems is provided. In FIGS. 18A to 18C, the radio signal transmission line 9 is a free space transmission line 9B. In FIGS. 19A to 19C, the radio signal transmission line 9 is a hollow waveguide 9L. There are transmission and reception pairs of three sets within each of the systems, and a frequency division multiplexing system, for example, is adopted.

It suffices for the hollow waveguide 9L to be of a structure whose periphery is surrounded by a shielding material and whose inside is hollow. For example, the hollow waveguide 9L is of a structure whose periphery is surrounded by a conductor MZ as an example of the shielding material and whose inside is hollow. For example, the enclosure of the conductor MZ is mounted on the main board 602 so as to surround the antenna 136. A center of movement of the antenna 236 on the side of the imaging board 502 is disposed in such a position as to be opposed to the antenna 136. Because the inside of the conductor MZ is hollow, there is no need to use a dielectric material, and the radio signal transmission line 9 can be formed easily at low cost.

The basic operation of each system is similar to the operation of one system. However, in the case of FIG. 18A of the free space transmission line 9B, for example, the shorter the distance between systems (distance between channels: corresponding to a distance between two antennas on the transmitting side in this example), the closer to each other the radio signal transmission lines 9 of the respective systems. When simultaneous communication is performed with each system using a same carrier frequency, interference on the receiving side may become a problem. When it is difficult to adjust the arrangement of the antennas (aerials) on the transmitting side, the strength of electromagnetic wave output of the antennas on the transmitting side, the arrangement of antennas on the receiving side, and the like, and it is difficult to avoid interference between electromagnetic wave transmission lines because of short distance between the channels, a frequency division multiplexing system with different frequency bands is adopted also for a free space transmission line 9B_1 and a free space transmission line 9B_2.

Specifically, as shown in FIG. 18B, a carrier frequency F_11 is used between an antenna 136_11 and an antenna 236_11, a carrier frequency F_12 is used between an antenna 136_12 and an antenna 236_12, and a carrier frequency F_13 is used between an antenna 136_13 and an antenna 236_13. A carrier frequency F_21 is used between an antenna 136_21 and an antenna 236_21, a carrier frequency F_22 is used between an antenna 136_22 and an antenna 236_22, and a carrier frequency F_23 is used between an antenna 136_23 and an antenna 236_23.

The six carrier frequencies are used. In this case, as shown in FIG. 18C, the above-described six-band frequency arrangement determining method is adopted. Thereby, the linear performance of the amplifier, the frequency mixing section (mixer) and the like of the receiver can be relaxed without a band limiting filter having a high degree of selectivity being used, and cost reduction, reduction in power consumption, reduction in circuit scale, and the like can be achieved.

In addition, as shown in FIG. 19A, an electromagnetic wave shield (conductor MZ: a metal or the like) may be placed between two millimeter wave signal transmission lines. In this case, three sets within a hollow waveguide 9L_1 employ a frequency division multiplexing system, and three sets within a hollow waveguide 9L_2 also employ a frequency division multiplexing system. However, same carrier frequencies can be used in the hollow waveguide 9L_1 and the hollow waveguide 9L_2.

Specifically, as shown in FIG. 19B, a carrier frequency F_1 is used between an antenna 136_11 and an antenna 236_11, a carrier frequency F_2 is used between an antenna 136_12 and an antenna 236_12, and a carrier frequency F_3 is used between an antenna 136_13 and an antenna 236_13. The carrier frequency F_1 is used between an antenna 136_21 and an antenna 236_21, the carrier frequency F_2 is used between an antenna 136_22 and an antenna 236_22, and the carrier frequency F_3 is used between an antenna 136_23 and an antenna 236_23.

The three carrier frequencies are used. In this case, as shown in FIG. 19C, the above-described three-band frequency arrangement determining method is adopted. Thereby, the linear performance of the amplifier, the frequency mixing section (mixer) and the like of the receiver can be relaxed without a band limiting filter having a high degree of selectivity being used, and cost reduction, reduction in power consumption, reduction in circuit scale, and the like can be achieved.

Second Example

FIGS. 20A, 20B, and 20C are diagrams of assistance in explaining a second example of an electronic device according to the sixth embodiment. The second example is an example of application in a case where signal transmission is performed by radio between a plurality of electronic devices in a state in which the electronic devices are integral with each other. The second example is an example of application particularly to signal transmission between two electronic devices when one electronic device is loaded in the other electronic device.

There is for example a card type information processing device typified by a so-called IC card or a memory card including a central processing unit (CPU), a nonvolatile storage device (for example a flash memory) and the like, the card type information processing device being loadable into (detachable from) an electronic device on a main unit side. The card type information processing device as an example of one (first) electronic device will hereinafter be also referred to as a "card type device." The other (second) electronic device on the main unit side will hereinafter be also referred to simply as an electronic device.

FIG. 20A shows an example of structure (plane perspective and sectional perspective) of a memory card 201B. FIG. 20B shows an example of structure (plane perspective and sectional perspective) of an electronic device 101B. FIG. 20C shows an example of structure (sectional perspective) when the memory card 201B is inserted in the slot structure 4 (opening 192 in particular) of the electronic device 101B.

The slot structure 4 has a configuration such that the memory card 201B (casing 290 of the memory card 201B) can be inserted into the casing 190 of the electronic device 101B from the opening 192 and removed from the casing 190 of the electronic device 101B, and can be fixed to the casing 190 of the electronic device 101B. A connector 180 on a receiving side is provided in a position of contact with terminals of the memory card 201B in the slot structure 4. Connector terminals (connector pins) are not necessary for signals to be transmitted by radio.

As shown in FIG. 20A, the casing 290 of the memory card 201B has a cylindrical depression shape configuration 298 (hollow). As shown in FIG. 20B, the casing 190 of the electronic device 101B has a cylindrical projection shape configuration 198 (protrusion). The memory card 201B has a plurality of semiconductor chips 203 (three semiconductor chips 203 in FIG. 20A) on one surface of a board 202, and has a plurality of antennas 236 (three antennas 236 in FIG. 20A) (a total of three antennas 236) formed on one surface of the board 202. The casing 290 has the depression shape configuration 298 in the same surface as each antenna 236. The part of the depression shape configuration 298 is formed by a dielectric resin including a dielectric material allowing radio signal transmission.

A connecting terminal 280 for being connected to the electronic device 101B at a determined position of the casing 290 is disposed at the determined position of the casing 290 at one side of the board 202. The memory card 201B includes, in a part thereof, a terminal structure in the past for low-speed and low-capacity signals and for power supply. Terminals for objects to which signal transmission by the millimeter wave can be applied are removed, as indicated by broken lines in FIG. 20A.

As shown in FIG. 20B, the electronic device 101B has a plurality of semiconductor chips 103 (three semiconductor chips 103 in FIG. 20B) on a surface on the opening 192 side of a board 102, and has a plurality of antennas 136 (three antennas 136 in FIG. 20B) (a total of three antennas 136) formed on one surface of the board 102. The opening 192 into and from which the memory card 201B is inserted and removed is formed as the slot structure 4 in the casing 190. The projection shape configuration 198 having a millimeter wave confining structure (waveguide structure) is formed in the casing 190 so as to constitute a dielectric transmission line 9A in a part corresponding to the position of the depression shape configuration 298 when the memory card 201B is inserted into the opening 192.

As shown in FIG. 20C, the casing 190 of the slot structure 4 has a mechanical structure such that the projection shape configuration 198 (dielectric transmission line 9A) and the depression shape configuration 298 come into contact with each other in the form of a projection and a depression when the memory card 201B is inserted from the opening 192 into the casing 190 of the slot structure 4. When the projection and depression structures are fitted to each other, the plurality of antennas 136 (three antennas 136 in FIG. 20B) are opposed to the plurality of corresponding antennas 236 (three antennas 236 in FIG. 20A), respectively, and the dielectric transmission line 9A is disposed as the radio signal transmission line 9 between the antennas 136 and the antennas 236. It is thereby possible to adopt a frequency division multiplexing system and make signal transmission by radio between the antennas 136 and the antennas 236 that correspond to one another. Although the casing 290 of the memory card 201B is interposed between the dielectric transmission line 9A and the antennas 236, the material of the part of the depression shape configuration 298 is a dielectric material, and thus does not produce a significant effect on radio transmission in the millimeter wave band.

Incidentally, three carrier frequencies are used. In this case, the above-described three-band frequency arrangement determining method is adopted. Thereby, the linear performance of the amplifier, the frequency mixing section (mixer) and the like of the receiver can be relaxed without a band limiting filter having a high degree of selectivity being used, and cost reduction, reduction in power consumption, reduction in circuit scale, and the like can be achieved.

Third Example

Figure 21A:
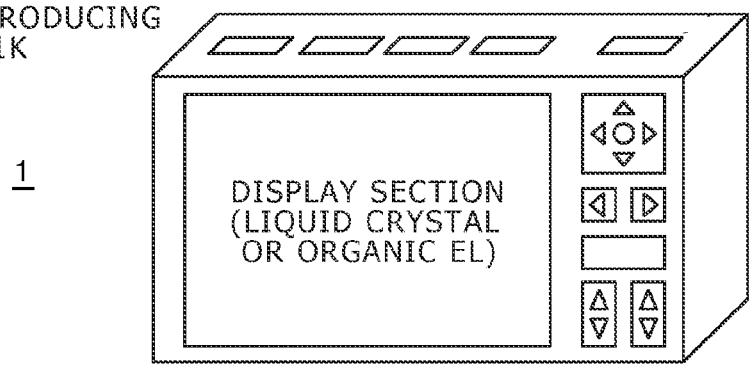
FIGS. 21A to 21C are diagrams of assistance in explaining a third example of an electronic device according to the sixth embodiment.
Figure 21B:
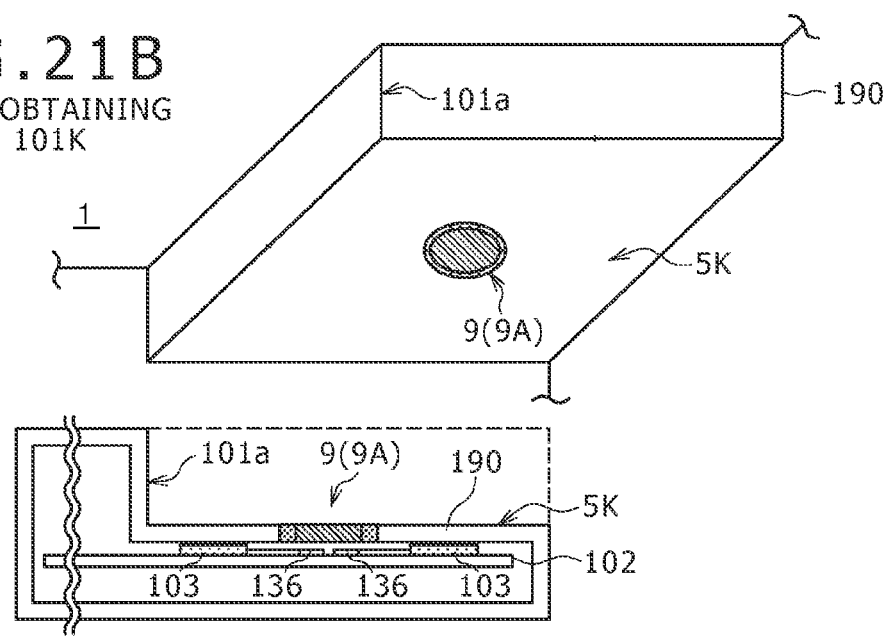
Figure 21C:
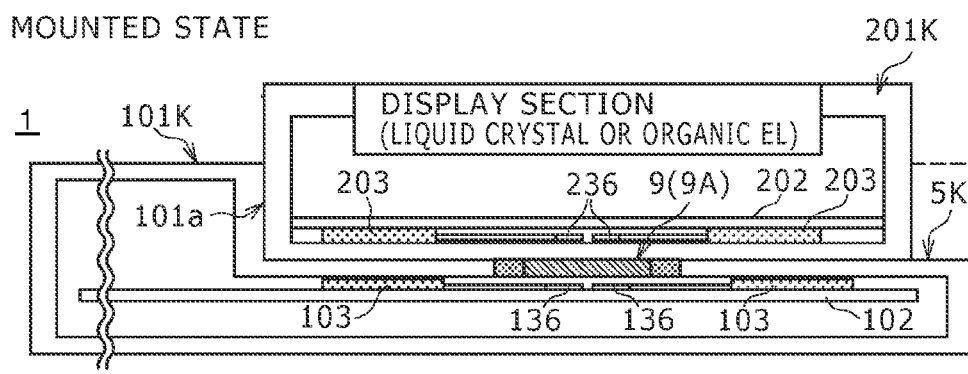

FIGS. 21A, 21B, and 21C are diagrams of assistance in explaining a third example of an electronic device according to the sixth embodiment. A signal transmission apparatus 1 includes a portable type image reproducing device 201K as an example of a first electronic device, and includes an image obtaining device 101K as an example of a second (main unit side) electronic device on which to mount the image reproducing device 201K. The image obtaining device 101K has a mounting base 5K on which to mount the image reproducing device 201K as a part of a casing 190. Incidentally, a slot structure 4 as in the second example may be used in place of the mounting base 5K. The third example is the same as the second example in that signal transmission is made by radio between two electronic devices when one electronic device is mounted in the other electronic device. Description in the following will be made with attention directed to differences from the second example.

The image obtaining device 101K has substantially the shape of a rectangular parallelepiped (box shape), and can no longer be said to be a card type. It suffices for the image obtaining device 101K to obtain moving image data, for example. A digital recording and reproducing device or a terrestrial television receiver, for example, corresponds to the image obtaining device 101K. The image reproducing device 201K includes, as an application functional part, a storage device for storing moving image data transmitted from the side of the image obtaining device 101K and a functional part for reading moving image data from the storage device and reproducing a moving image on a display section (for example a liquid crystal display device or an organic EL display device). It suffices to consider from a structural viewpoint that the memory card 201B is replaced with the image reproducing device 201K and that the electronic device 101B is replaced with the image obtaining device 101K.

As in the second example (FIGS. 20A to 20C), for example, a plurality of semiconductor chips 103 (three semiconductor chips 103 in FIGS. 21A to 21C) are housed in a lower part of the mounting base 5K within the casing 190, and a plurality of antennas 136 (for example three antennas 136) are provided at a certain position in the lower part of the mounting base 5K within the casing 190. A dielectric transmission line 9A is formed by a dielectric material as a radio signal transmission line 9 in a part of the casing 190 which part is opposed to the antennas 136. As in the second example (FIGS. 20A to 20C), for example, a plurality of semiconductor chips 203 (three semiconductor chips 203 in FIGS. 21A to 21C) are housed within the casing 290 of the image reproducing device 201K mounted on the mounting base 5K, and an antenna 236 is provided so as to correspond to each semiconductor chip 203 (a total of three antennas 236). A radio signal transmission line 9 (dielectric transmission line 9A) is formed by a dielectric material in a part of the casing 290 which part is opposed to the three antennas 236. These points are similar to those of the foregoing second example.

The third example adopts a wall surface butting system rather than the concept of a fitting structure. When the image reproducing device 201K is placed so as to be butted against a corner 101a of the mounting base 5K, the plurality of antennas 136 (three antennas 136 in FIGS. 21A to 21C) are opposed to the plurality of corresponding antennas 236 (three antennas 236 in FIGS. 21A to 21C), respectively, and the dielectric transmission line 9A is disposed as the radio signal transmission line 9 between the antennas 136 and the antennas 236. Thus effects of positional displacement can be surely eliminated. Such a constitution makes it possible to perform alignment for radio signal transmission of the image reproducing device 201K at the time of mounting (loading) the image reproducing device 201K on the mounting base 5K and make signal transmission by radio with a frequency division multiplexing system adopted between the antennas 136 and the antennas 236 that correspond to one another. Although the casing 190 and the casing 290 are interposed between the antennas 136 and the antennas 236, the casing 190 and the casing 290 are a dielectric material, and thus do not greatly affect radio transmission in the millimeter wave band.

Incidentally, three carrier frequencies are used. In this case, the above-described three-band frequency arrangement determining method is adopted. Thereby, the linear performance of the amplifier, the frequency mixing section (mixer) and the like of the receiver can be relaxed without a band limiting filter having a high degree of selectivity being used, and cost reduction, reduction in power consumption, reduction in circuit scale, and the like can be achieved.

Comparison with Comparative Examples

Figure 22A:
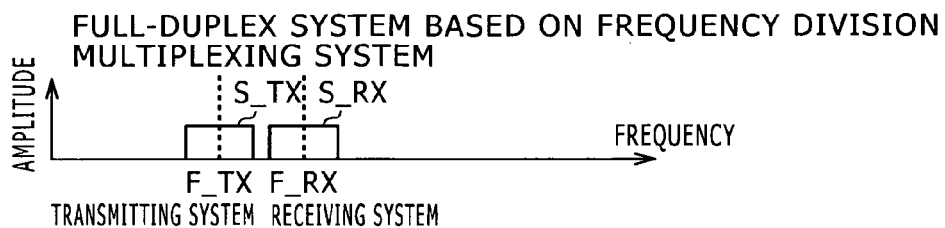
FIGS. 22A to 22D are diagrams of assistance in explaining comparison with comparative examples, and are diagrams showing basic frequency arrangements of a frequency division multiplexing system.
Figure 22B:
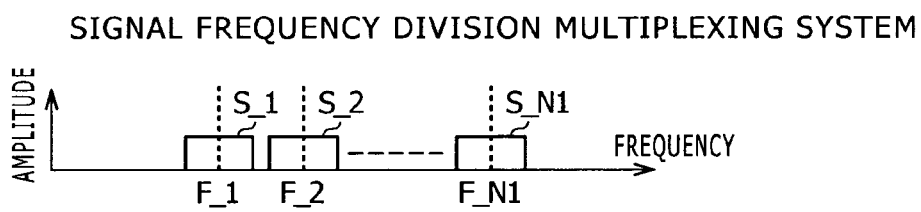
Figure 22C:
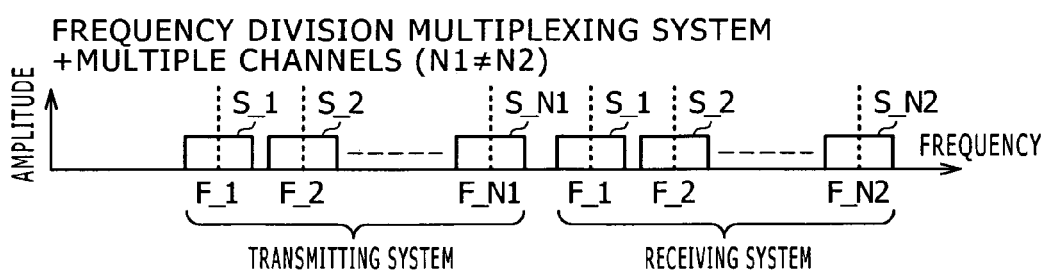
Figure 22D:
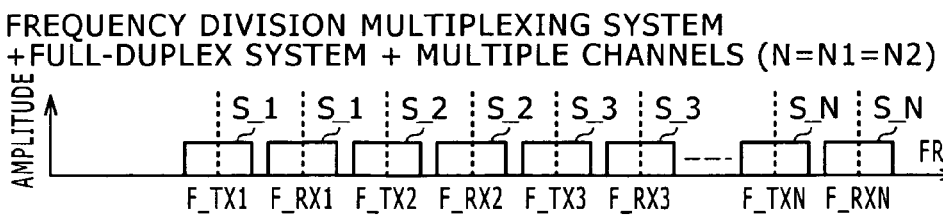
Figure 23A:
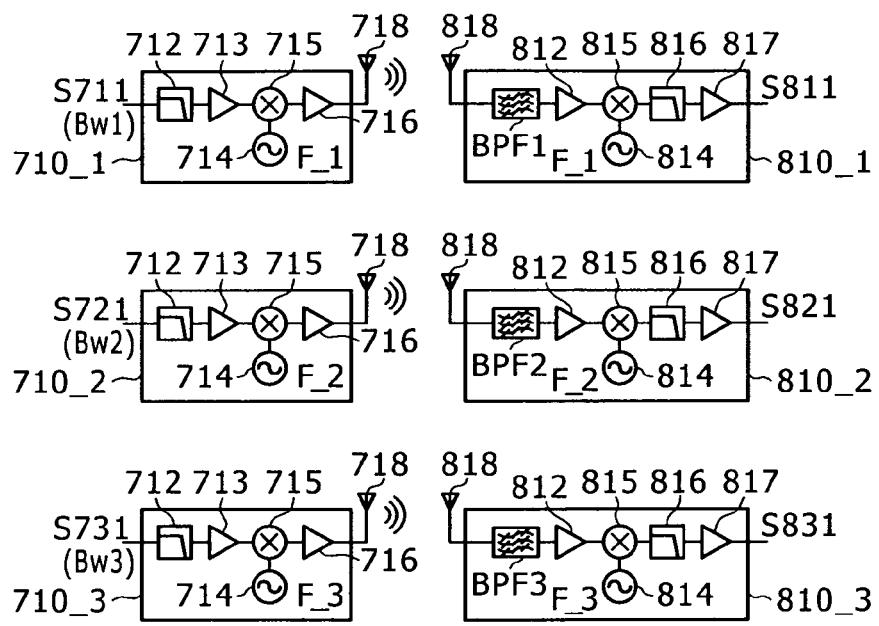
FIGS. 23A and 23B are diagrams of assistance in explaining comparison with comparative examples, and are diagrams of assistance in explaining a system according to a comparative example for preventing modulation distortion.
Figure 23B:
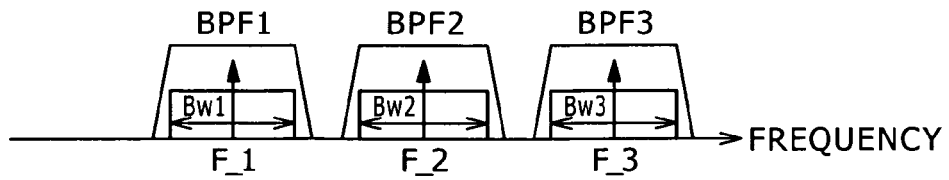

FIGS. 22A, 22B, 22C, and 22D and FIGS. 23A and 23B are diagrams of assistance in explaining comparison with comparative examples. FIGS. 22A to 22D are diagrams showing basic frequency arrangements when simultaneous communication is performed with sets of modulating circuits and demodulating circuits using respective different carrier frequencies (for example when a frequency division multiplexing system is applied). FIGS. 23A and 23B are diagrams of assistance in explaining a system according to a comparative example for preventing modulation distortion.

When simultaneous communication is performed with sets of modulating circuits and demodulating circuits using respective different carrier frequencies in a same area, interference caused by Nth-order intermodulation distortion occurring due to the nonlinearity of a circuit member becomes a problem. Third-order intermodulation distortion components, in particular, occur in the vicinity of usable frequencies, and have a higher level than components of the fourth order and higher. Thus, it is difficult to avoid interference, and the third-order intermodulation distortion components become a cause of communication interference. In order to prevent this problem, it is important to select optimum carrier frequencies.

For example, an amplifier amplifies an input signal by an amplification factor, and outputs the amplified signal. At this time, when there are two input signals of different frequencies, the amplitudes of the respective input signals are multiplied by a gain and output in an idealized case (in which input and output are in proportional relation to each other and no nonlinear component is included). In practice, however, the input and output of an amplifier are in substantially proportional relation to each other but are not in perfect proportion to each other, and a nonlinear component is included. In such a case, when a plurality of signals of different frequencies are input to the amplifier, signals of frequencies not present in the input occur in the output. This is referred to as modulation distortion (IMD: InterModulation Distortion). The frequencies of modulation distortion components are not irregular, but are defined by the following equation.

$\pm m \times f1 \pm n \times f2$, where $m$ and $n = 0, 1, 2, 3, \ldots$.

Modulation distortion of frequencies represented by combinations of $|m|+|n|$ (absolute values of m and n) is referred to as Nth-order ($N=|m|+|n|$) modulation distortion. For example, modulation distortion with $m=\pm 1$ and $n=\pm 1$ is referred to as second-order distortion, and modulation distortion with $m=\pm 1$ and $n=\pm 2$ and with $m=\pm 2$ and $n=\pm 1$ is referred to as third-order distortion. First-order distortion corresponds to the frequencies of input signals themselves, and is thus excluded. There are thus modulation distortions of a second-order, a third-order, a fourth-order, . . . . Because m and n continue infinitely, there are an infinite number of modulation distortions. In actuality, however, modulation distortion is attenuated as the order becomes higher. It therefore suffices usually to consider modulation distortions up to about the third order or the fourth order.

In addition, modulation distortion is classified into "cross-modulation distortion" and "intermodulation distortion" according to a phenomenon in which the modulation distortion occurs. The present embodiment takes measures against "intermodulation distortion" of the two kinds of modulation distortion. "Cross-modulation distortion" is a phenomenon in which when there is a station of a strong frequency (disturbing station) and the disturbing station is outputting an amplitude modulated wave, a signal received by an own station undergoes the same modulation as the amplitude modulation of the disturbing station.

On the other hand, "intermodulation distortion" is a disturbance caused by two waves totally unrelated to the own station. That is, "intermodulation distortion" is a phenomenon in which when there are stations of two strong frequencies other than the own station (which case may be either of a case in which both frequencies are strong and a case in which only one of the frequencies is extremely strong) and when a frequency difference (cross-modulation product) between the two stations coincides with a reception frequency or an intermediate frequency, the frequency difference is received as a disturbing wave. Hence, when the reception frequency of the own station comes off the frequency difference between the two disturbing stations, no disturbance occurs. Directing attention to this point, the present embodiment sets each carrier frequency in an appropriate frequency arrangement so as not to be affected by interference caused by modulation distortion occurring due to the nonlinearity of a circuit such as an amplifier, a frequency mixing section or the like.

In order to realize "bidirectional communication," in a case of single-core bidirectional transmission in which a radio signal transmission line as a radio wave transmission channel is one system (one core), for example, a half-duplex system to which time division multiplexing (TDD: Time Division Duplex) is applied, frequency division multiplexing (FDD: Frequency Division Duplex), or the like is applied.

In the case of time division multiplexing, however, separation of transmission and reception is performed by time division, and therefore "the simultaneity of bidirectional communication (single-core simultaneous bidirectional transmission)" such that signal transmission from a first communicating device to a second communicating device and signal transmission from the second communicating device to the first communicating device are made simultaneously is not realized. Single-core simultaneous bidirectional transmission is realized by frequency division multiplexing. Frequency division multiplexing is used not only as a provision for bidirectional simultaneous communication between a set of communicating devices but also for various signal transmissions. For example, frequency division multiplexing is also used to realize multiplex transmission (formation of multiple channels) in a case in which unidirectional communication or bidirectional communication is performed between a plurality of communicating devices, a case in which one set of communicating devices has a plurality of sets of modulating circuits and demodulating circuits and multicarrier transmission as one of methods for lowering a symbol rate, as typified by OFDM transmission, is made, or the like.

As shown in FIG. 22A, bidirectional communication based on frequency division multiplexing uses different frequencies for transmission and reception, and therefore the transmission reception bandwidth of a radio signal transmission line is widened. In addition, to realize multiplex transmission (formation of multiple channels) by frequency division multiplexing, as shown in FIG. 22B, modulation is performed with separate carrier frequencies F_@ (conversion into respective different frequency bands is performed), and a radio wave using these separate carrier frequencies is transmitted in a same direction or opposite directions. In this case, when different frequencies are used for respective communication systems (communication channels), as shown in FIG. 22C and FIG. 22D, a wider transmission reception bandwidth is secured. In examples of frequency arrangement shown in FIGS. 22B to 22D, frequency bands F_@ (so-called communication channels) are arranged at substantially equal frequency intervals, so that third-order intermodulation distortion between communication channels adjacent to each other has the same frequencies as adjacent channels, thus causing interference.

Each of "cross-modulation distortion" and "intermodulation distortion" can be prevented by not allowing radio waves outside of a necessary band to be input to a high-frequency amplifier. Alternatively, each of cross-modulation distortion and intermodulation distortion can be prevented by improving the linearity of the amplifier, the frequency mixing section or the like, which is a very cause of occurrence of each of cross-modulation distortion and intermodulation distortion. That is, the very cause of each of cross-modulation distortion and intermodulation distortion is the nonlinear operation of the circuit, and therefore a method of designing the circuit to operate in a linear region as much as possible, for example, is effective.

For example, intra-device transmission using millimeter waves enables signal transmission at a high data rate with low power, and is thus promising for future applications. However, not only one set of transmissions but also transmissions with a plurality of frequency combinations are necessary within a device. When signals of a plurality of frequencies adjacent to a reception band are received, and the amplifier or the frequency mixing section has poor linear performance, third-order distortion occurs within the reception band and greatly degrades reception quality.

Thus, as shown in FIG. 23A, for example, a band limiting filter (BPF: band-pass filter) having a high degree of selectivity is added to the input section of a receiving circuit in order to allow only a band desired to be received to pass through and attenuate adjacent frequency components. This invites an increase in the cost of parts, and increases a board area when the band limiting filter cannot be included in a semiconductor integrated circuit. In addition, because the band limiting filter generally acts only on fixed frequencies, it is difficult to use the band limiting filter while varying corresponding frequencies, and it is necessary to prepare the band limiting filter for each band to be used, thus increasing a cost for managing a plurality of kinds of parts. In addition, when the band-pass filter has a low degree of selectivity, the linear performance of the circuit needs to be enhanced, and thus there is a fear of an increase in power consumption and an increase in cost due to an increase in chip size.

In addition, Japanese Patent Laid-Open No. Sho 55-38777 proposes a method of disposing the frequency of narrow-band modulation at a position of an integral multiple of the reception bandwidth fc of spectrum spreading modulation as a method for relaxing the performance of a receiver in a case of a combination of spectrum spread and narrow-band modulation. However, when a plurality of narrow-band modulations are used, the third-order distortion of the plurality of narrow-band modulations occurs within the band of the spectrum spreading modulation, and it is not possible to adapt to a plurality of spectrum spreading modulations.

On the other hand, the method according to the present embodiment sets each carrier frequency at such an appropriate frequency position as not to be affected by interference caused by modulation distortion. Thus, the linear performance of the amplifier, the frequency mixing section (mixer) and the like of the receiver can be relaxed without a band limiting filter having a high degree of selectivity being used, and cost reduction, reduction in power consumption, reduction in circuit scale, and the like can be achieved.

<Communication Processing System: Examples of Modification>

Figure 24:
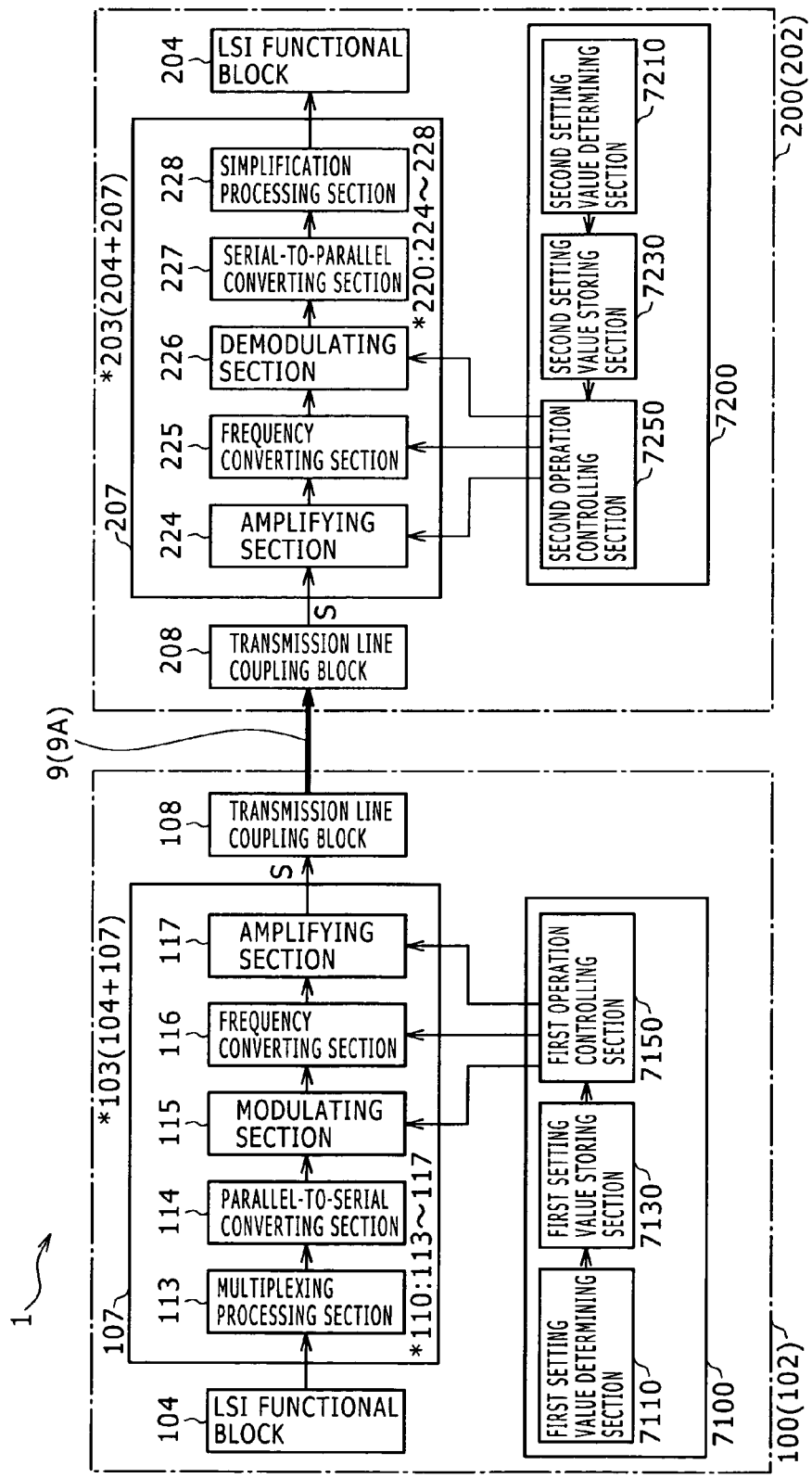
FIG. 24 shows a first modified configuration of assistance in explaining a signal interface of a signal transmission apparatus according to the present embodiment from an aspect of a functional configuration.
Figure 25:
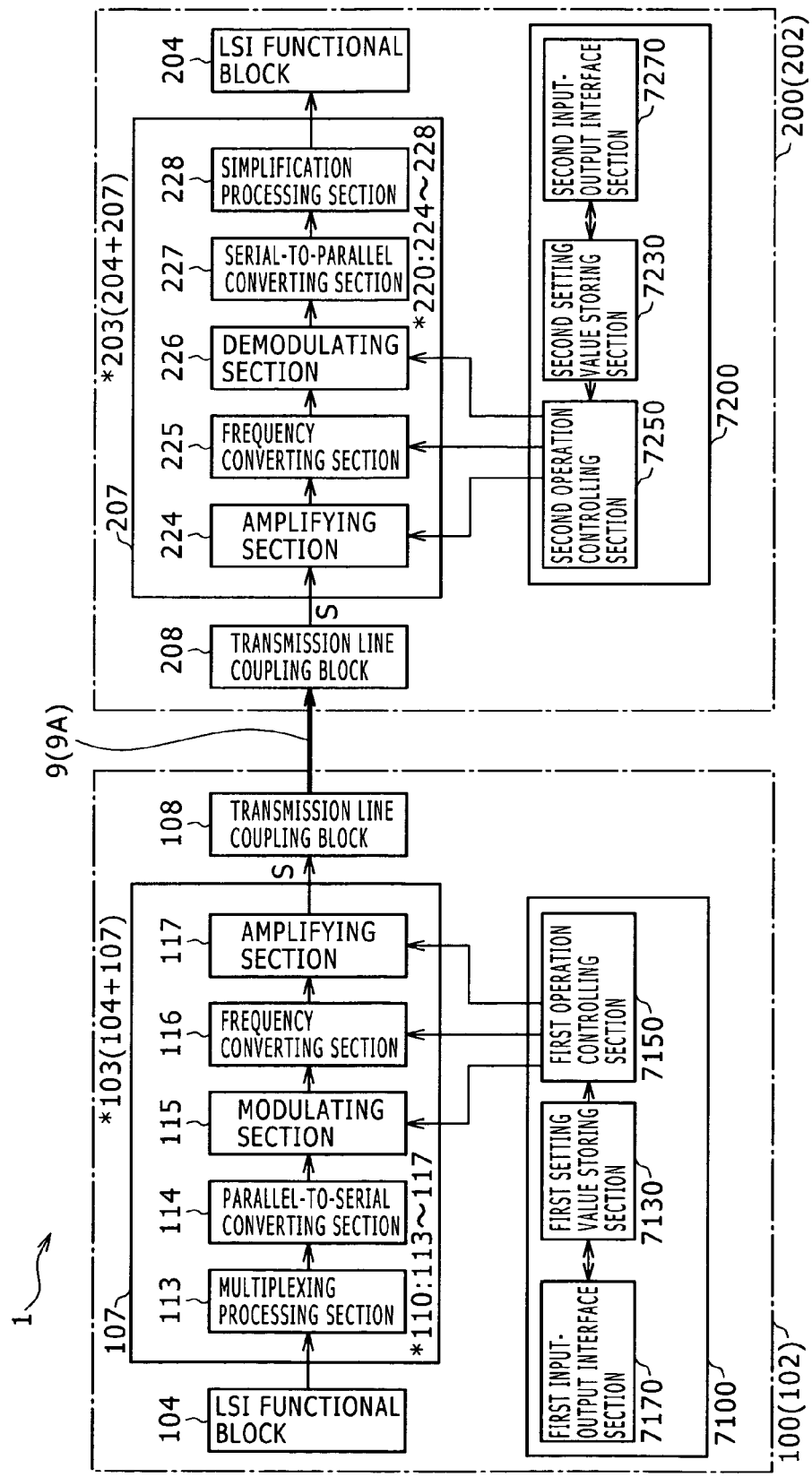
FIG. 25 shows a second modified configuration of assistance in explaining a signal interface of a signal transmission apparatus according to the present embodiment from an aspect of a functional configuration.

FIG. 24 and FIG. 25 represent a modified configuration of assistance in explaining a signal interface of a signal transmission apparatus according to the present embodiment from an aspect of a functional configuration. In the modified configurations, the fixation of a parameter setting is applied to the foregoing embodiments (including examples). Examples of modification of the basic configuration shown in FIG. 1 will be described in the following.

Description will first be made of a first modified configuration shown in FIG. 24. A first communicating device 100 has a first setting value processing block 7100 including a first setting value determining section 7110, a first setting value storing section 7130, and a first operation controlling section 7150 on a board 102. The first setting value determining section 7110 determines a "setting value for signal processing" (a variable or a parameter) for specifying the operation of each functional part of a semiconductor chip 103 (that is, the entire operation of the first communicating device 100). The "setting value for signal processing" in relation to a case in which a plurality of sets of modulating circuits and demodulating circuits are provided and simultaneous signal transmission is made by the sets by radio (radio waves in particular) with the sets using carrier signals of respective different frequencies corresponds to a carrier frequency for modulation and a carrier frequency for demodulation. A process of determining the setting value is performed at a time of product shipment from a factory, for example. The first setting value storing section 7130 stores the setting value determined by the first setting value determining section 7110. The first operation controlling section 7150 makes each functional part (a modulating section 115, a frequency converting section 116, an amplifying section 117 and the like in this example) of the semiconductor chip 103 operate on the basis of the setting value read from the first setting value storing section 7130.

In the example shown in FIG. 24, the first setting value processing block 7100 is provided on the board 102. However, the first setting value processing block 7100 is not limited to this. Though not shown, the first setting value processing block 7100 may also be mounted on a board separate from the board 102 on which the semiconductor chip 103 is mounted. In addition, while the first setting value processing block 7100 is provided outside the semiconductor chip 103 in the example shown in FIG. 24, the first setting value processing block 7100 may be included in the semiconductor chip 103. In this case, the first setting value processing block 7100 is mounted on the same board 102 as the board 102 on which each functional part (the modulating section 115, the frequency converting section 116, the amplifying section 117 and the like) as an object of control is mounted (not shown).

A second communicating device 200 has a second setting value processing block 7200 including a second setting value determining section 7210, a second setting value storing section 7230, and a second operation controlling section 7250 on a board 202. The second setting value determining section 7210 determines a setting value (a variable or a parameter) for specifying the operation of each functional part of a semiconductor chip 203 (that is, the entire operation of the second communicating device 200). A process of determining the setting value is performed at a time of product shipment from a factory, for example. The second setting value storing section 7230 stores the setting value determined by the second setting value determining section 7210. The second operation controlling section 7250 makes each functional part (an amplifying section 224, a frequency converting section 225, a demodulating section 226 and the like in this example) of the semiconductor chip 203 operate on the basis of the setting value read from the second setting value storing section 7230.

In the example shown in FIG. 24, the second setting value processing block 7200 is provided on the board 202. However, the second setting value processing block 7200 is not limited to this. Though not shown, the second setting value processing block 7200 may also be mounted on a board separate from the board 202 on which the semiconductor chip 203 is mounted. In addition, while the second setting value processing block 7200 is provided outside the semiconductor chip 203 in the example shown in FIG. 24, the second setting value processing block 7200 may be included in the semiconductor chip 203. In this case, the second setting value processing block 7200 is mounted on the same board 202 as the board 202 on which each functional part (the amplifying section 224, the frequency converting section 225, and the demodulating section 226) as an object of control is mounted (not shown).

Description will next be made of a second modified configuration shown in FIG. 25. In the second modified configuration, a setting value determined outside the device is stored. Description in the following will be made centering on differences from the first modified configuration. The second modified configuration has a first input-output interface section 7170 in place of the first setting value determining section 7110 and has a second input-output interface section 7270 in place of the second setting value determining section 7210. The first input-output interface section 7170 and the second input-output interface section 7270 are each an example of a setting value receiving section for receiving a setting value from the outside.

The first input-output interface section 7170 performs the functions of an interface between a first setting value storing section 7130 and the outside. The first input-output interface section 7170 stores an externally supplied setting value in the first setting value storing section 7130, and reads the setting value stored in the first setting value storing section 7130 and outputs the setting value to the outside. The second input-output interface section 7270 performs the functions of an interface between a second setting value storing section 7230 and the outside. The second input-output interface section 7270 stores an externally supplied setting value in the second setting value storing section 7230, and reads the setting value stored in the second setting value storing section 7230 and outputs the setting value to the outside.

In the case of the second modified configuration, the setting values are determined on the outside, instead of the setting values being determined in the first setting value processing block 7100 and the second setting value processing block 7200. For example, the setting values may be determined from a design parameter and the state of an actual device, or the setting values may be determined on the basis of an actual operating test on the device. In addition, in either case, a setting value common to each device may be determined, instead of individual setting values being determined for each device. A case of determining a setting value from a design parameter substantially corresponds to the case of determining a setting value common to each device. A case of determining a setting value on the basis of an actual operating test on a standard device also corresponds to the case of determining a setting value common to each device.

The present disclosure contains subject matter related to that disclosed in Japanese Priority Patent Application JP 2010-233695 filed in the Japan Patent Office on Oct. 18, 2010, the entire content of which is hereby incorporated by reference.

It should be understood by those skilled in the art that various modifications, combinations, sub-combinations and alternations may occur depending on design requirements and other factors insofar as they are within the scope of the appended claims or the equivalent thereof.

What is claimed is:

1. A signal transmission apparatus comprising:
a plurality of modulating sections respectively configured to modulate a transmission object signal into a modulated signal; and
a plurality of demodulating sections configured to demodulate the modulated signals,
wherein respective sets of the modulating sections and the demodulating sections are configured to utilize a unique carrier frequency, wherein a frequency of a third-order intermodulation distortion component generated on a basis of two adjacent carrier frequencies is not present within any of reception bands of modulated signals based on each of the other carrier frequencies
wherein three adjacent carrier frequencies satisfy the following conditions:
where a first frequency difference is defined as a difference between a lowest carrier frequency and an intermediate carrier frequency of the three adjacent carrier frequencies, a second frequency difference is defined as a difference between a highest carrier frequency and the intermediate carrier frequency of the three adjacent carrier frequencies, and a small frequency difference is defined as the smaller of the first frequency difference and the second frequency difference,
a first condition that a sum of a reception bandwidth on a higher-frequency side of the lower component frequency of the small frequency difference and a reception bandwidth on a lower-frequency side of the higher component frequency of the small frequency difference is smaller than the small frequency difference;
a second condition that, where the first frequency difference is the small frequency difference, the difference between the second frequency difference and the first frequency difference is larger than the greater of a reception bandwidth on the lower-frequency side of the lowest carrier frequency and a reception bandwidth on the lower-frequency side of the highest carrier frequency; and
a third condition that, where the second frequency difference is the small frequency difference, the difference between the first frequency difference and the second frequency difference is larger than the greater of a reception bandwidth on a higher-frequency side of the lowest carrier frequency and a reception bandwidth on a higher-frequency side of the highest carrier frequency.

2. The signal transmission apparatus according to claim 1, wherein in making signal transmission by transmitting the modulated signals as radio signals, and receiving the radio signals and inputting the radio signals to the demodulating sections, each of the unique carrier frequencies used by the respective sets of the modulating sections and the demodulating sections is set such that respective reception bands of modulated signals based on the respective carrier frequencies do not overlap.

3. The signal transmission apparatus according to claim a1, wherein
four or more carrier frequencies are used; and
each carrier frequency of each combination of three adjacent carrier frequencies of the four or more carrier frequencies is set such that
the first condition is satisfied, and
the second condition is satisfied when the first frequency difference is smaller than the second frequency difference and the third condition is satisfied when the first frequency difference is larger than the second frequency difference.

4. The signal transmission apparatus according to claim 1, wherein
four or more carrier frequencies are used; and
each carrier frequency of each combination of three adjacent carrier frequencies of the four or more carrier frequencies is set such that
an intermodulation wave generated on a lower-frequency side of a lowest carrier frequency of the three adjacent carrier frequencies, the intermodulation wave being one of intermodulation waves generated on a basis of the lowest carrier frequency and an intermediate carrier frequency of the three adjacent carrier frequencies, is not present within a reception band of a modulated signal based on a carrier frequency on a lower-frequency side of the lowest carrier frequency, and
an intermodulation wave generated on a higher-frequency side of a highest carrier frequency of the three adjacent carrier frequencies, the intermodulation wave being one of intermodulation waves generated on a basis of the highest carrier frequency and the intermediate carrier frequency of the three adjacent carrier frequencies, is not present within a reception band of a modulated signal based on a carrier frequency on a higher-frequency side of the highest carrier frequency.

5. The signal transmission apparatus according to claim 1, wherein
a transmission characteristic between transmission and reception is known; and
the signal transmission apparatus includes
a signal processing section configured to perform predetermined signal processing on a basis of a setting value, and
a setting value processing section configured to input the setting value for the predetermined signal processing to the signal processing section.

6. The signal transmission apparatus according to claim 1, wherein all of the modulating sections and the demodulating sections are disposed on one circuit board.

7. The signal transmission apparatus according to claim 1, wherein
all of the modulating sections and the demodulating sections are disposed on one circuit board; and
the signal transmission apparatus includes a control section configured to change the carrier frequencies used by the respective modulating sections for transmission.

8. The signal transmission apparatus according to claim 1, wherein
all of the modulating sections and the demodulating sections are disposed on one circuit board; and
the signal transmission apparatus includes a control section configured to change the carrier frequencies used by the respective demodulating sections for reception.

9. The signal transmission apparatus according to claim 1, wherein
all of the modulating sections and the demodulating sections are disposed on one circuit board; and
the signal transmission apparatus includes a control section configured to change the carrier frequencies used by the respective modulating sections for transmission and the carrier frequencies used by the respective demodulating sections for reception.

10. The signal transmission apparatus according to claim 1, wherein
the modulating sections and the demodulating sections are scattered on a plurality of circuit boards; and
the signal transmission apparatus includes a control section configured to change the carrier frequencies used by the respective modulating sections for transmission.

11. The signal transmission apparatus according to claim 1, wherein
the modulating sections and the demodulating sections are scattered on a plurality of circuit boards; and
the signal transmission apparatus includes a control section configured to change the carrier frequencies used by the respective demodulating sections for reception.

12. The signal transmission apparatus according to claim 1, wherein
the modulating sections and the demodulating sections are scattered on a plurality of circuit boards; and
the signal transmission apparatus includes a control section configured to change the carrier frequencies used by the respective modulating sections for transmission and the carrier frequencies used by the respective demodulating sections for reception.

13. The signal transmission apparatus according to claim 9, wherein a control signal for changing the carrier frequencies is transmitted from the control section to the modulating sections or the demodulating sections by wire.

14. The signal transmission apparatus according to claim 9, wherein a control signal for changing the carrier frequencies is transmitted from the control section to the modulating sections or the demodulating sections by radio.

15. The signal transmission apparatus according to claim 14, wherein the control section is configured to set a band used by a radio signal of the control signal for changing the carrier frequencies outside a band used by a radio signal of the transmission object signal.

16. The signal transmission apparatus according to claim 14, wherein
the control section is configured to set a band used by a radio signal of the control signal for changing the carrier frequencies to a band used by a radio signal of the transmission object signal; and
the control section is configured to set each carrier frequency, including a carrier frequency of the radio signal of the control signal, such that frequency of an intermodulation distortion component generated on a basis of two carrier frequencies adjacent to each other is not present within any of reception bands of modulated signals based on each of the other carrier frequencies.

17. An electronic device comprising:
a first electronic device including a plurality of sections of first modulating sections respectively configured to modulate a transmission object signal into a modulated signal and a plurality of first demodulating sections configured to demodulate the modulated signals, the plurality of sections being disposed within one casing of the first electronic device;
a second electronic device including a second demodulating section corresponding to each first modulating section and a second modulating section corresponding to each first demodulating section, the second demodulating section and the second modulating section each being disposed within one casing of the second electronic device; and
a radio signal transmission line configured to allow the modulated signals to be transmitted as radio signals, the radio signal transmission line being formed when the first electronic device and the second electronic device are disposed at determined positions, wherein respective sets of the modulating sections and the demodulating sections are configured to utilize a unique carrier frequency, wherein a frequency of a third-order intermodulation distortion component generated on a basis of two adjacent carrier frequencies is not present within any of reception bands of modulated signals based on each of the other carrier frequencies wherein three adjacent carrier frequencies satisfy the following conditions:
- where a first frequency difference is defined as a difference between a lowest carrier frequency and an intermediate carrier frequency of the three adjacent carrier frequencies, a second frequency difference is defined as a difference between a highest carrier frequency and the intermediate carrier frequency of the three adjacent carrier frequencies, and a small frequency difference is defined as the smaller of the first frequency difference and the second frequency difference,
- a second condition that, where the first frequency difference is the small frequency difference, the difference between the second frequency difference and the first frequency difference is larger than the greater of a reception bandwidth on the lower-frequency side of the lowest carrier frequency and a reception bandwidth on the lower-frequency side of the highest carrier frequency; and
- a third condition that, where the second frequency difference is the small frequency difference, the difference between the first frequency difference and the second frequency difference is larger than the greater of a reception bandwidth on a higher-frequency side of the lowest carrier frequency and a reception bandwidth on a higher-frequency side of the highest carrier frequency.

18. The electronic device according to claim 17, wherein four or more carrier frequencies are used; and
each carrier frequency of each combination of three adjacent carrier frequencies of the four or more carrier frequencies is set such that
- a first condition is satisfied, the first condition being that a sum of a reception bandwidth on a higher-frequency side of the lower component frequency of the small frequency difference and a reception bandwidth on a lower-frequency side of the higher component frequency of the small frequency difference is smaller than the small frequency difference, and
- the second condition is satisfied when the first frequency difference is smaller than the second frequency difference and the third condition is satisfied when the first frequency difference is larger than the second frequency difference.

19. The electronic device according to claim 17, wherein four or more carrier frequencies are used; and
each carrier frequency of each combination of three adjacent carrier frequencies of the four or more carrier frequencies is set such that
- an intermodulation wave generated on a lower-frequency side of a lowest carrier frequency of the three adjacent carrier frequencies, the intermodulation wave being one of intermodulation waves generated on a basis of the lowest carrier frequency and an intermediate carrier frequency of the three adjacent carrier frequencies, is not present within a reception band of a modulated signal based on a carrier frequency on a lower-frequency side of the lowest carrier frequency, and
- an intermodulation wave generated on a higher-frequency side of a highest carrier frequency of the three adjacent carrier frequencies, the intermodulation wave being one of intermodulation waves generated on a basis of the highest carrier frequency and the intermediate carrier frequency of the three adjacent carrier frequencies, is not present within a reception band of a modulated signal based on a carrier frequency on a higher-frequency side of the highest carrier frequency.

20. A signal transmission method comprising:
arranging a plurality of modulating sections respectively configured to modulate a transmission object signal into a modulated signal, and a plurality of demodulating sections configured to demodulate the modulated signals; and setting a plurality of unique carrier frequencies used by respective sets of the modulating sections and the demodulating sections such that a frequency of a third-order intermodulation distortion component generated on a basis of two adjacent carrier frequencies is not present within any of reception bands of modulated signals based on each of the other carrier frequencies wherein three adjacent carrier frequencies satisfy the following conditions:
- where a first frequency difference is defined as a difference between a lowest carrier frequency and an intermediate carrier frequency of the three adjacent carrier frequencies, a second frequency difference is defined as a difference between a highest carrier frequency and the intermediate carrier frequency of the three adjacent carrier frequencies, and a small frequency difference is defined as the smaller of the first frequency difference and the second frequency difference,
- a first condition that a sum of a reception bandwidth on a higher-frequency side of the lower component frequency of the small frequency difference and a reception bandwidth on a lower-frequency side of the higher component frequency of the small frequency difference is smaller than the small frequency difference;
- a second condition that, where the first frequency difference is the small frequency difference, the difference between the second frequency difference and the first frequency difference is larger than the greater of a reception bandwidth on the lower-frequency side of the lowest carrier frequency and a reception bandwidth on the lower-frequency side of the highest carrier frequency; and
- a third condition that, where the second frequency difference is the small frequency difference, the difference between the first frequency difference and the second frequency difference is larger than the greater of a reception bandwidth on a higher-frequency side of the lowest carrier frequency and a reception bandwidth on a higher-frequency side of the highest carrier frequency.

21. The signal transmission method according to claim 20, wherein
four or more carrier frequencies are used; and
each carrier frequency of each combination of three adjacent carrier frequencies of the four or more carrier frequencies is set such that the first condition is satisfied, and the second condition is satisfied when the first frequency difference is smaller than the second frequency difference and the third condition is satisfied when the first frequency difference is larger than the second frequency difference.

22. The signal transmission method according to claim 20, wherein four or more carrier frequencies are used; and each carrier frequency of each combination of three adjacent carrier frequencies of the four or more carrier frequencies is set such that an intermodulation wave generated on a lower-frequency side of a lowest carrier frequency of the three adjacent carrier frequencies, the intermodulation wave being one of intermodulation waves generated on a basis of the lowest carrier frequency and an intermediate carrier frequency of the three adjacent carrier frequencies, is not present within a reception band of a modulated signal based on a carrier frequency on a lower-frequency side of the lowest carrier frequency, and an intermodulation wave generated on a higher-frequency side of a highest carrier frequency of the three adjacent carrier frequencies, the intermodulation wave being one of intermodulation waves generated on a basis of the highest carrier frequency and the intermediate carrier frequency of the three adjacent carrier frequencies, is not present within a reception band of a modulated signal based on a carrier frequency on a higher-frequency side of the highest carrier frequency.

* * * * *